(12) United States Patent
Babaei et al.

(10) Patent No.: US 11,451,344 B2
(45) Date of Patent: Sep. 20, 2022

(54) HARQ FEEDBACK

(71) Applicant: Ofinno, LLC, Reston, VA (US)

(72) Inventors: Alireza Babaei, Fairfax, VA (US); Esmael Dinan, McLean, VA (US); Yunjung Yi, Vienna, VA (US); Hua Zhou, Herndon, VA (US); Ali Cagatay Cirik, Herndon, VA (US); Kai Xu, Herndon, VA (US); Youngwoo Kwak, Vienna, VA (US); Hyoungsuk Jeon, Centreville, VA (US); Nazanin Rastegardoost, McLean, VA (US)

(73) Assignee: Ofinno, LLC, Reston, VA (US)

( * ) Notice: Subject to any disclaimer, the term of this patent is extended or adjusted under 35 U.S.C. 154(b) by 116 days.

(21) Appl. No.: 16/924,834

(22) Filed: Jul. 9, 2020

(65) Prior Publication Data
US 2021/0014010 A1 Jan. 14, 2021

Related U.S. Application Data

(60) Provisional application No. 62/872,111, filed on Jul. 9, 2019.

(51) Int. Cl.
| | |
|---|---|
| *H04L 1/18* | (2006.01) |
| *H04L 5/00* | (2006.01) |
| *H04L 1/16* | (2006.01) |
| *H04W 72/04* | (2009.01) |

(52) U.S. Cl.
CPC .......... *H04L 1/1819* (2013.01); *H04L 1/1642* (2013.01); *H04L 5/0092* (2013.01); *H04W 72/042* (2013.01); *H04W 72/0446* (2013.01)

(58) Field of Classification Search
None
See application file for complete search history.

(56) References Cited

U.S. PATENT DOCUMENTS

| 2019/0306841 | A1* | 10/2019 | Huang | H04W 72/042 |
| 2019/0349897 | A1* | 11/2019 | Hosseini | H04W 28/12 |
| 2020/0196343 | A1* | 6/2020 | Marinier | H04W 72/1289 |

(Continued)

OTHER PUBLICATIONS

3GPP TS 38.212 V15.5.0 (Mar. 2019); Technical Specification; 3rd Generation Partnership Project; Technical Specification Group Radio Access Network; NR; Multiplexing and channel coding; (Release 15).

(Continued)

*Primary Examiner* — Saad Khawar
(74) *Attorney, Agent, or Firm* — Sachin Kandhari; Kavon Nasabzadeh; Philip R. Smith

(57) ABSTRACT

A wireless device receives configuration parameters of a cell comprising: a first bandwidth part; and a second bandwidth part. A downlink control information is received. The downlink control information indicates: a priority of a transport block; and a hybrid automatic repeat request (HARQ) feedback timing of a HARQ feedback of the transport block. After receiving the downlink control information (DCI) and before the HARQ feedback timing, the active bandwidth part is switched from the first bandwidth part to the second bandwidth part. The HARQ feedback is transmitted in response to the priority of the transport block being associated with a first service type.

20 Claims, 41 Drawing Sheets

(56) References Cited

U.S. PATENT DOCUMENTS

2020/0213981 A1* 7/2020 Park ............... H04W 72/042
2020/0358587 A1* 11/2020 Wang ............. H04W 72/1268

OTHER PUBLICATIONS

"3GPP TS 38.213 V15.5.0 (Mar. 2019); Technical Specification; 3rd Generation Partnership Project; Technical Specification Group Radio Access Network; NR;Physical layer procedures for control (Release 15); / /".

3GPP TS 38.214 V15.5.0 (Mar. 2019); Technical Specification; 3rd Generation Partnership Project; Technical Specification Group Radio Access Network; NR; Physical layer procedures for data; (Release 15).

3GPP TS 38.300 V15.5.0 (Mar. 2019); Technical Specification; 3rd Generation Partnership Project; Technical Specification Group Radio Access Network; NR; NR and NG-RAN Overall Description; Stage 2; (Release 15).

3GPP TS 38.321 V15.5.0 (Mar. 2019); Technical Specification; 3rd Generation Partnership Project; Technical Specification Group Radio Access Network; NR; Medium Access Control (MAC) protocol specification; (Release 15).

3GPP TS 38.331 V15.5.1 (Apr. 2019); Technical Specification; 3rd Generation Partnership Project; Technical Specification Group Radio Access Network; NR; Radio Resource Control (RRC) protocol specification; (Release 15).

"R1-1906058; 3GPP TSG RAN WG1 Meeting #97 Reno, USA, May 13-17, 2019;; Agenda Item:7.2.6.2; Source:Huawei, HiSilicon; Title:UCI enhancements for URLLC."

"R1-1906092 UCI Enhancements for NR URLLC 3GPP TSG RAN WG1 Meeting #97R1-1906092; Reno, Nevada, USA, May 13-17, 2019;; Agenda Item:7.2.6.2 Source: Ericsson."

"R1-1906147 UCI enhancements for URLLC; 3GPP TSG RAN WG1 #97; Reno, USA, May 13-17, 2019;; Source:vivo; Title:UCI enhancements for URLLC; Agenda Item:7.2.6.2."

"R1-1906212; 3GPP TSG RAN WG1 #97; Reno, USA, May 13-17, 2019;; Source:NTT Docomo, Inc.; Title: UCI enhancements for URLLC; Agenda tem:7.2.6.2."

"R1-1906328; 3GPP TSG RAN WG1 Meeting #97; Reno, USA, May 13-17, 2019;; Source:CATT; Title: UL control enhancements for URLLC; Agenda Item:7.2.6.2."

"R1-1906358 Discussion on UCI enhancements for URLLC; 3GPP TSG RAN WG1 #97; Reno, USA, May 13-17, 2019;; Agenda item:7.2.6.2; Source: Spreadtrum Communications; Title: Discussion on UCI enhancements for URLLC."

"R1-1906410 UL control enhancements for NR URLLC; 3GPP TSG RAN WG1 #97; Reno, USA, May 13-17, 2019; Source:ZTE; Title: UL control enhancements for NR URLLC; Agenda item:7.2.6.2; Document for Discussion and Decision."

"R1-1906448; 3GPP TSG RAN WG1 #97 Reno, USA, May 13-17, 2019;; Source:OPPO; Title:UCI enhancements for URLLC; Agenda Item:7.2.6.2."

"R1-1906583 UCI enhancements for URLLC; 3GPP TSG RAN WG1 #97; Reno, USA, May 13-17, 2019;; Agenda Item:7.2.6.2; Source: Fujitsu; Title: UCI enhancements for URLLC."

"R1-1906665 URLLC UCI; 3GPP TSG RAN WG1 #97; Reno, NV, US, May 13-17, 2019; Agenda Item:7.2.6.2; Source: LG Electronics; Title: UCI enhancements for NR URLLC; Document forDiscussion and decision."

"R1-1906744 UCI enhancements for NR URLLC; 3GPP TSG RAN WG1 #97; Reno, USA, May 13-17, 2019;; Agenda Item: 7.2.6.2; Source: NEC; Title:UCI enhancements for NR URLLC."

"R1-1906752_Nokia_eURLLC UCI enh; 3GPP TSG RAN WG1#97; Reno, Nevada, US, May 13-17, 2019;; Agenda item:7.2.6.2; Source:Nokia, Nokia Shanghai Bell; Title:On UCI Enhancements for NR URLLC."

"R1-1906807 Intel—eURLLC UCI_Enh_Final; 3GPP TSG RAN WG1 #97; Reno, USA, May 13-17, 2019; Source:Intel Corporation; Title:On enhancements to UCI for eURLLC; Agenda Item:7.2.6.2; Document for:Discussion and Decision;".

"R1-1906841—Rel-16 eURLLC—UCI v03; 3GPP TSG RAN WG1 #97; Reno, USA, May 13-17, 2019;; Agenda Item:7.2.6.2; Source: Sony ; Title:UCI enhancements for eURLLC."

"R1 -1906866; 3GPP TSG RAN WG1 #97; Reno, USA, May 13-17, 2019;; Source:Panasonic; Title: Discussion on UCI enhancement for URLLC; Agenda Item:7.2.6.2."

"R1-1906882; 3GPP TSG RAN WG1 #97; Reno, USA, May 13-17, 2019;; Agenda item:7.2.6.2; Source:China Telecom; Title:UCI enhancements for URLLC."

"R1-1906956 eURLLC UL Control; 3GPP TSG RAN WG1 #97; Reno, USA, May 13-17, 2019; Agenda item:7.2.6.2; Source: Samsung ; Title: UL Control for URLLC; Document forDiscussion and Decision."

"R1-1907040 UCI enhancements—final; 3GPP TSG RAN WG1 #97; Reno, USA, May 13-17, 2019;; Source: ETRI; Title: UCI enhancements; Agenda Item:7.2.6.2UCI enhancements."

"R1-1907194 UCI Enhancements for eURLLC; 3GPP TSG RAN WG1 #97; Reno, USA, Apr. 13-17, 2019;; Agenda Item:7.2.6.2; Source:InterDigital Inc.; Title:UCI Enhancements for eURLLC."

"R1-1907203; 3GPP TSG RAN WG1 Meeting #97; Reno, USA, May 13-17, 2019; Source : CAICT; Title : UCI enhancements for URLLC; Agenda Item: 7.2.6.2 Document for: Discussion / Decision."

"R1-1907242 UCI enhancement for URLLC_final; 3GPP TSG RAN WG1 Meeting #97; Reno, USA, May 13-17, 2019;;;; Agenda item:7.2.6.2."

"R1-1907282 UCI Enhancements for eURLLC; 3GPP TSG-RAN WG1 #97R1-1907282; May 13-17, 2019; Reno, Nevada, U.S.A. ;; Agenda item:7.2.6.2."

"R1-1907310; 3GPP TSG RAN WG1 #97; Reno, USA, May 13-17, 2019; Agenda Item:7.2.6.2; Source:ITRI; Title:UCI enhancements for URLLC; Document for:Discussion and Decision."

"R1-1907362 UCI enhancements for NR URLLC; 3GPP TSG-RAN WG1 Meeting #97; Reno, USA, May 13-17, 2019;; Source:Asia Pacific Telecom; Title:UCI enhancements for NR URLLC; Agenda Item:7.2.6.2."

"R1-1907385_UCI_final; 3GPP TSG RAN WG1 #97; Reno, USA, May 13-17, 2019;; Source: WILUS Inc.; Title:On UCI enhancement for NR URLLC; Agenda Item:7.2.6.2."

"R1-1907724 Multiple HARQ procedures and intra-UE UCI prioritization; 3GPP TSG RAN WG1 Meeting #97; Reno, Nevada, USA, May 13-17, 2019 ; Agenda Item: 7.2.6.2; Source: MediaTek Inc.; Title: Multiple HARQ procedures and intra-UE UCI prioritization; Document for: Discussion and Decision."

"R1-1907754; 3GPP TSG RAN WG1 #97; Reno, USA, May 13-17, 2019;; Source:OPPO; Title:Summary on UCI enhancements for URLLC; Agenda Item:7.2.6.2."

"3GPP TSG RAN WG1 #97 R1-1906632; Reno, USA, May 13-17, 2019; Agenda Item: 7.2.6.2 Source: China Unicom Title: UCI enhancements for URLLC; Document for: Discussion and decision".

3GPP TS 38.211 V15.5.0 (Mar. 2019) 3rd Generation Partnership Project; Technical Specification Group Radio Access Network; NR; Physical Channels and Modulation (Release 15).

3GPP TS 38.133 V15.5.0 (Mar. 2019) 2rd Generation Partnership Project; Technical Specification Group Radio Access Network; NR; Requirements for Support of Radio Resource Management (Release 15).

* cited by examiner

User Plane Protocol Stack

Control Plane Protocol Stack

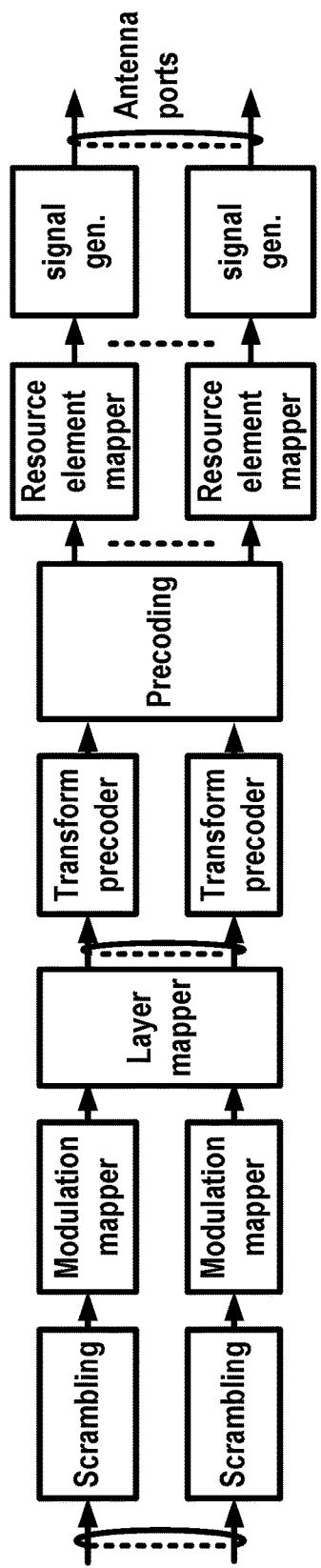
FIG. 4A
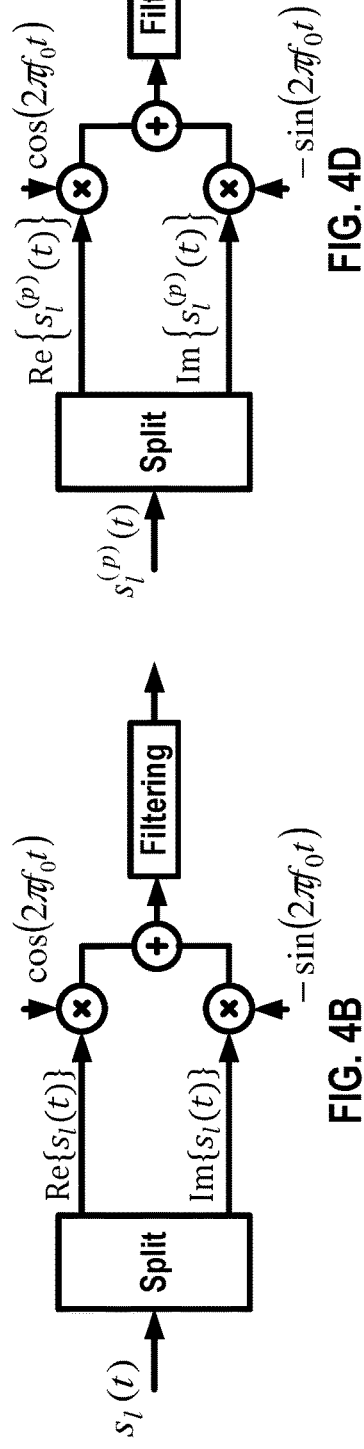
FIG. 4B
FIG. 4D
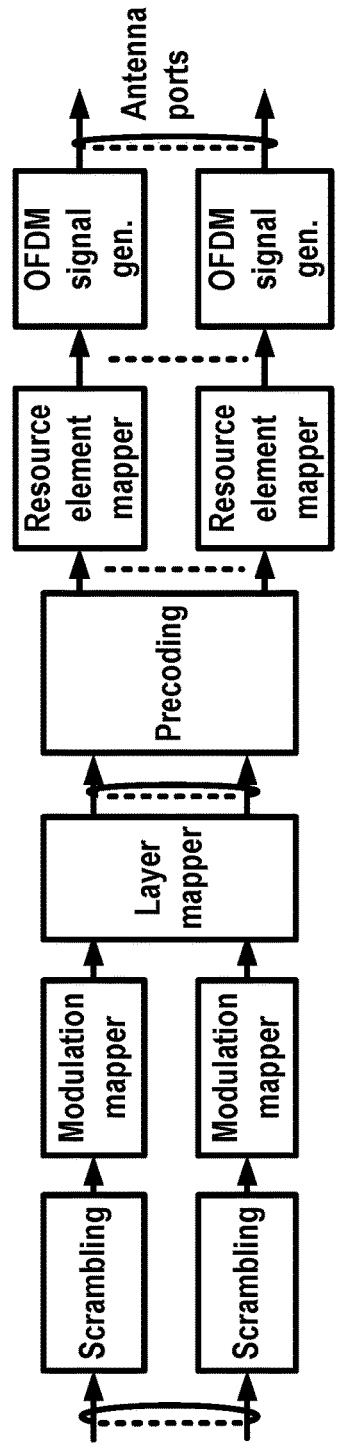
FIG. 4C

HARQ FEEDBACK

CROSS-REFERENCE TO RELATED APPLICATIONS

This application claims the benefit of U.S. Provisional Application No. 62/872,111, filed Jul. 9, 2019, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

DETAILED DESCRIPTION OF EMBODIMENTS

Figure 1:
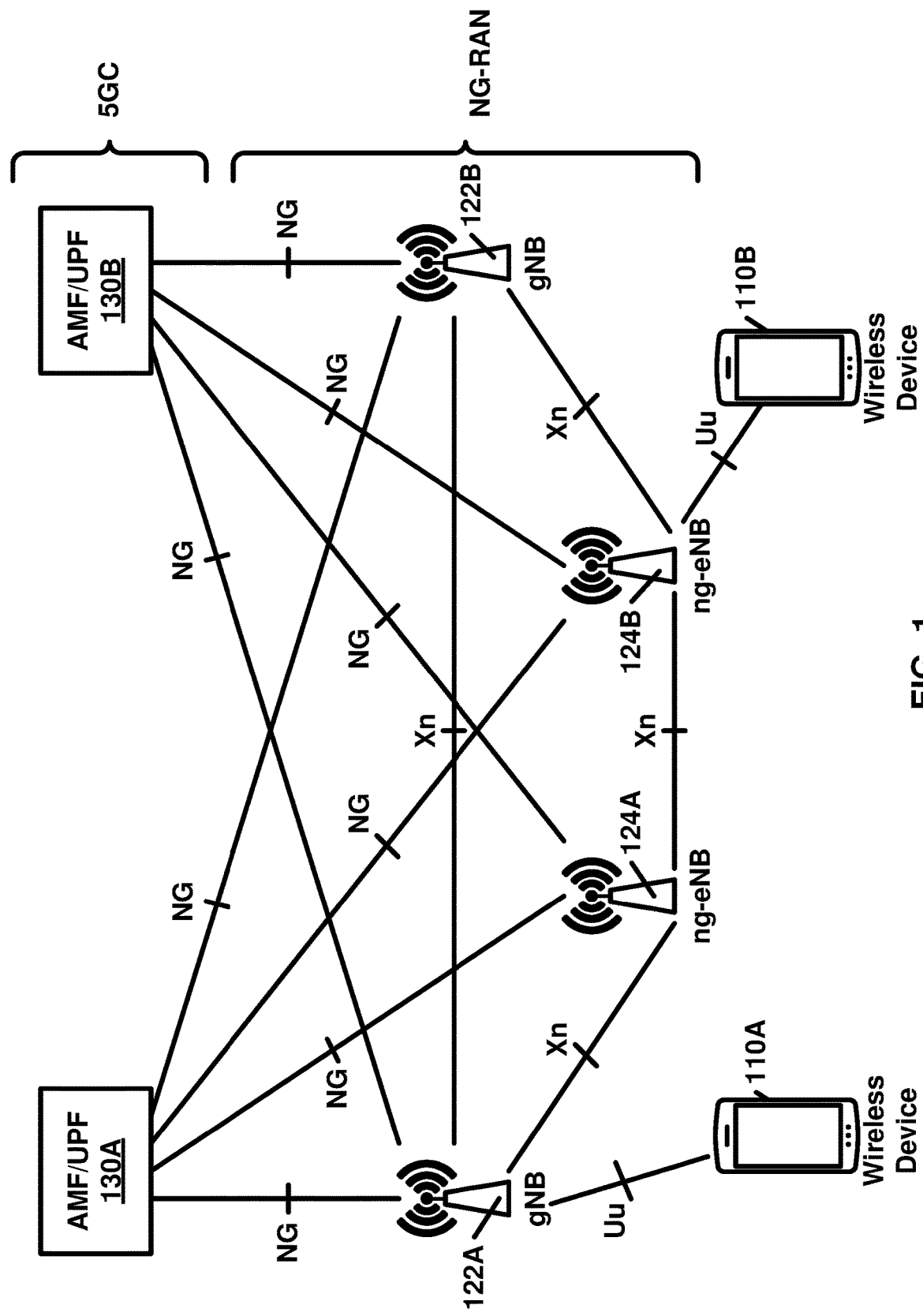
FIG. 1 is a diagram of an example RAN architecture as per an aspect of an embodiment of the present disclosure.

Example embodiments of the present disclosure enable operation of HARQ feedback. Embodiments of the technology disclosed herein may be employed in the technical field of multicarrier communication systems. More particularly, the embodiments of the technology disclosed herein may relate to HARQ feedback in multicarrier communication systems.

The following Acronyms are used throughout the present disclosure:
3GPP 3rd Generation Partnership Project
5GC 5G Core Network
ACK Acknowledgement
AMF Access and Mobility Management Function
ARQ Automatic Repeat Request AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNB s and/or one or more ng-eNB s may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
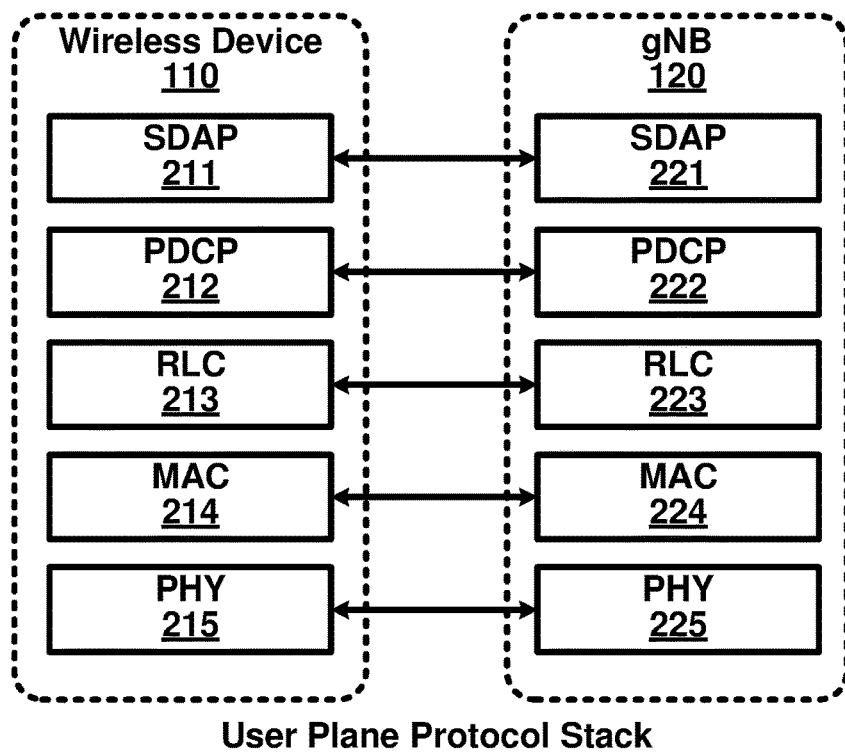
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TB s) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings.

In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
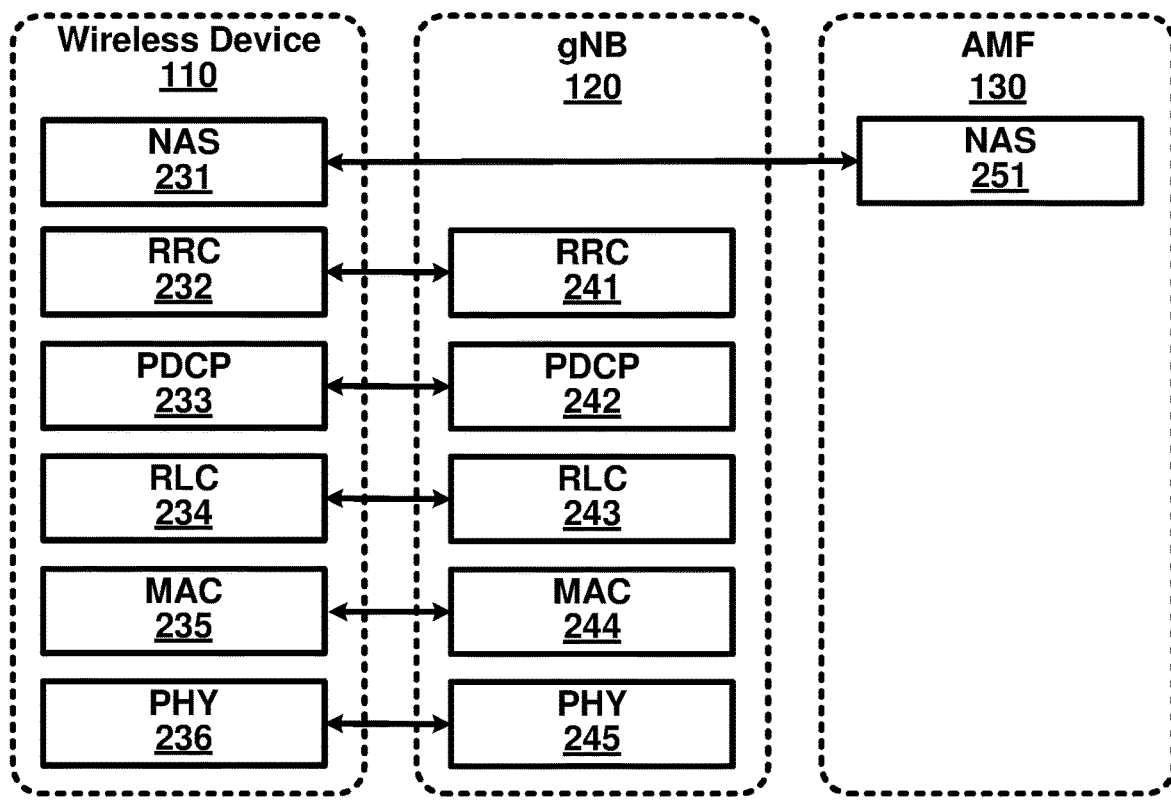
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
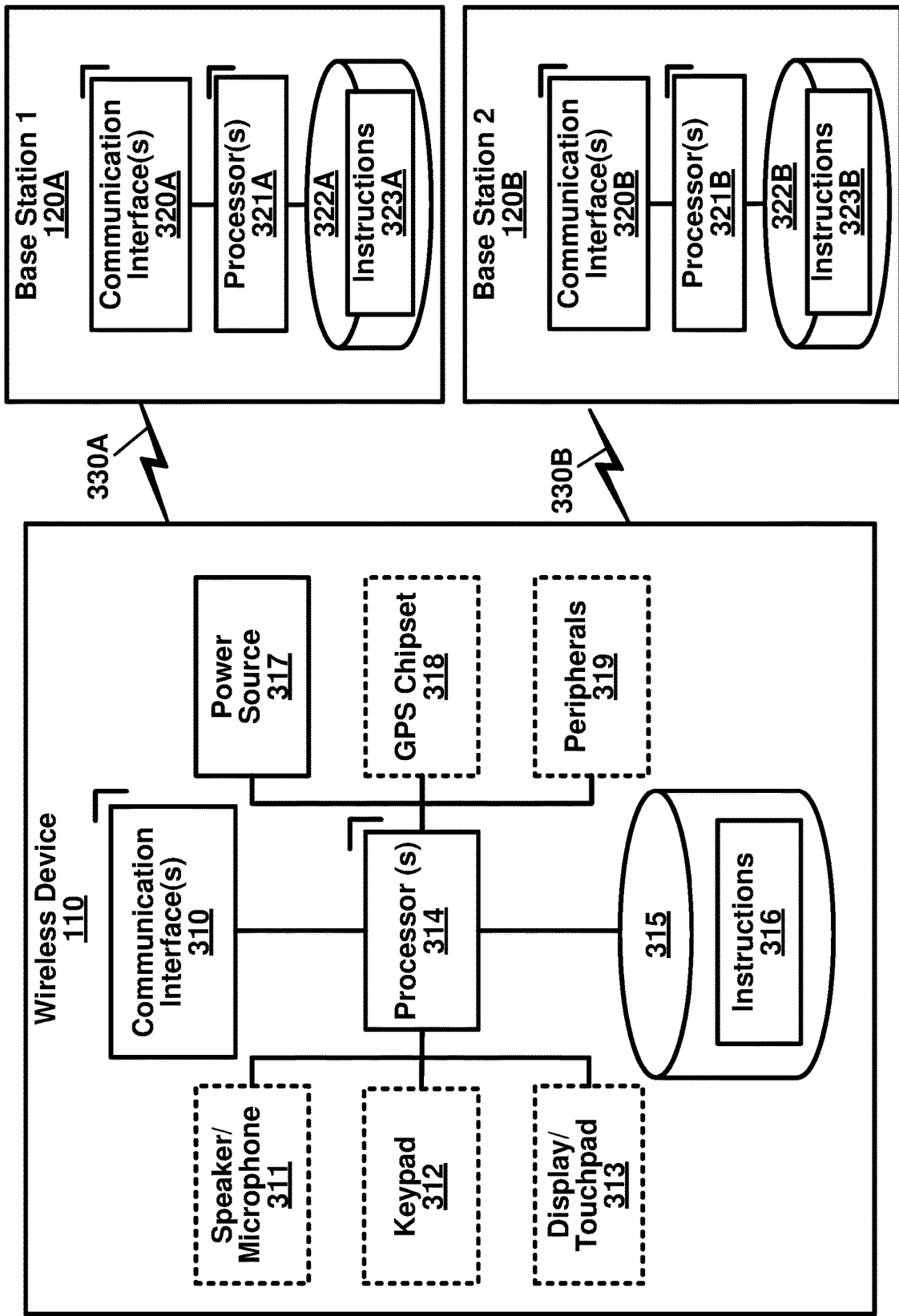
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
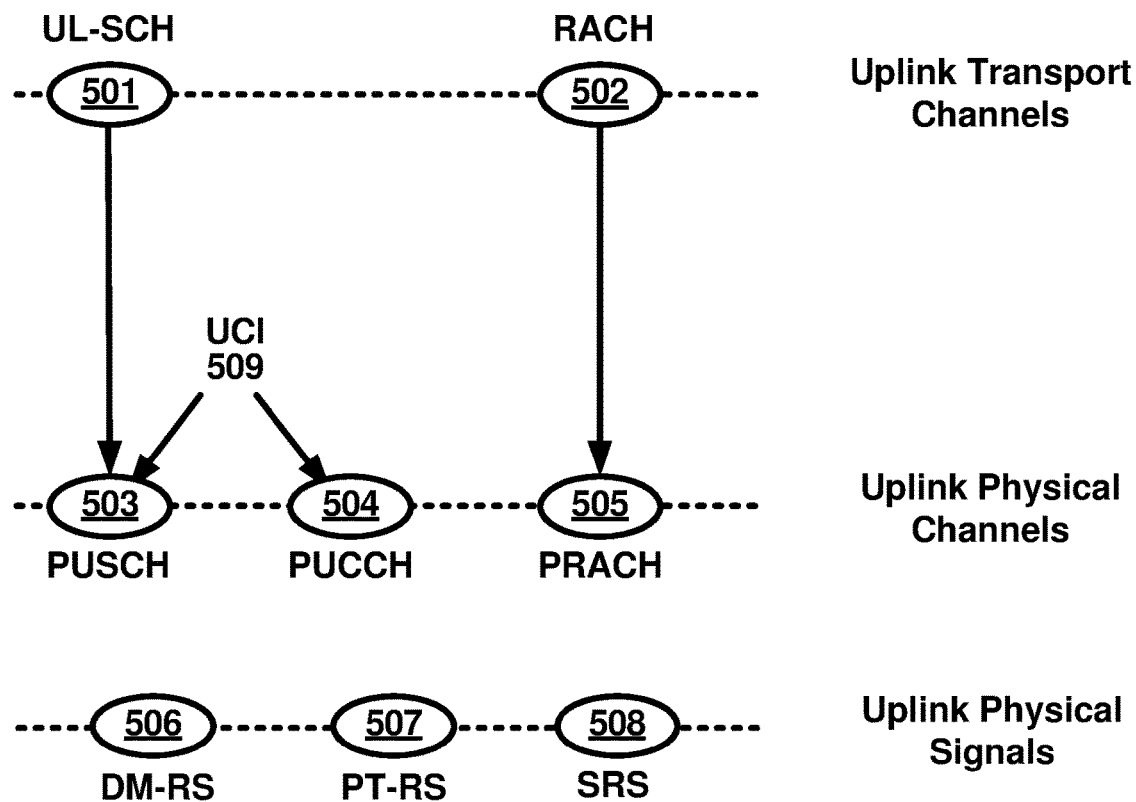
FIG. 5A is a diagram of an example uplink channel mapping and example uplink physical signals as per an aspect of an embodiment of the present disclosure.
Figure 5B:
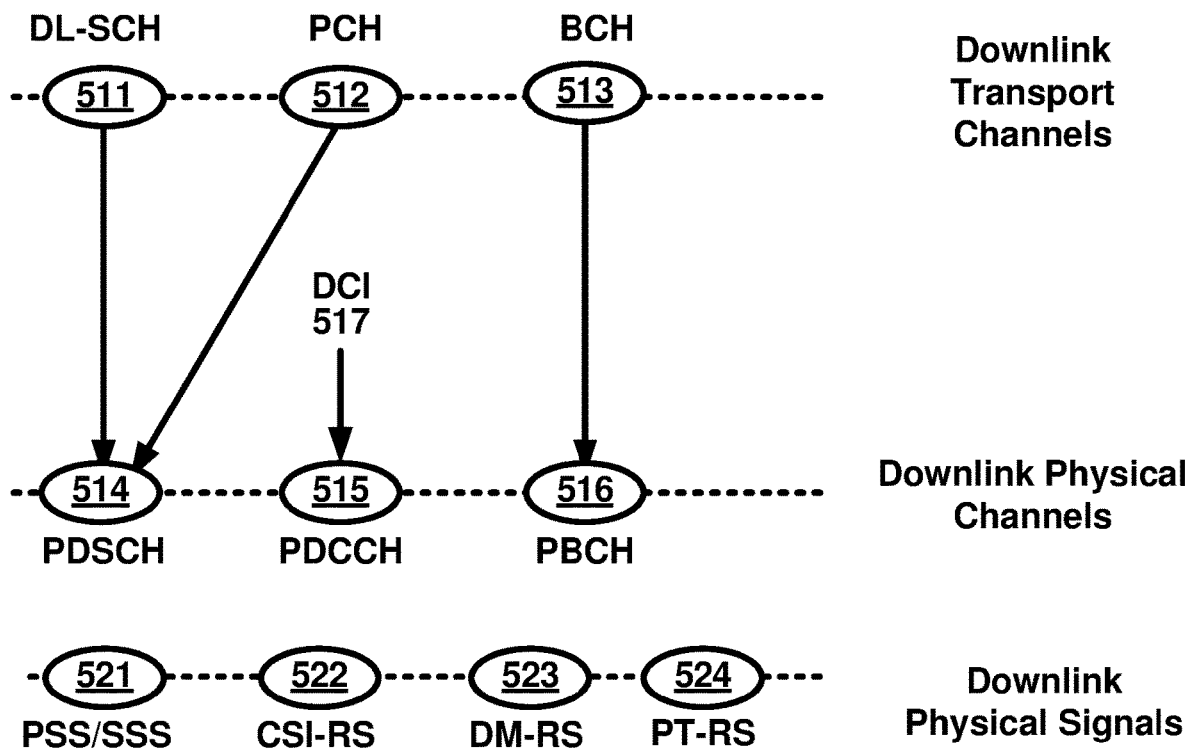
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
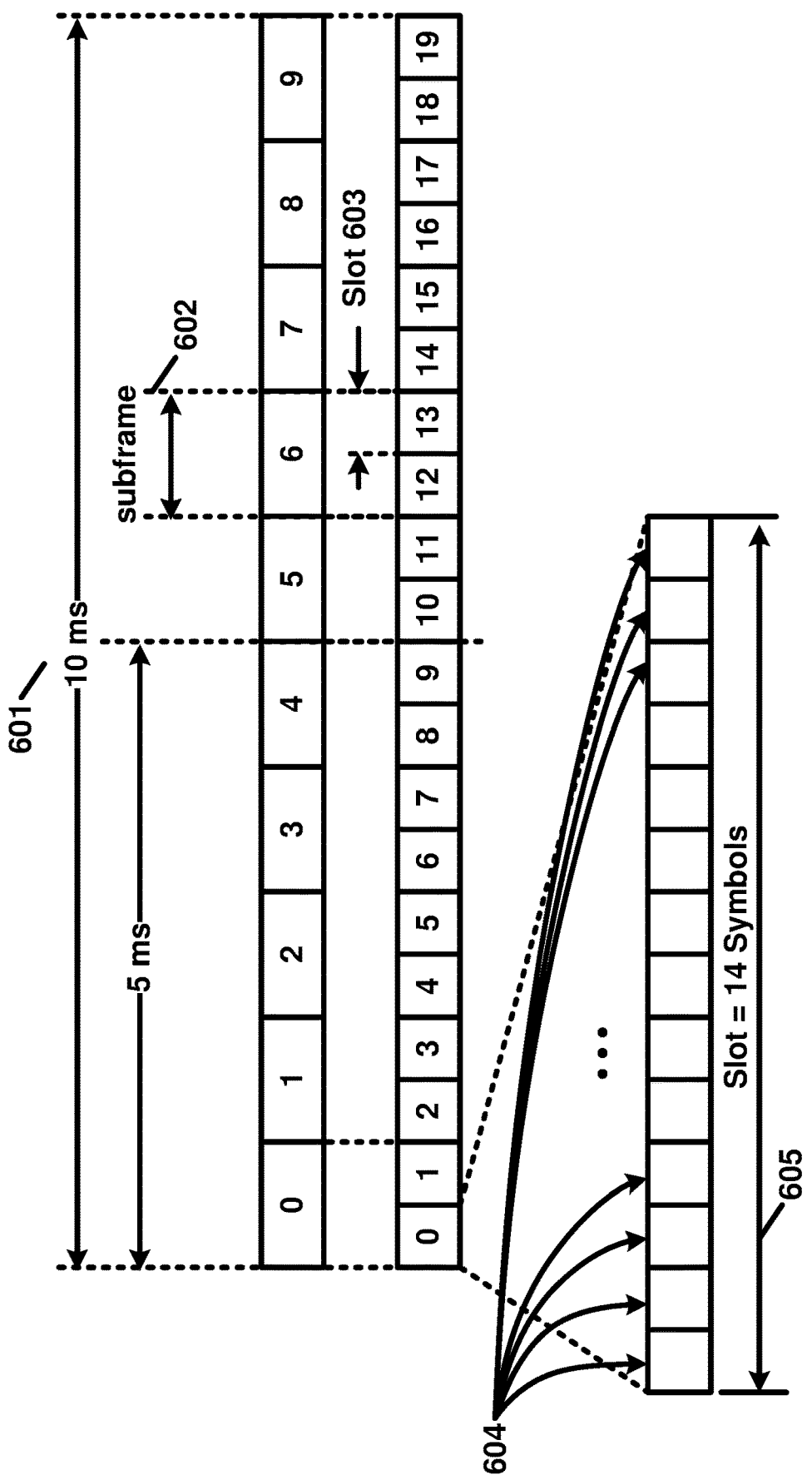
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
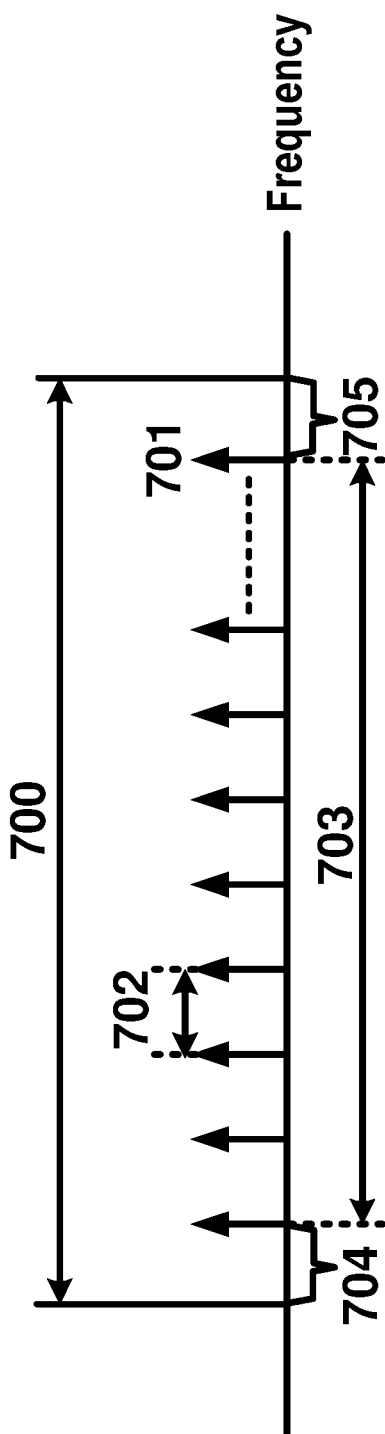
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
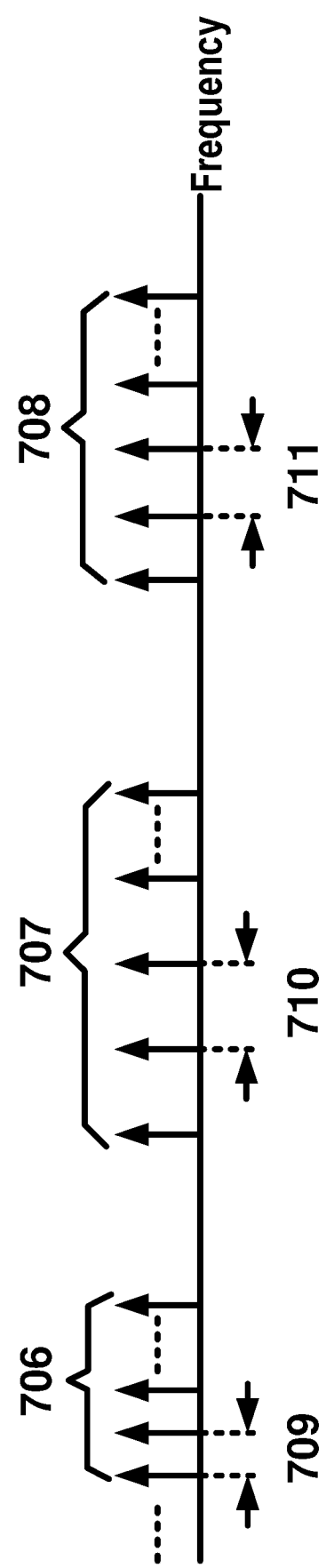

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
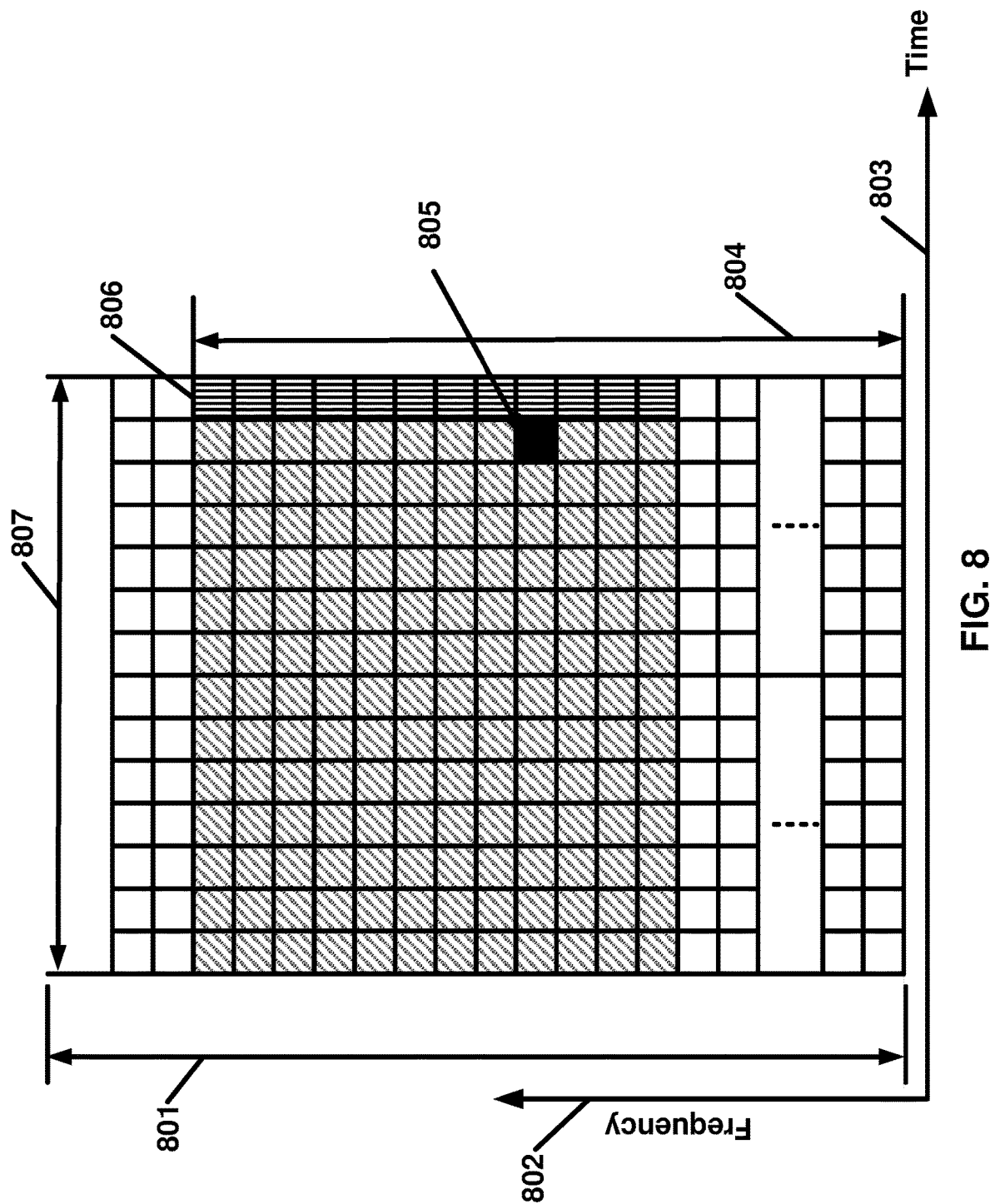
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
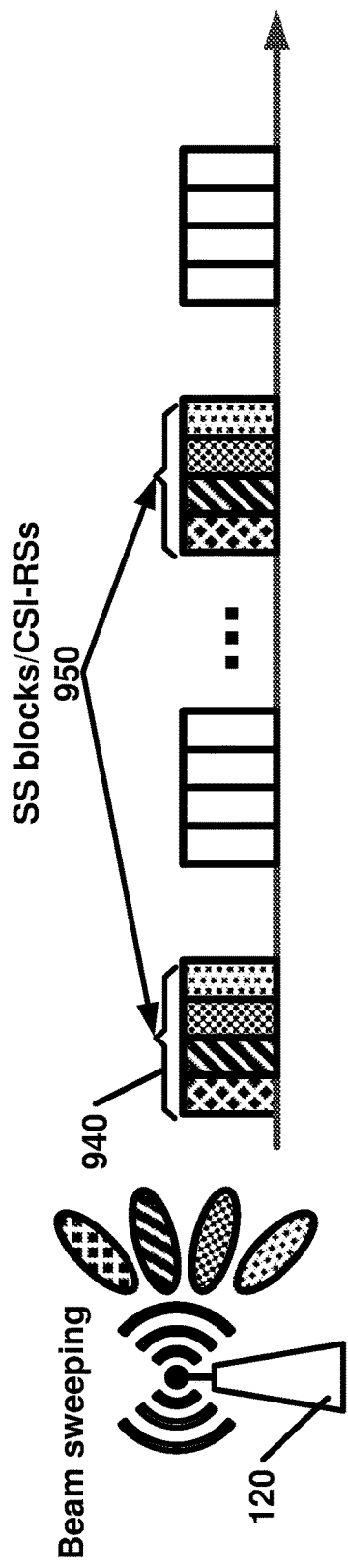
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
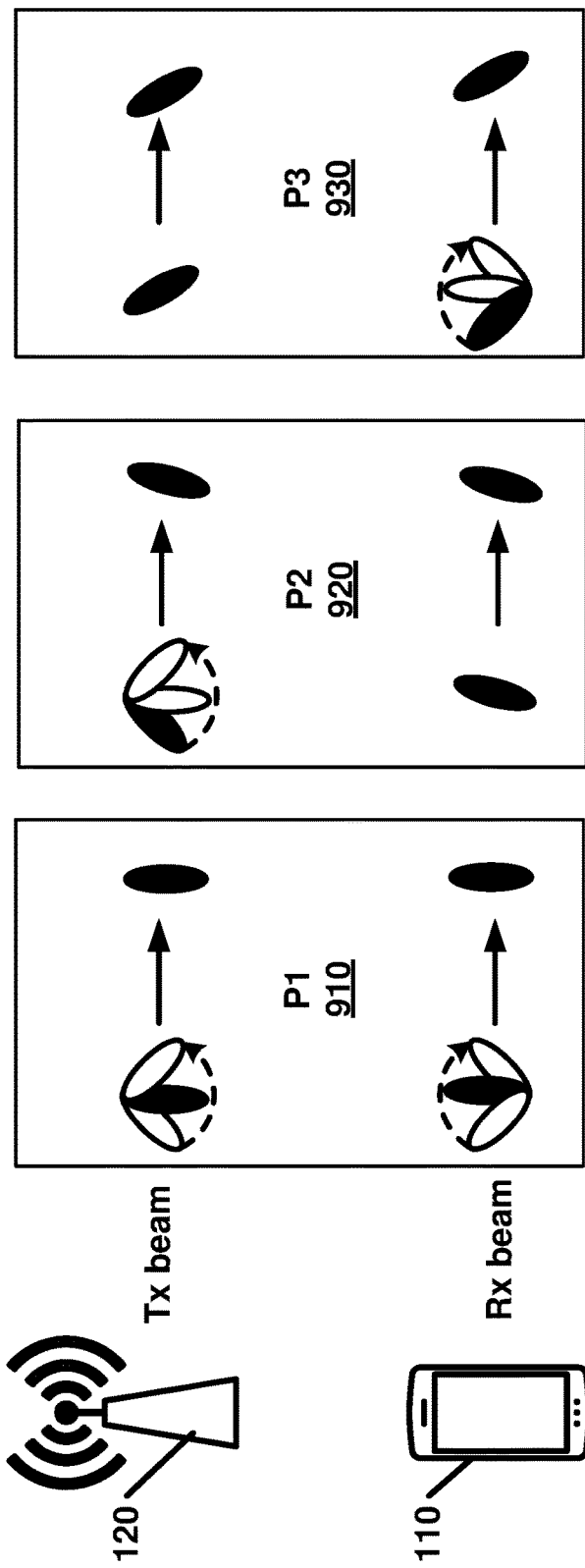
FIG. 9B is a diagram depicting an example downlink beam management procedure as per an aspect of an example embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
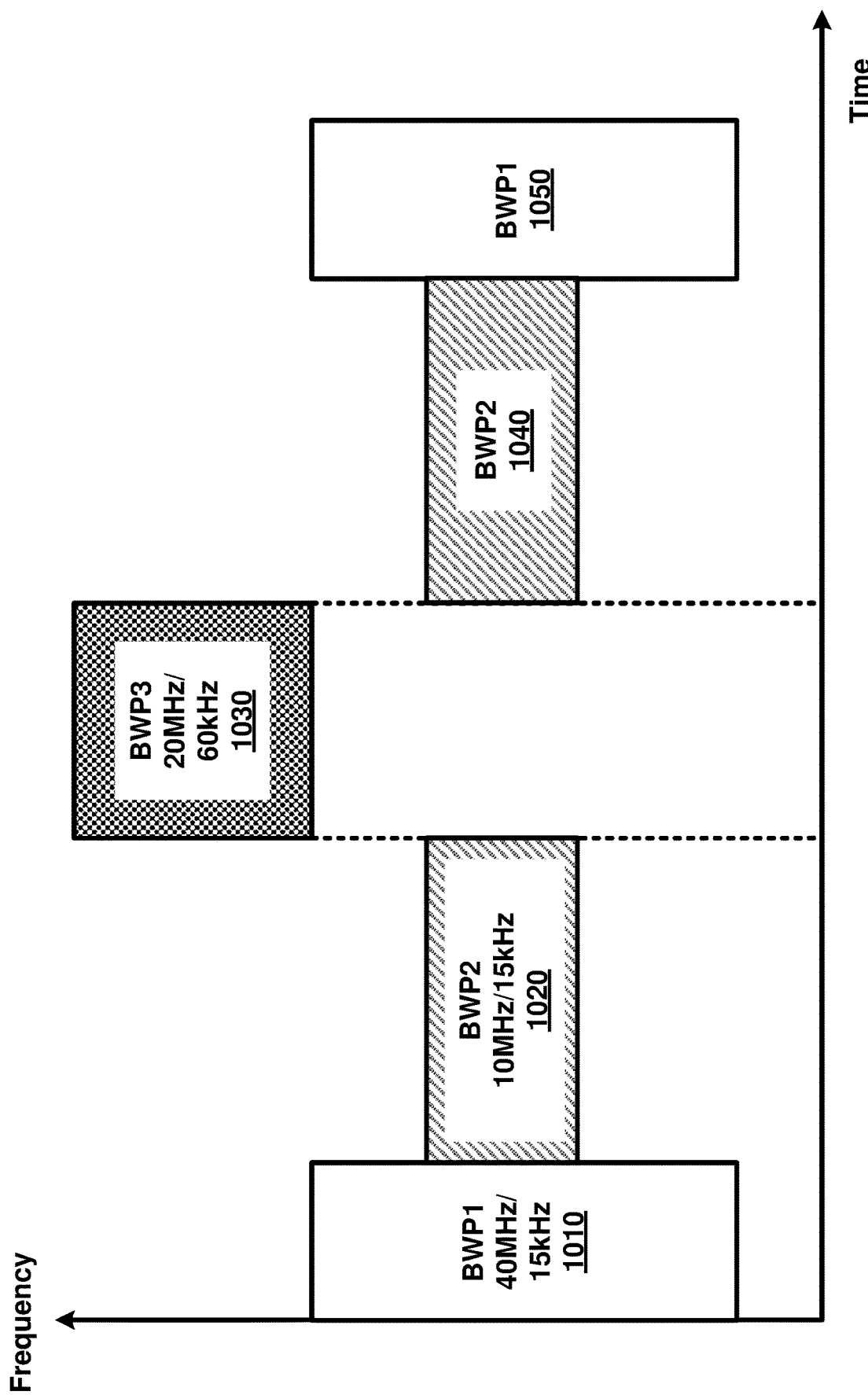
FIG. 10 is an diagram of configured BWPs as per an aspect of an example embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
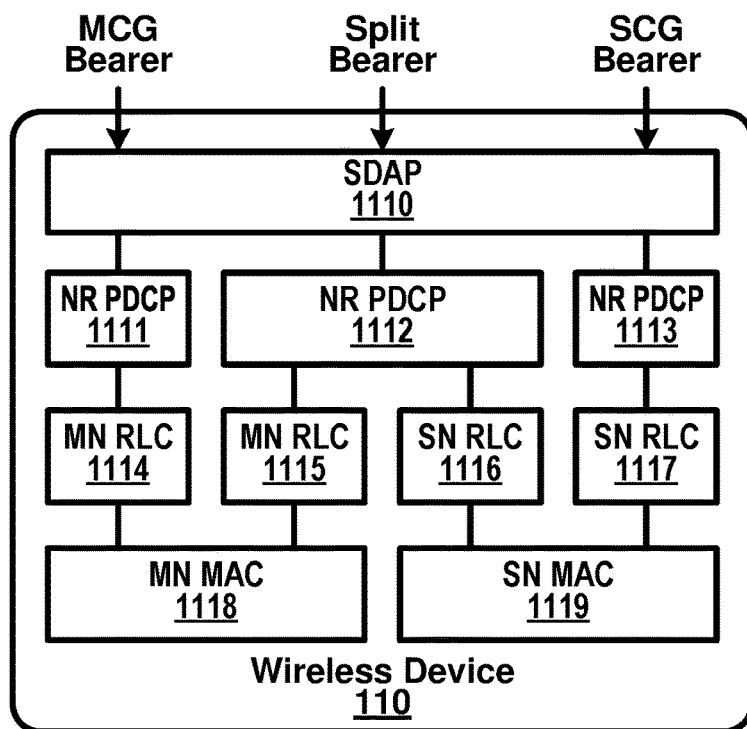
FIG. 11A, and FIG. 11B are diagrams of an multi connectivity as per an aspect of an example embodiment of the present disclosure.
Figure 11B:
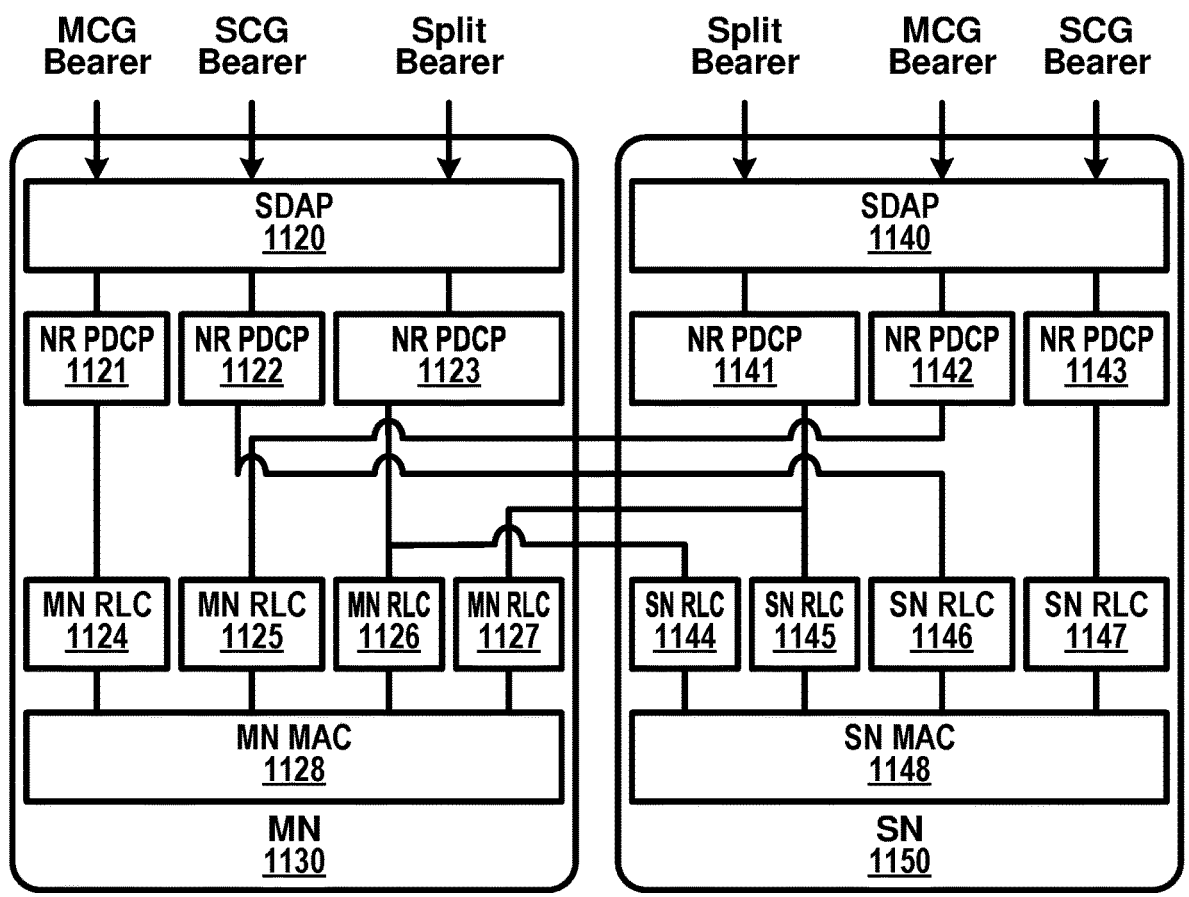

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/ receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not be supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
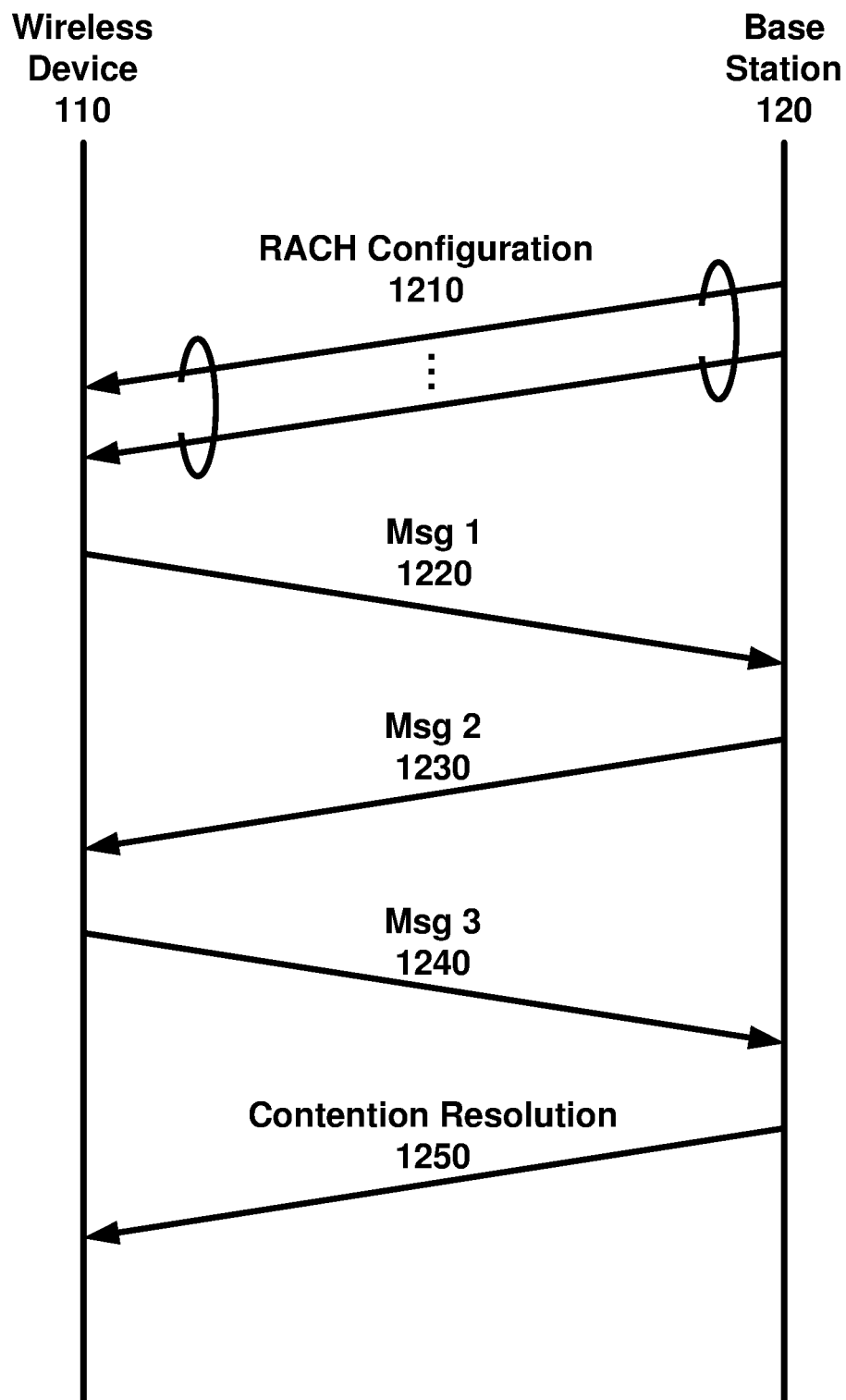
FIG. 12 is a diagram of a random access procedure as per an aspect of an example embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
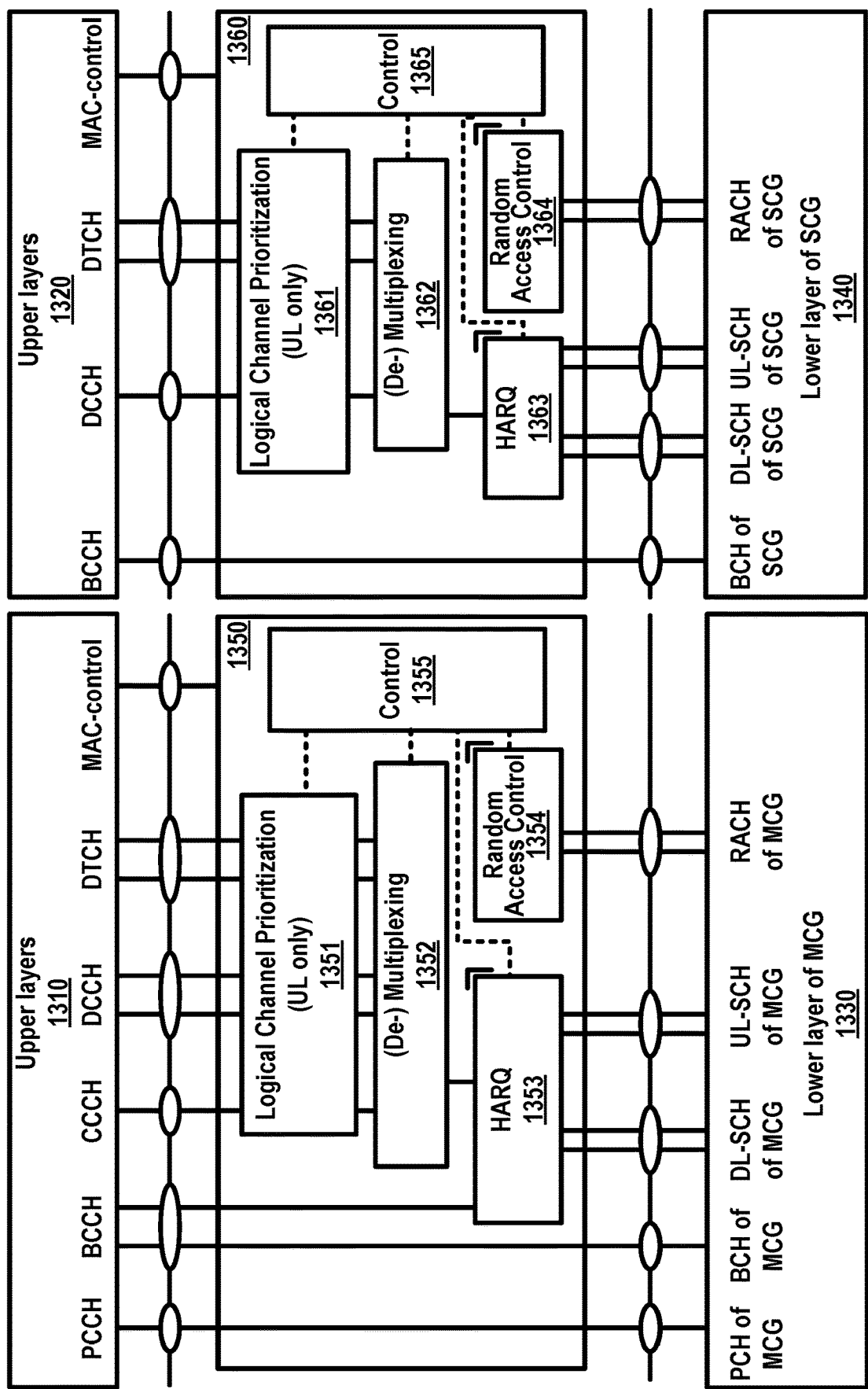
FIG. 13 is a structure of MAC entities as per an aspect of an example embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
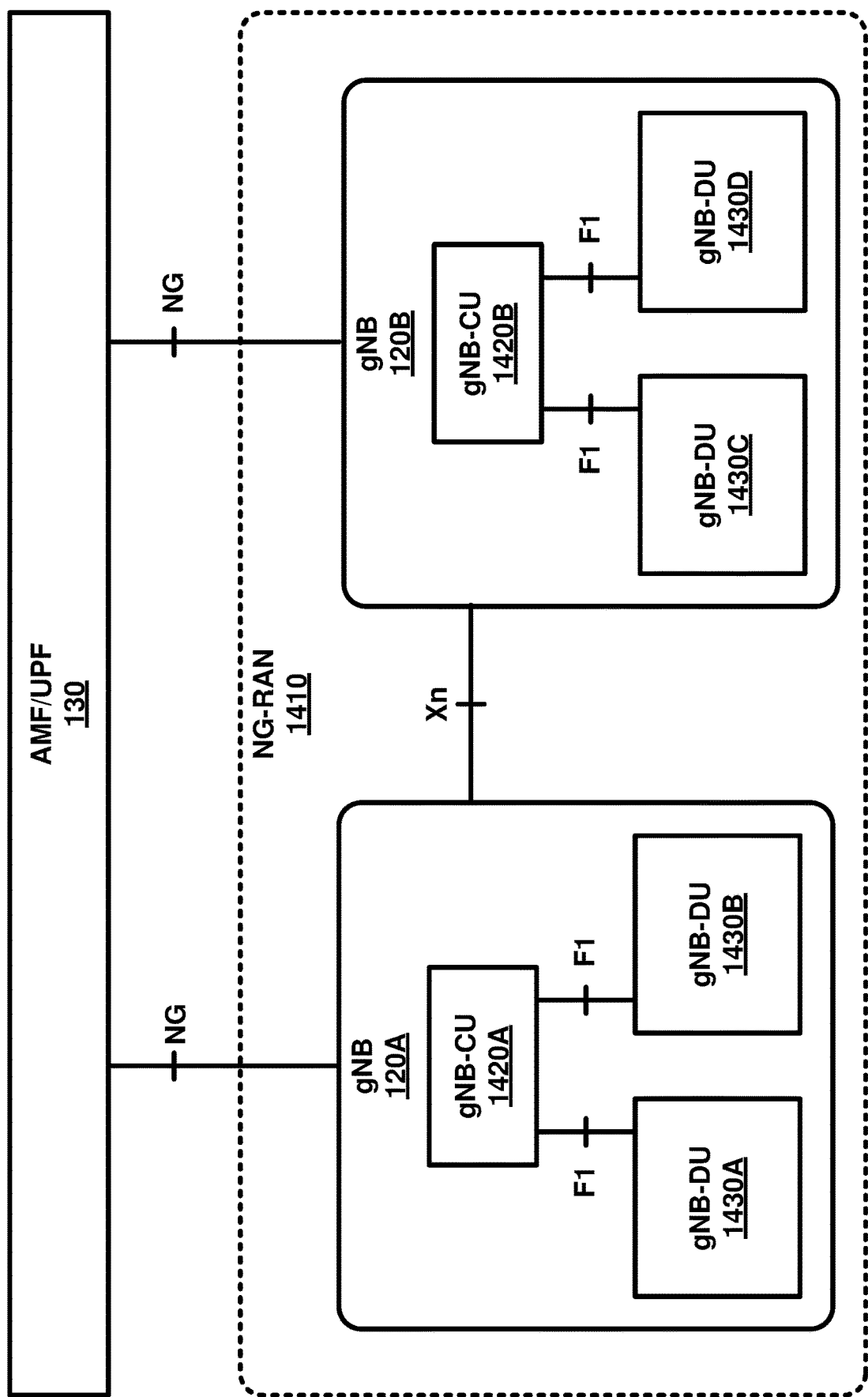
FIG. 14 is a diagram of a RAN architecture as per an aspect of an example embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
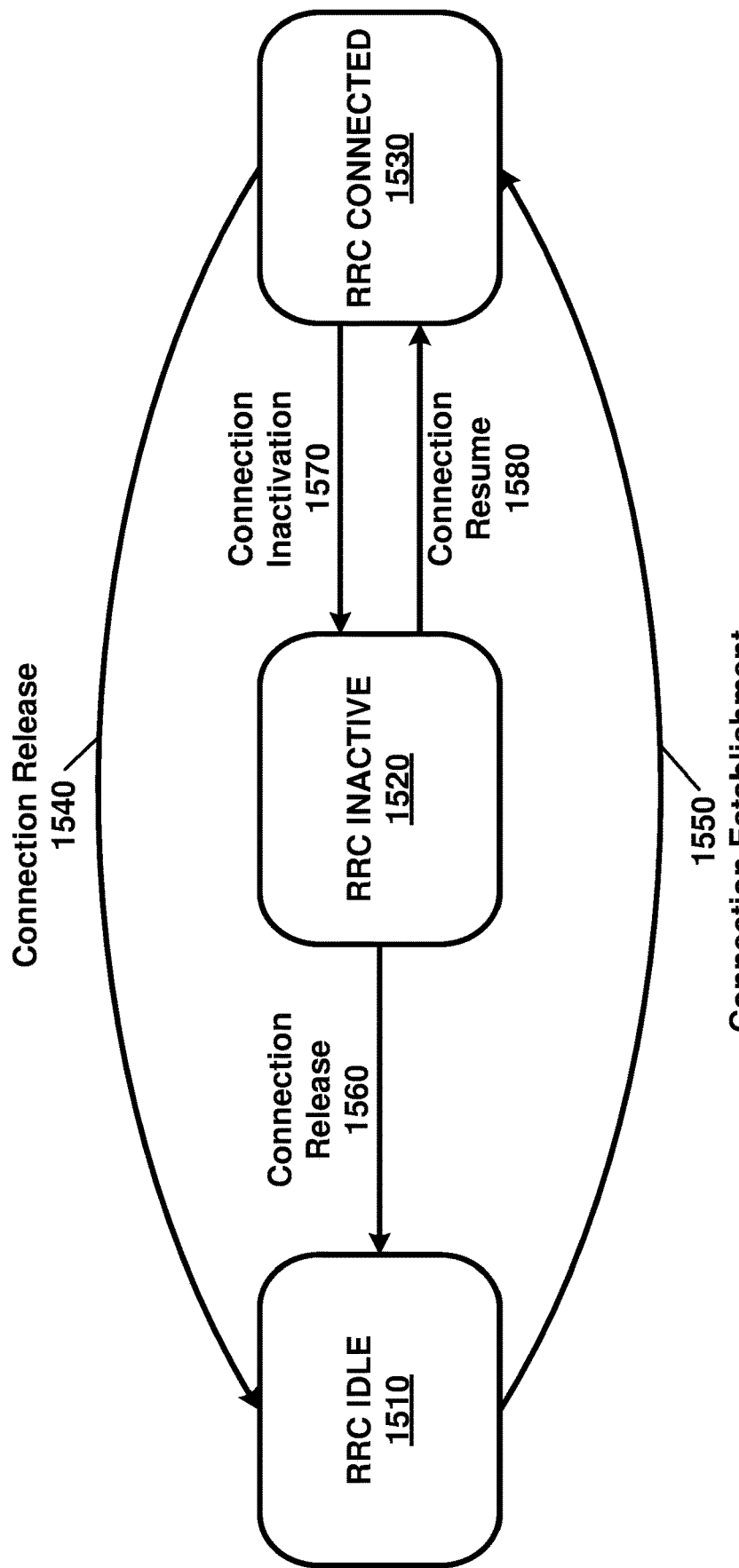
FIG. 15 is a diagram of RRC states as per an aspect of an example embodiment of the present disclosure.

FIG. 15 is an example diagram showing RRC state transitions of a wireless device. In an example, a wireless device may be in at least one RRC state among an RRC connected state (e.g. RR Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission.

Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

In an example, an IE BWP may be used to configure generic parameters of a bandwidth part. For a serving cell, the network may configure at least an initial downlink bandwidth part and one (if the serving cell is configured with an uplink) or two (if using supplementary uplink (SUL)) initial uplink bandwidth parts. Furthermore, the network may configure additional uplink and downlink bandwidth parts for a serving cell. In an example, the uplink and downlink bandwidth part configurations may be divided into common and dedicated parameters.

In an example, the parameter cyclicPrefix may indicate whether to use the extended cyclic prefix for a bandwidth part. If not set, the UE may the normal cyclic prefix. Normal CP may be supported for all subcarrier spacings and slot formats. Extended CP may be supported for 60 kHz subcarrier spacing. In an example, the parameter locationAndBandwidth may indicate frequency domain location and bandwidth of a bandwidth part. The value of the field may be interpreted as resource indicator value (RIV). The first PRB may be a PRB determined by subcarrierSpacing of this BWP and offsetToCarrier (configured in SCS-SpecificCarrier contained within FrequencyInfoDL/FrequencyInfoUL/FrequencyInfoUL-SIB/FrequencyInfoDL-SIB within ServingCellConfigCommon/ServingCellConfigCommonSIB1) corresponding to this subcarrier spacing. In case of TDD, a BWP-pair (UL BWP and DL BWP with the same bwp-Id) may have the same center frequency. In an example, the parameter subcarrierSpacing may indicate subcarrier spacing to be used in this BWP for channels and reference signals unless explicitly configured elsewhere.

In an example, the IE BWP-Downlink may be used to configure an additional downlink bandwidth part (not for the initial BWP). The parameter bwp-Id may be an identifier for this bandwidth part. Other parts of the RRC configuration may use the BWP-Id to associate themselves with a particular bandwidth part.

The network configures the BWPs with consecutive IDs from 1. The Network may not include the value 0, since value 0 is reserved for the initial BWP.

In an example, the IE BWP-DownlinkCommon may be used to configure the common parameters of a downlink BWP. They may be "cell specific" and the network may ensure the necessary alignment with corresponding parameters of other UEs. The common parameters of the initial bandwidth part of the PCell may also be provided via system information. For all other serving cells, the network provides the common parameters via dedicated signalling. The parameter pdcch-ConfigCommon may be cell specific parameters for the PDCCH of this BWP. The parameter pdsch-ConfigCommon may be cell specific parameters for the PDSCH of this BWP.

In an example, the IE BWP-DownlinkDedicated may be used to configure the dedicated (UE specific) parameters of a downlink BWP.

The parameter pdcch-Config may be UE specific PDCCH configuration for one BWP. The parameter pdsch-Config may be UE specific PDSCH configuration for one BWP. The parameter sps-Config may be UE specific SPS (Semi-Persistent Scheduling) configuration for one BWP. Except for reconfiguration with sync, the base station may not reconfigure sps-Config when there is an active configured downlink assignment, the base station may release the sps-Config at any time.

In an example, the IE BWP-Id may be used to refer to Bandwidth Parts (BWP). The initial BWP may be referred to by BWP-Id 0. The other BWPs may referred to by BWP-Id 1 to maxNrofBWPs.

In an example, the IE BWP-Uplink may be used to configure an additional uplink bandwidth part (not for the initial BWP). The parameter bwp-Id may be an identifier for this bandwidth part. Other parts of the RRC configuration may use the BWP-Id to associate themselves with a particular bandwidth part.

The network may configure the BWPs with consecutive IDs from 1. The Network may not include the value 0, since value 0 may be reserved for the initial BWP.

In an example, the IE BWP-UplinkCommon may be used to configure the common parameters of an uplink BWP. They may be "cell specific" and the network may ensures the necessary alignment with corresponding parameters of other UEs. The common parameters of the initial bandwidth part of the PCell may also be provided via system information. For all other serving cells, the network provides the common parameters via dedicated signalling.

In an example, the parameter pucch-ConfigCommon may be cell specific parameters for the PUCCH of this BWP. In an example, pusch-ConfigCommon may be cell specific parameters for the PUSCH of this BWP. In an example, rach-ConfigCommon may be cell specific random access parameters which the UE uses for contention based and contention free random access as well as for contention based beam failure recovery in this BWP. The NW may configure SSB-based RA (and hence RACH-ConfigCommon) for UL BWPs if the linked DL BWPs (same bwp-Id as UL-BWP) are the initial DL BWPs or DL BWPs containing the SSB associated to the initial DL BWP. The network may configures rach-ConfigCommon, when it configures contention free random access (for reconfiguration with sync or for beam failure recovery).

In an example, the UE IE BWP-UplinkDedicated may be used to configure the dedicated (UE specific) parameters of an uplink BWP.

In an example, the parameter beamFailureRecoveryConfig may indicate configuration of beam failure recovery. If supplementaryUplink is present, the field may be present in one of the uplink carriers, either UL or SUL. The parameter configuredGrantConfig may be a Configured-Grant of type1 or type2. It may be configured for UL or SUL but in case of type1 not for both at a time. Except for reconfiguration with sync, the NW may not reconfigure configuredGrantConfig when there is an active configured uplink grant Type 2. However, the NW may release the configuredGrantConfig at any time. The parameter pucch-Config may be PUCCH configuration for one BWP of the normal UL or SUL of a serving cell. If the UE is configured with SUL, the network may configure PUCCH only on the BWPs of one of the uplinks (normal UL or SUL). The network may configure PUCCH-Config at least on non-initial BWP(s) for SpCell and PUCCH SCell. If supported by the UE, the network may configure at most one additional SCell of a cell group with PUCCH-Config (e.g., PUCCH SCell). In EN-DC, The NW may configure at most one serving cell per frequency range with PUCCH. And in EN-DC, if two PUCCH groups are configured, the serving cells of the NR PUCCH group in FR2 may use the same numerology. The NW may configure PUCCH for a BWP when setting up the BWP. The network may also add/remove the pucch-Config in an RRCReconfiguraiton with reconfigurationWithSync to move the PUCCH between the UL and SUL carrier of one serving. In other cases, modifications of a previously configured pucch-Config may be allowed.

If one (S)UL BWP of a serving cell is configured with PUCCH, other (S)UL BWPs must be configured with PUCCH, too. The parameter pusch-Config may be for PUSCH configuration for one BWP of the normal UL or SUL of a serving cell. If the UE is configured with SUL and if it has a PUSCH-Config for both UL and SUL, a carrier indicator field in DCI may indicate for which of the two to use an UL grant. The parameter srs-Config may be for uplink sounding reference signal configuration.

In an example, a UE may be configured for operation in bandwidth parts (BWPs) of a serving cell. The UE may be configured by higher layers for the serving cell a set of at most k bandwidth parts (BWPs) for receptions by the UE (DL BWP set) in a DL bandwidth by parameter BWP-Downlink and a set of at most m BWPs for transmissions by the UE (UL BWP set) in an UL bandwidth by parameter BWP-Uplink.

In an example, if a UE is not provided initialDownlinkBWP, an initial active DL BWP may be defined by a location and number of contiguous PRBs, starting from a PRB with the lowest index and ending at a PRB with the highest index among PRBs of a CORESET for Type0-PDCCH CSS set, and a SCS and a cyclic prefix for PDCCH reception in the CORESET for Type0-PDCCH CSS set; otherwise, the initial active DL BWP may be provided by initialDownlinkBWP. For operation on the primary cell or on a secondary cell, a UE may be provided an initial active UL BWP by initialuplinkBWP. If the UE is configured with a supplementary UL carrier, the UE may be provided an initial active UL BWP on the supplementary UL carrier by initialUplinkBWP in supplementaryUplink.

If a UE has dedicated BWP configuration, the UE may be provided by firstActiveDownlinkBWP-Id a first active DL BWP for receptions and by firstActiveUplinkBWP-Id a first active UL BWP for transmissions on a carrier of the primary cell.

For a DL BWP or UL BWP in a set of DL BWPs or UL BWPs, respectively, the UE may be provided the following parameters for the serving cell: a SCS by subcarrierSpacing; a cyclic prefix by cyclicPrefix; a common RB $N_{BWP}^{start}=0_{carrier}+RB_{start}$ and a number of contiguous RBs $N_{BWP}^{size}=L_{RB}$ provided by locationAndBandwidth that indicates an offset $RB_{start}$ and a length $L_{RB}$ as RIV, setting $N_{BWP}^{size}=275$, and a value $O_{carrier}$ provided by offsetToCarrier for the subcarrierSpacing; an index in the set of DL BWPs or UL BWPs by respective bwp-Id; and a set of BWP-common and a set of BWP-dedicated parameters by bwp-Common and bwp-Dedicated.

For unpaired spectrum operation, a DL BWP from the set of configured DL BWPs with index provided by bwp-Id may be linked with an UL BWP from the set of configured UL BWPs with index provided by bwp-Id when the DL BWP index and the UL BWP index are same. For unpaired spectrum operation, a UE may not expect to receive a configuration where the center frequency for a DL BWP is different than the center frequency for an UL BWP when the bwp-Id of the DL BWP is same as the bwp-Id of the UL BWP.

For a DL BWP in a set of DL BWPs of the PCell, or of the PUCCH-SCell, a UE may be configured CORESETs for every type of CSS sets and for USS. The UE may not expect to be configured without a CSS set on the PCell, or on the PUCCH-SCell, of the MCG in the active DL BWP.

If a UE is provided controlResourceSetZero and searchSpaceZero in PDCCH-ConfigSIB1 or PDCCH-ConfigCommon, the UE may determine a CORESET for a search space set from controlResourcesetZero, and may determine corresponding PDCCH monitoring occasions. If the active DL BWP is not the initial DL BWP, the UE may determine PDCCH monitoring occasions for the search space set if the CORESET bandwidth is within the active DL BWP and the active DL BWP has same SCS configuration and same cyclic prefix as the initial DL BWP.

For an UL BWP in a set of UL BWPs of the PCell or of the PUCCH-SCell, the UE may be configured resource sets for PUCCH transmissions.

A UE may receive PDCCH and PDSCH in a DL BWP according to a configured SCS and CP length for the DL BWP. A UE may transmit PUCCH and PUSCH in an UL BWP according to a configured SCS and CP length for the UL BWP.

If a bandwidth part indicator field is configured in DCI format 1_1, the bandwidth part indicator field value may indicate the active DL BWP, from the configured DL BWP set, for DL receptions. If a bandwidth part indicator field is configured in DCI format 0_1, the bandwidth part indicator field value may indicate the active UL BWP, from the configured UL BWP set, for UL. If a bandwidth part indicator field is configured in DCI format 0_1 or DCI format 1_1 and indicates an UL BWP or a DL BWP different from the active UL BWP or DL BWP, respectively, for an information field in the received DCI format 0_1 or DCI format 1_1, if the size of the information field is smaller than the one required for the DCI format 0_1 or DCI format 1_1 interpretation for the UL BWP or DL BWP that is indicated by the bandwidth part indicator, respectively, the UE may prepend zeros to the information field until its size is the one required for the interpretation of the information field for the UL BWP or DL BWP prior to interpreting the DCI format 0_1 or DCI format 1_1 information fields, respectively. If the size of the information field is larger than the one required for the DCI format 0_1 or DCI format 1_1 interpretation for the UL BWP or DL BWP that is indicated by the bandwidth part indicator, respectively, the UE may use a number of least significant bits of DCI format 0_1 or DCI format 1_1 equal to the one required for the UL BWP or DL BWP indicated by bandwidth part indicator prior to interpreting the DCI format 0_1 or DCI format 1_1 information fields, respectively. The UE may set the active UL BWP or DL BWP to the UL BWP or DL BWP indicated by the bandwidth part indicator in the DCI format 0_1 or DCI format 1_1, respectively.

A UE does not expect to detect a DCI format 1_1 or a DCI format 0_1 indicating respectively an active DL BWP or an active UL BWP change with the corresponding time domain resource assignment field providing a slot offset value for a PDSCH reception or PUSCH transmission that is smaller than a delay required by the UE for an active DL BWP change or UL BWP.

In an example, if a UE detects a DCI format 1_1 indicating an active DL BWP change for a cell, the UE may not be required to receive or transmit in the cell during a time duration from the end of the third symbol of a slot where the UE receives the PDCCH that includes the DCI format 1_1 in a scheduling cell until the beginning of a slot indicated by the slot offset value of the time domain resource assignment field in the DCI format 1_1.

In an example, if a UE detects a DCI format 0_1 indicating an active UL BWP change for a cell, the UE may not be required to receive or transmit in the cell during a time duration from the end of the third symbol of a slot where the UE receives the PDCCH that includes the DCI format 0_1 in the scheduling cell until the beginning of a slot indicated by the slot offset value of the time domain resource assignment field in the DCI format 0_1.

In an example, a UE may not expect to detect a DCI format 1_1 indicating an active DL BWP change or a DCI format 0_1 indicating an active UL BWP change for a scheduled cell within FR1 (or FR2) in a slot other than the first slot of a set of slots for the DL SCS of the scheduling cell that overlaps with a time duration where the UE is not required to receive or transmit for an active BWP change in a different cell from the scheduled cell within FR1 (or FR2).

In an example, a UE may expect to detect a DCI format 0_1 indicating active UL BWP change, or a DCI format 1_1 indicating active DL BWP change, if a corresponding PDCCH is received within the first 3 symbols of a slot.

In an example, for a serving cell, a UE may be provided by defaultDownlinkBWP-Id a default DL BWP among the configured DL BWPs. If a UE is not provided a default DL BWP by defaultDownlinkBWP-Id, the default DL BWP may be the initial active DL BWP.

In an example, if a UE is provided by bwp-InactivityTimer a timer value for the primary cell and the timer is running, the UE may decrement the timer at the end of a subframe for FR1 or at the end of a half subframe for FR2 if the restarting conditions are not met during the interval of the subframe for FR1 or of the half subframe for FR2.

In an example, for a cell where a UE changes an active DL BWP due to a BWP inactivity timer expiration and for accommodating a delay in the active DL BWP change or the active UL BWP change required by the UE, the UE may not be required to receive or transmit in the cell during a time duration from the beginning of a subframe for FR1, or of half of a subframe for FR2, that is immediately after the BWP inactivity timer expires until the beginning of a slot where the UE can receive or transmit.

In an example, when a UE's BWP inactivity timer for a cell expires within a time duration where the UE is not required to receive or transmit for an active UL/DL BWP change in the cell or in a different cell, the UE may delay the active UL/DL BWP change triggered by the BWP inactivity timer expiration until a subframe for FR1 or half a subframe for FR2 that is immediately after the UE completes the active UL/DL BWP change in the cell or in the different cell.

In an example, if a UE is provided by firstActiveDownlinkBWP-Id a first active DL BWP and by firstActiveUplinkBWP-Id a first active UL BWP on a carrier of a secondary cell, the UE may use the indicated DL BWP and the indicated UL BWP as the respective first active DL BWP on the secondary cell and first active UL BWP on the carrier of the secondary cell.

In an example, for paired spectrum operation, a UE may not expect to transmit a PUCCH with HARQ-ACK information on a PUCCH resource indicated by a DCI format 1_0 or a DCI format 1_1 if the UE changes its active UL BWP on the PCell between a time of a detection of the DCI format 1_0 or the DCI format 1_1 and a time of a corresponding PUCCH transmission with HARQ-ACK information.

In an example, a UE may not expect to monitor PDCCH when the UE performs RRM measurementsover a bandwidth that is not within the active DL BWP for the UE.

In an example, the BWP switching for a Serving Cell may be used to activate an inactive BWP and deactivate an active BWP at a time. The BWP switching may be controlled by the PDCCH indicating a downlink assignment or an uplink grant, by the bwp-InactivityTimer, by RRC signalling, or by the MAC entity itself upon initiation of Random Access procedure. Upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively may be active without receiving PDCCH indicating a downlink assignment or an uplink grant. The active BWP for a Serving Cell may be indicated by either RRC or PDCCH. For unpaired spectrum, a DL BWP is paired with a UL BWP, and BWP switching is common for both UL and DL.

In an example, for an activated Serving cell configured with a BWP, if a BWP is activated, the MAC entity may transmit on UL-SCH on the BWP; transmit on RACH on the BWP, if PRACH occasions are configured; monitor the PDCCH on the BWP; transmit PUCCH on the BWP, if configured; report CSI for the BWP; transmit SRS on the BWP, if configured; receive DL-SCH on the BWP; and (re-)initialize any suspended configured uplink grants of configured grant Type 1 on the active BWP according to the stored configuration, if any, and to start in a symbol.

In an example, for an activated Serving cell configured with a BWP, if a BWP is deactivated, the MAC entity may not transmit on UL-SCH on the BWP; not transmit on RACH on the BWP; not monitor the PDCCH on the BWP; not transmit PUCCH on the BWP; not report CSI for the BWP; not transmit SRS on the BWP; not receive DL-SCH on the BWP; clear any configured downlink assignment and configured uplink grant of configured grant Type 2 on the BWP; suspend any configured uplink grant of configured grant Type 1 on the inactive BWP.

Upon initiation of the Random Access procedure on a Serving Cell, after the selection of carrier for performing Random Access procedure, if PRACH occasions are not configured for the active UL BWP, for the selected carrier of the serving cell, the MAC entity may switch the active UL BWP to BWP indicated by initialUplinkBWP. If the Serving Cell is a SpCell, the MAC entity may switch the active DL BWP to BWP indicated by initialDownlinkBWP.

Upon initiation of the Random Access procedure on a Serving Cell, after the selection of carrier for performing Random Access procedure, if PRACH occasions are configured for the active UL BWP, for the selected carrier of the serving cell, if the Serving Cell is a SpCell and if the active DL BWP does not have the same bwp-Id as the active UL BWP, the MAC entity may switch the active DL BWP to the DL BWP with the same bwp-Id as the active UL BWP.

Upon initiation of the Random Access procedure on a Serving Cell, after the selection of carrier for performing Random Access procedure, for the selected carrier of the serving cell, the MAC entity may stop the bwp-InactivityTimer associated with the active DL BWP of this Serving Cell, if running. If the serving cell is SCell, the MAC entity may stop the bwp-InactivityTimer associated with the active DL BWP of SpCell, if running. The MAC entity may perform the Random Access procedure on the active DL BWP of SpCell and active UL BWP of this Serving Cell.

In an example, if the MAC entity receives a PDCCH for BWP switching of a Serving Cell: if there is no ongoing Random Access procedure associated with this Serving Cell; or if the ongoing Random Access procedure associated with this Serving Cell is successfully completed upon reception of this PDCCH addressed to C-RNTI, the MAC entity may perform BWP switching to a BWP indicated by the PDCCH.

In an example, if the MAC entity receives a PDCCH for BWP switching for a Serving Cell while a Random Access procedure associated with that Serving Cell is ongoing in the MAC entity, it may be up to UE implementation whether to switch BWP or ignore the PDCCH for BWP switching, except for the PDCCH reception for BWP switching addressed to the C-RNTI for successful Random Access procedure completion in which case the UE may perform BWP switching to a BWP indicated by the PDCCH. Upon reception of the PDCCH for BWP switching other than successful contention resolution, if the MAC entity decides to perform BWP switching, the MAC entity may stop the ongoing Random Access procedure and initiate a Random Access procedure after performing the BWP switching; if the MAC decides to ignore the PDCCH for BWP switching, the MAC entity may continue with the ongoing Random Access procedure on the Serving Cell.

Upon reception of RRC (re-)configuration for BWP switching for a Serving Cell while a Random Access procedure associated with that Serving Cell is ongoing in the MAC entity, the MAC entity may stop the ongoing Random Access procedure and initiate a Random Access procedure after performing the BWP switching.

In an example, if the defaultDownlinkBWP-Id is configured, and the active DL BWP is not the BWP indicated by the defaultDownlinkBWP-Id; or if the defaultDownlinkBWP-Id is not configured, and the active DL BWP is not the initialDownlinkBWP: if a PDCCH addressed to C-RNTI or CS-RNTI indicating downlink assignment or uplink grant is received on the active BWP; or if a PDCCH addressed to C-RNTI or CS-RNTI indicating downlink assignment or uplink grant is received for the active BWP; or if a MAC PDU is transmitted in a configured uplink grant or received in a configured downlink assignment: if there is no ongoing Random Access procedure associated with this Serving Cell; or if the ongoing Random Access procedure associated with this Serving Cell is successfully completed upon reception of this PDCCH addressed to C-RNTI, the MAC entity may start or restart the bwp-InactivityTimer associated with the active DL BWP.

In an example, if the defaultDownlinkBWP-Id is configured, and the active DL BWP is not the BWP indicated by the defaultDownlinkBWP-Id; or if the defaultDownlinkBWP-Id is not configured, and the active DL BWP is not the initialDownlinkBWP: if the bwp-InactivityTimer associated with the active DL BWP expires: if the defaultDownlinkBWP-Id is configured: the MAC entity may perform BWP switching to a BWP indicated by the defaultDownlinkBWP-Id.

In an example, if the defaultDownlinkBWP-Id is configured, and the active DL BWP is not the BWP indicated by the defaultDownlinkBWP-Id; or if the defaultDownlinkBWP-Id is not configured, and the active DL BWP is not the initialDownlinkBWP: if the bwp-InactivityTimer associated with the active DL BWP expires: if the defaultDownlinkBWP-Id is not configured: the MAC entity may perform BWP switching to the initialDownlinkBWP.

In an example, if a Random Access procedure is initiated on an SCell, both this SCell and the SpCell may be associated with this Random Access procedure.

In an example, if a PDCCH for BWP switching is received, and the MAC entity switches the active DL BWP: if the defaultDownlinkBWP-Id is configured, and the MAC entity switches to the DL BWP which is not indicated by the defaultDownlinkBWP-Id; or if the defaultDownlinkBWP-Id is not configured, and the MAC entity switches to the DL BWP which is not the initialDownlinkBWP: the MAC entity may start or restart the bwp-InactivityTimer associated with the active DL BWP.

In an example, the IE PUCCH-Config may be used to configure UE specific PUCCH parameters (per BWP). The parameter dl_dataToUL-Ack may indicate a list of timing for given PDSCH to the DL ACK. The parameter format1 may indicate parameters that are common for all PUCCH resources of format 1. The parameter format2 may indicate parameters that are common for all PUCCH resources of format 2. The parameter format3 may indicate parameters that are common for all PUCCH resources of format 3. The parameter format4 may indicate parameters that are common for all PUCCH resources of format 4. The parameter resourceSetToAddModList may indicate list for adding and releasing PUCCH resource sets. The parameters resourceToAddModList and resourceToReleaseList may indicate lists for adding and releasing PUCCH resources applicable for the UL BWP and serving cell in which the PUCCH-Config is defined. The resources defined may be referred to from other parts of the configuration to determine which resource the UE may use for which report. The parameter spatialRelationInfoToAddModList may indicate configuration of the spatial relation between a reference RS and PUCCH. Reference RS can be SSB/CSI-RS/SRS. If the list has more than one element, MAC-CE may select a single element. The parameter format may indicate selection of the PUCCH format (format 0-4) and format-specific parameters. format0 and format1 may be allowed for a resource in a first PUCCH resource set. format2, format3 and format4 are only allowed for a resource in non-first PUCCH resource set. The parameter pucch-ResourceId may indicate an identifier of the PUCCH resource. The parameter resourceList may indicate between 1 and 32 resources. PUCCH resources of format2, format3 and format4 may be allowed in a PUCCH-ResourceSet with pucch-ResourceSetId>0. If present, these sets may contain between 1 and 8 resources each. The UE may choose a PUCCH-Resource from this list. The actual resources may be configured in PUCCH-Config.

In an example, the IE PUCCH-ConfigCommon may be used to configure the cell specific PUCCH parameters.

In an example, the IE PDCCH-Config may be used to configure UE specific PDCCH parameters such as control resource sets (CORESET), search spaces and additional parameters for acquiring the PDCCH. If this IE is used for the scheduled cell in case of cross carrier scheduling, the fields other than searchSpacesToAddModList and searchSpaceToReleaseList may be absent.

In an example, a controlResourceSetToAddModList parameter may indicate a list of UE specifically configured Control Resource Sets (CORESETs) to be used by the UE. The network may configure at most 3 CORESETs per BWP per cell (including UE-specific and common CORESETs). In case network reconfigures control resource set with the same ControlResourceSetId as used for commonControlResourceSet configured via PDCCH-ConfigCommon, the configuration from PDCCH-Config may take precedence and may not be updated by the UE based on servingCellConfigCommon. In an example, a downlinkPreemption parameter may indicate configuration of downlink pre-emption indications to be monitor in a cell. In an example, a searchSpacesToAddModList may indicate a list of UE specifically configured search spaces. The network may configure at most k Search Spaces per BWP per cell (e.g., including UE-specific and common Search Spaces).

In an example, the IE ControlResourceSet may be used to configure a time/frequency control resource set (CORESET) in which to search for downlink control information. The parameter controlResourceSetId may indicate an identifier of a control resource set. In an example, the parameter duration may indicate contiguous time duration of the CORESET in number of symbols. In an example, the parameter frequencyDomainResources may indicate frequency domain resources for the CORESET. A bit may correspond a group of 6 RBs, with grouping starting from the first RB group in the BWP. The first (left-most/most significant) bit may correspond to the first RB group in the BWP, and so on. A bit that is set to 1 may indicate that this RB group belongs to the frequency domain resource of this CORESET. Bits corresponding to a group of RBs not fully contained in the bandwidth part within which the CORESET is configured may be set to zero.

In an example, the ControlResourceSetId IE may concern a short identity, used to identify a control resource set within a serving cell. The ControlResourceSetId=0 may identify the ControlResourceSet #0 configured via PBCH (MIB) and in controlResourceSetZero (ServingCellConfigCommon). The ID space may be used across the BWPs of a Serving Cell. The number of CORESETs per BWP may be limited to k. (including common and UE-specific CORESETs).

Figure 39:
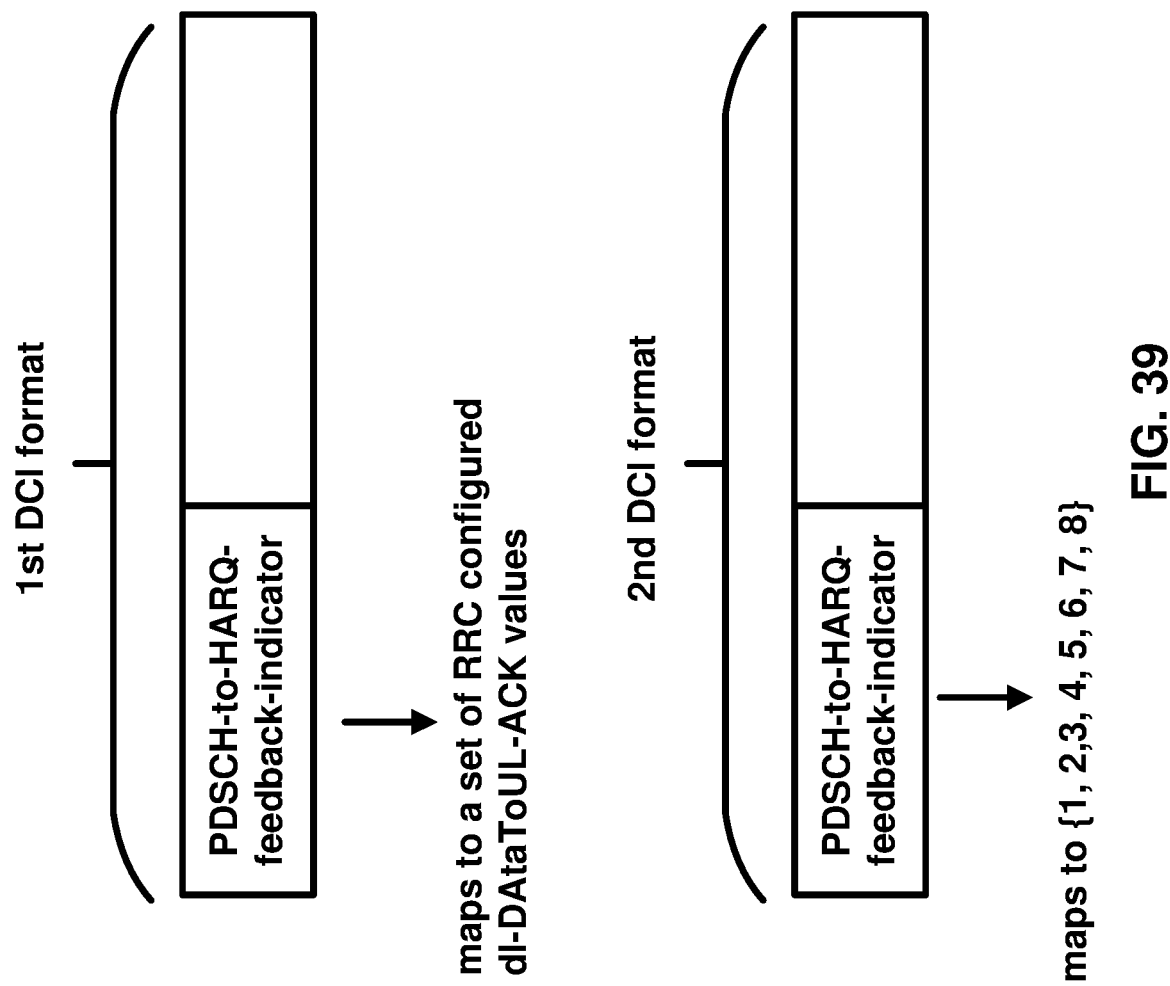
FIG. 39 illustrates an example HARQ feedback timing determination process as per an aspect of an example embodiment of the present disclosure.

In an example, a wireless device may receive a DCI for downlink scheduling of one or more transport blocks. The DCI may comprise a field indicating a timing from a downlink transport block to a corresponding HARQ feedback. The field may be called a PDSCH-to-HARQ-feedback-timing-indicator. Example DCI formats indicating HARQ feedback timing is shown in FIG. 39. In an example, for DCI format 1_0, the PDSCH-to-HARQ-timing-indicator field values may map to $\{1, 2, 3, 4, 5, 6, 7, 8\}$. For DCI format 1_1, if present, the PDSCH-to-HARQ-timing-indicator field values may map to values for a set of number of slots provided by dl-DataToUL-ACK.

For a SPS PDSCH reception ending in slot n, the UE may transmit the PUCCH in slot n+k where k is provided by the PDSCH-to-HARQ-timing-indicator field in DCI format 1_0 or, if present, in DCI format 1_1 activating the SPS PDSCH reception.

In an example, if the UE detects a DCI format 1_1 that does not include a PDSCH-to-HARQ-timing-indicator field and schedules a PDSCH reception or activates a SPS PDSCH reception ending in slot n, the UE may provide corresponding HARQ-ACK information in a PUCCH transmission within slot n+k where k is provided by dl-DataToUL-ACK.

With reference to slots for PUCCH transmissions, if the UE detects a DCI format 1_0 or a DCI format 1_1 scheduling a PDSCH reception ending in slot n or if the UE detects a DCI format 1_0 indicating a SPS PDSCH release through a PDCCH reception ending in slot n, the UE may provide corresponding HARQ-ACK information in a PUCCH transmission within slot n+k, where k is a number of slots and is indicated by the PDSCH-to-HARQ-timing-indicator field in the DCI format, if present, or provided by dl-DataToUL-ACK. k=0 may correspond to the last slot of the PUCCH transmission that overlaps with the PDSCH reception or with the PDCCH reception in case of SPS PDSCH release.

A PUCCH transmission with HARQ-ACK information may be subject to the limitations for UE transmissions.

For a PUCCH transmission with HARQ-ACK information, a UE may determine a PUCCH resource after determining a set of PUCCH resources for $O_{UCI}$ HARQ-ACK information bits. The PUCCH resource determination may be based on a PUCCH resource indicator field in a last DCI format 1_0 or DCI format 1_1, among the DCI formats 1_0 or DCI formats 1_1 that have a value of a PDSCH-to-HARQ_feedback timing indicator field indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH.

In an example, for sub-slot-based HARQ-ACK feedback procedure, a PDSCH to HARQ timing field in the DC may indicate a number of sub-slots from the sub-slot containing the end of PDSCH to the sub-slot containing the start of PUCCH. The wireless device may use an uplink numerology (e.g., numerology of an uplink control channel) to define a sub-slot grid for PDSCH-to-sub-slot association. The unit if the PDSCH to HARQ ACK timing may be in terms of subslot. A subslot may be configured in a slot for transmission of uplink control channel. A slot may be configured with one or more subslots. A subslot may comprise one or more symbols and a duration of a subslot may be smaller than a slot. For sub-slot-based HARQ-ACK feedback procedure, the starting symbol of a PUCCH resource may be defined with respect to the first symbol of sub-slot. For a given sub-slot configuration, a UE may be configured with PUCCH resource set(s). In an example, same PUCCH resource sets may be configured for different sub-slots within a slot. In an example, different PUCCH resource sets may be configured for different sub-slots within a slot.

Figure 40:
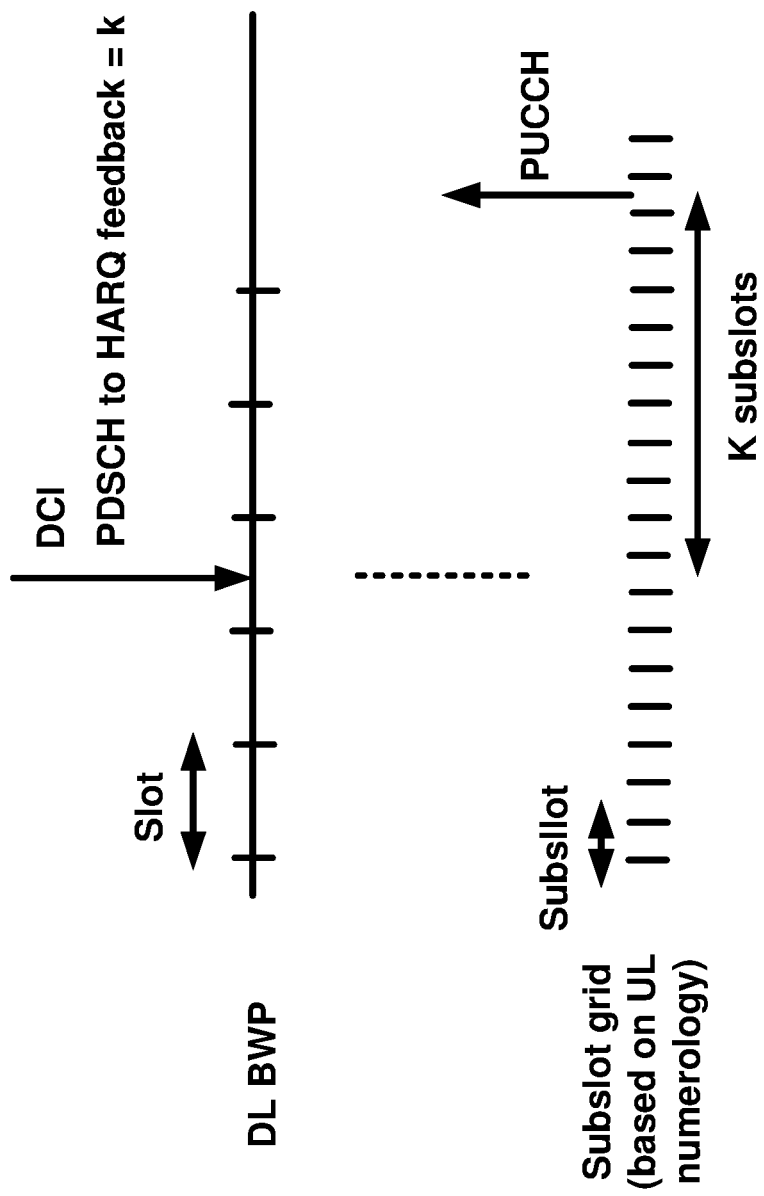
FIG. 40 illustrates an example HARQ feedback timing determination process as per an aspect of an example embodiment of the present disclosure.

In an example, the wireless device may be a virtual subslot grid based on UL numerology over DL and UL parts. HARQ-ACKs mapped into a subslot may be multiplexed into a PUCCH. In an example, a sub-slot duration may be 7 or 14 OFDM symbols. In an example, a subslot duration may be configured per BWP and HARQ procedure. The subslot grid may not be used for PDSCH scheduling. A PDSCH may start from any applicable symbol and with any applicable duration. An example is shown in FIG. 40.

In an example, for DCI-based BWP switch, after the UE receives BWP switching request at DL slot n on a serving cell, the UE may be able to receive PDSCH (for DL active BWP switch) or transmit PUSCH (for UL active BWP switch) on the new BWP on the serving cell on which BWP switch on the first DL or UL slot occurs right after the beginning of DLslot n+ TBWPswitchDelay.

In an example, for timer-based BWP switch, a UE may start BWP switch at DL slot n, where n is the beginning of a DL subframe (FR1) or DL half-subframe (FR2) after a BWP-inactivity timer bwp-InactivityTimer expires on a serving cell, and the UE may be able to receive PDSCH (for DL active BWP switch) or transmit PUSCH (for UL active BWP switch) on the new BWP on the serving cell on which BWP switch on the first DL or UL slot occurs after the beginning of DLslot n+ TBWPswitchDelay.

The UE may not transmit UL signals or receive DL signals during time duration TBWPswitchDelay on the cell where DCI-based BWP switch or timer-based BWP switch occurs.

Depending on UE capability bwp-SwitchingDelay, a UE may finish BWP switch within the time duration BWPswitchDelay. In an example, a wireless device may transmit one or more capability messages comprising a bwp-SwitchingDelay parameter indicating whether the UE supports DCI and timer based active BWP switching delay type1 or type2. It may be mandatory to report type 1 or type 2.

In existing HARQ feedback mechanisms with a dynamic bandwidth part (BWP) switching, a wireless device may drop transmission of a HARQ feedback corresponding to a transport block when a timing for transmission of the HARQ feedback (e.g., a PUCCH/PUSCH transmission timing for the HARQ feedback) is after a timing of BWP switching of a cell. For example, a base station may transmit a downlink control information (DCI) comprising a BWP index to indicate the BWP switching for the cell. For example, the cell may be a primary cell, configured with PUCCH resources. For example, the cell may be a secondary cell where the HARQ feedback may be transmitted via PUCCH resources of a primary cell or a PUCCH SCell. Implementation of existing mechanisms may lead to increased latency and reduced reliability of some applications (e.g., URLLC). Implementation of existing mechanisms for determining the timing of HARQ feedback may degrade the efficiency of HARQ feedback and degrade the network performance. For example, implementation of existing technologies, when a wireless device switches from a first bandwidth part (with a first numerology) to a second bandwidth part (with a second numerology) as an active bandwidth part, may result in misalignment in determination of HARQ feedback timing between a base station and a wireless device. There is a need to enhance the existing HARQ feedback process. Example embodiments enhance the existing mechanisms for HARQ feedback timing determination and reduce HARQ feedback losses.

In an example embodiment, as shown in FIGS. 16-22, 26-34, and 36-38, a wireless device may receive one or more messages comprising configuration parameters. The one or more messages may comprise one or more RRC messages. The one or more messages may comprise configuration parameters of a cell. The one or more messages may comprise configuration parameters of a plurality of bandwidth parts of the cell. The one or more messages may comprise configuration parameters of a first bandwidth part and/or a second bandwidth part of the cell. The configuration parameters of the first bandwidth part may indicate a first numerology of the first bandwidth part. The first numerology may indicate a first subcarrier spacing, a first cyclic prefix and one or more first parameters indicating frequency domain parameters of the first bandwidth part. In an example, the cell may be a primary cell. In an example, the cell may be a primary cell in a cell group (e.g., a primary secondary cell of a second cell group). In an example, the cell may be a secondary cell with configured resources for uplink control channel. In an example, the cell may be a secondary cell without configured resources for uplink control channel.

The one or more messages may comprise configuration parameters of an uplink control channel of the cell. The configuration parameters of the uplink control channel may indicate first uplink control channel (e.g., PUCCH) resources of the first bandwidth part of the cell and/or second PUCCH resources of the second bandwidth part of the cell. The wireless device may transmit uplink control information (e.g., HARQ ACK, CSI, SR, etc.) via at least an uplink control channel resource of an active bandwidth part of the cell.

The wireless device may receive a downlink control information (as shown in FIGS. 16-22, 26-34, and 36-38) indicating a HARQ feedback timing of a HARQ feedback of a transport block. In an example, the downlink control information may be for downlink scheduling of the transport block. The transport block may be a downlink transport block. The downlink control information may comprise a downlink assignment indicating transmission parameters of the transport block.

In an example, the downlink control information may comprise a field indicating a first downlink data to acknowledgement value (e.g., a first PDSCH-to-HARQ timing value) in a plurality of downlink data to acknowledgement values (e.g., a plurality of PDSCH-to-HARQ timing values). A downlink data to acknowledgement value (e.g., a PDSCH-to-HARQ timing value) may indicate a timing between a downlink data (e.g., a transport block or a PDSCH carrying the downlink data) and a HARQ feedback corresponding to the downlink data. In an example, the one or more (RRC) messages may indicate the plurality of downlink data to acknowledgement values. The downlink control information may comprise an index indicating the first downlink data to acknowledgement value in the plurality of downlink data to acknowledgement values. In an example, the plurality of downlink data to acknowledgement values may be pre-configured. In an example, the one or more (RRC) messages may be transmitted via UE-specific signaling. In an example, the one or more (RRC) messages may be transmitted via one or more system information block (SIB) messages.

In an example, based on a format of the downlink control information, the first downlink data to acknowledgement value may be one of the plurality of downlink data to acknowledgement values indicated by the one or more (RRC) messages or may be one of the plurality of pre-configured downlink data to acknowledgement values. For example, if the format of the downlink control information is a first format (e.g., DCI format 1_0), a value of a PDSCH to HARQ feedback timing field of the downlink control information may indicate one of a plurality of pre-configured data to acknowledgement values (e.g., {1, 2, 3, 4, 5, 6, 7, 8}). For example, if the format of the downlink control information is a second format (e.g., DCI format 1_1), a value of a PDSCH to HARQ feedback timing field of the downlink control information may indicate one of a plurality of RRC configured data to acknowledgement values.

In an example, the wireless device may determine the HARQ feedback timing based on the first downlink data to acknowledgement value and one or more first parameters. The one or more first parameters may be based on a numerology of an uplink control channel (e.g., numerology of the bandwidth part on which a resource of the uplink control channel is configured and the HARQ feedback is transmitted). In an example, the one or more first parameters may comprise a slot duration. In an example, the one or more first parameters may comprise a sub-slot duration. A subslot may comprise a plurality of symbols. The subslot duration may be smaller than a slot duration.

In an example, the transmitting the HARQ feedback may be via a resource of the uplink control channel of the cell in the second bandwidth part. The downlink control information may comprise a field indicating uplink control channel resources for transmission of the HARQ feedback. Based on transmitting the HARQ feedback in the uplink control channel resource of the second bandwidth part, the wireless device may determine the uplink control channel resource of the second bandwidth part using a value of the field and one or more other parameters.

In an example, one or more second parameters associated with the downlink control information may indicate that the downlink control information is for scheduling a first type of traffic/service. The wireless device may determine, based on the one or more second parameters associated with the downlink control information, that the downlink control information is for scheduling a first type of traffic/service. In an example, the first type of traffic/service may be ultra-reliable low-latency communication (URLLC) traffic/service type.

In an example, the one or more second parameters may comprise a format of the downlink control information. The wireless device may determine, based on the format of the downlink control information, that the downlink control information is for scheduling the first type of traffic/service. For example, a first DCI format may be used for URLLC and a second DCI format may be used for other services (e.g. eMBB and IoT services).

In an example, the one or more second parameters may comprise a radio network temporary identifier associated with the downlink control information. The wireless device may determine, based on the radio network temporary identifier associated with the downlink control information, that the downlink control information is for scheduling the first type of traffic/service. For example, if a received DCI corresponds to a first (pre-)configured RNTI, the DCI is for URLCC type of service. For example, a wireless device may determine a first DCI, cyclic redundancy check (CRC) scrambled with a first RNTI, schedule resource(s) for data corresponding to non-URLLC type of service (e.g., eMBB service). The wireless device may determine a second DCI, CRC scrambled with a second RNTI, schedule resource(s) for data corresponding to URLLC type of service. In an example, the first RNTI may be different from the second RNTI.

In an example, the one or more parameters may comprise a control resource set (CORESET) and/or a search space that the downlink control information is received. The wireless device may determine, based on the CORESET and/or the search space that the downlink control information is received, that the downlink control information is for scheduling the first type of traffic/service.

The downlink control information may comprise a downlink assignment comprising transmission parameters of the transport block. The wireless device may receive the transport block based on the downlink assignment and the transmission parameters. In an example, based on the one or more parameters associated with the downlink control information indicating that the downlink control information is for scheduling a first type of traffic/service, the transport block may comprise data of one or more logical channels associated with the first type of service/traffic. For example, RNTI for a DCI, DCI format, a value of a field in the DCI, the Coreset/search-space wherein the DCI is received, and/or the numerology indicated by the DCI may be used to determine a type of service of data in a transport block transmitted using the DCI.

In an example embodiment, after receiving the downlink control information, the wireless device may switch from the first bandwidth part of the cell to the second bandwidth part of the cell as an active bandwidth part of the cell. A switching timing of the switching from the first bandwidth part of the cell to the second bandwidth part of the cell may be earlier than the HARQ feedback timing indicated by the downlink control information. A wireless device may switch from a first bandwidth part to a second bandwidth part as an active bandwidth part based on receiving a DCI, a BWPinactivityTimer expiring, or other processes, for example initiating a random access process, beam failure process, LBT procedure, and/or the like.

In an example, the switching from the first bandwidth part of the cell to the second bandwidth part of the cell may be based on receiving a second downlink control information indicating switching from the first bandwidth part of the cell to the second bandwidth part of the cell as an active bandwidth part of the cell.

In an example, the second downlink control information may comprise an uplink grant for the second bandwidth part. The wireless device may switch from the first bandwidth part to the second bandwidth part in response to receiving the second downlink control information and may transmit a transport block via the second bandwidth part of the cell based on the uplink grant.

In an example, the second downlink control information may indicate an order for starting a random access process indicating a switching from the first bandwidth part to the second bandwidth part. The switching from the first bandwidth part to the second bandwidth part may be based on the second downlink control information indicating a random access on the first bandwidth part and no random access occasion being configured for the first bandwidth part. The second bandwidth part may be a default bandwidth part.

Figure 16:
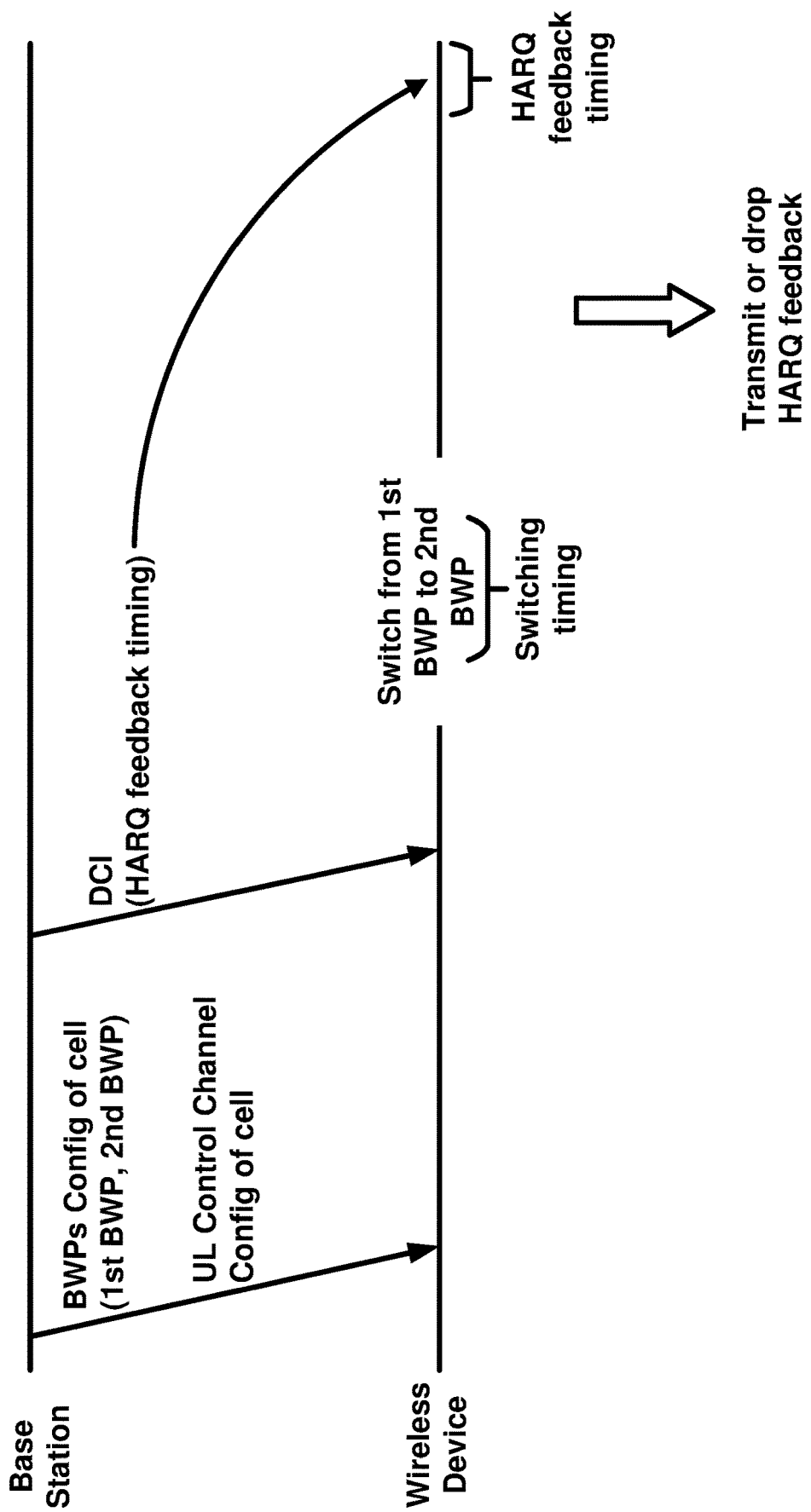
FIG. 16 illustrates an example process as per an aspect of an example embodiment of the present disclosure.

In an example embodiment as shown in FIG. 16, based on the switching timing of the switching from the first bandwidth part to the second bandwidth part being earlier than the HARQ feedback timing, indicated by the downlink control information, the wireless device may transmit, via the second bandwidth part (e.g., an uplink resource of the uplink control channel in the second bandwidth part), or drop the HARQ feedback. The wireless device may determine to transmit, via the second bandwidth part, or drop the HARQ feedback, based on the switching timing being earlier than the HARQ feedback timing. The base station transmits one or more messages indicating configuration parameters for the first bandwidth part and/or the second bandwidth part. The configuration parameters may also comprise PUCCH resources for uplink control channel (e.g., UL control channel config) for a cell. The base station may transmit a DCI indicating a HARQ feedback timing (e.g., PDSCH-to-HARQ) to the wireless device. After receiving the DCI, the wireless device may receive a triggering event (e.g., bwp-InactivityTimer) to switch from the first bandwidth part to the second bandwidth part. In response to the event, the wireless device may switch to the second bandwidth part as an active bandwidth part of the cell. The wireless device may determine whether a first timing of completing the switch is earlier than the indicated HARQ feedback timing or not. When the first timing is earlier than the indicated HARQ feedback timing and the HARQ feedback is associated or is for URLLC service, the wireless device transmits the HARQ feedback. Otherwise, the wireless device may drop the HARQ feedback.

Figure 17:
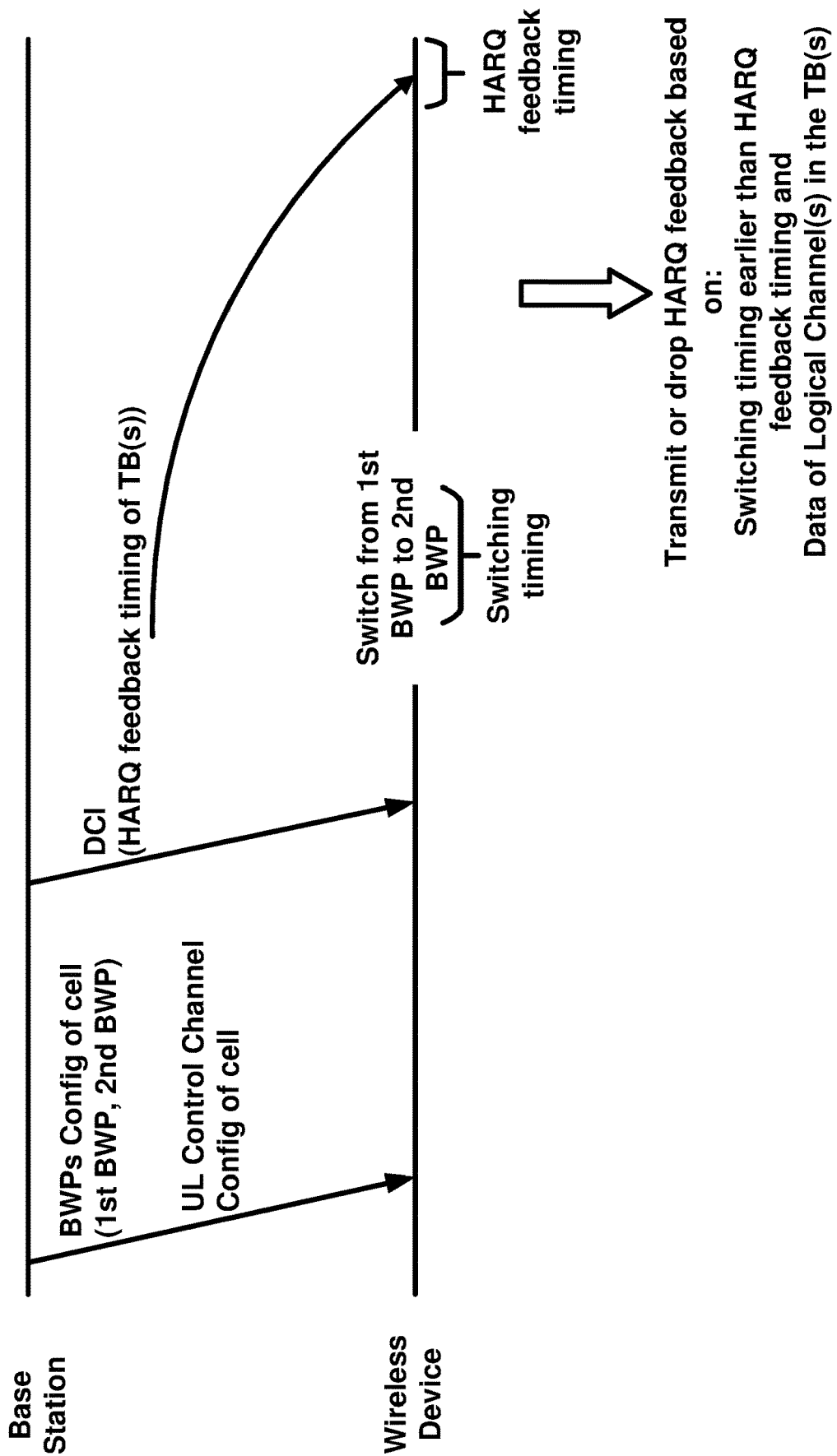
FIG. 17 illustrates an example process as per an aspect of an example embodiment of the present disclosure.

In an example embodiment as shown in FIG. 17, the wireless device may transmit or drop the HARQ feedback further based on one or more logical channels in the transport block. FIG. 17 illustrates a similar example to FIG. 16. In determining whether to transmit or drop the HARQ feedback, the wireless device may determine a logical channel of the transport block scheduled by the DCI. For example, the wireless device may transmit the HARQ feedback, via the second bandwidth part, based on the one or more logical channels corresponding to one or more first types of service/traffic. The one or more first types of service/traffic may comprise ultra-reliable low-latency communications (URLLC). The wireless device may drop the HARQ feedback of the transport block based on the one or more logical channels corresponding to one or more second service/traffic types. The one or more second service/traffic types may comprise an enhanced mobile broadband (eMBB) service/traffic type. In an example, the wireless device may determine the one or more logical channels in the transport block based on one or more logical channel identifiers. A MAC header of the transport block may indicate the one or more logical channel identifiers. In an example, the wireless device may determine the one or more logical channels based on one or parameters associated with the downlink control information (e.g., a format of the DCI, an RNTI associated with the DCI, a control resource set/search space associated with the DCI, e.g., a control resource set/search space in which the DCI is received, etc.).

Figure 18:
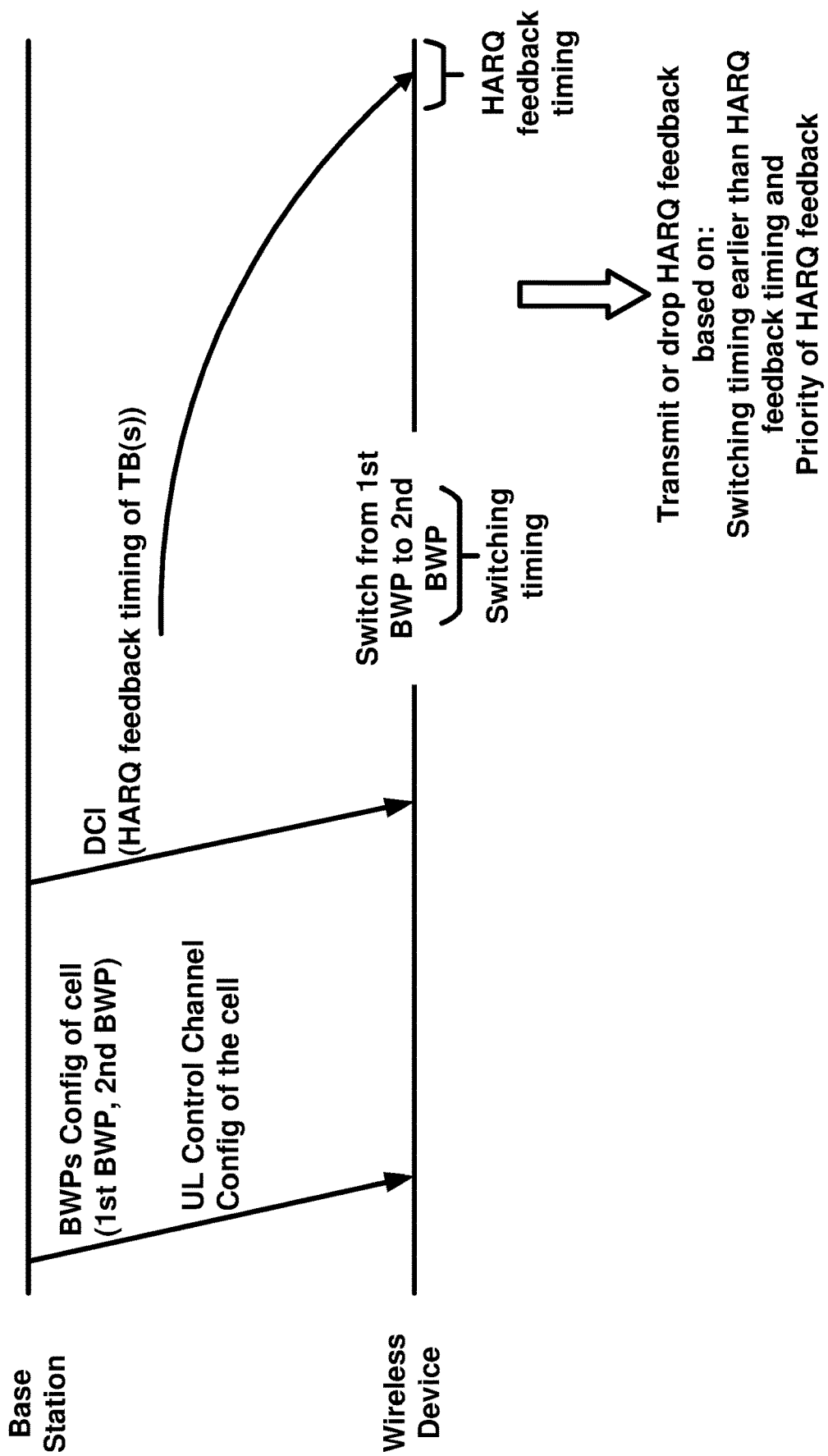
FIG. 18 illustrates an example process as per an aspect of an example embodiment of the present disclosure.

In an example embodiment as shown in FIG. 18, the wireless device may transmit or drop the HARQ feedback further based on a priority of HARQ feedback. FIG. 18 illustrates a similar example to FIG. 16 except for a condition/criteria used for determining whether to transmit or drop the HARQ feedback. In an example, the priority of HARQ feedback may be explicitly indicated by a DCI (e.g., the DCI scheduling the transport block). In an example, the DCI may comprise a field, a value of the field indicating the priority of the HARQ feedback. In an example, the DCI may comprise a field, a value of the field indicating a priority of the transport block. The priority of the transport block may be used for the priority of the HARQ feedback. The value may of the field may be one of the plurality of values. In an example, the plurality of values may be configured by RRC (e.g., the one or more messages may indicate the one or more values). In an example, the plurality of values may be pre-configured.

In an example, the priority of the HARQ feedback may be determined implicitly by the wireless device. In an example, the wireless device may implicitly determine the priority of the HARQ feedback based on one or more parameters associated with DCI (e.g., a format of the DCI, an RNTI associated with the DCI, a control resource set/search space associated with the DCI, e.g., a control resource set/search space in which the DCI is received, etc.).

Figure 19:
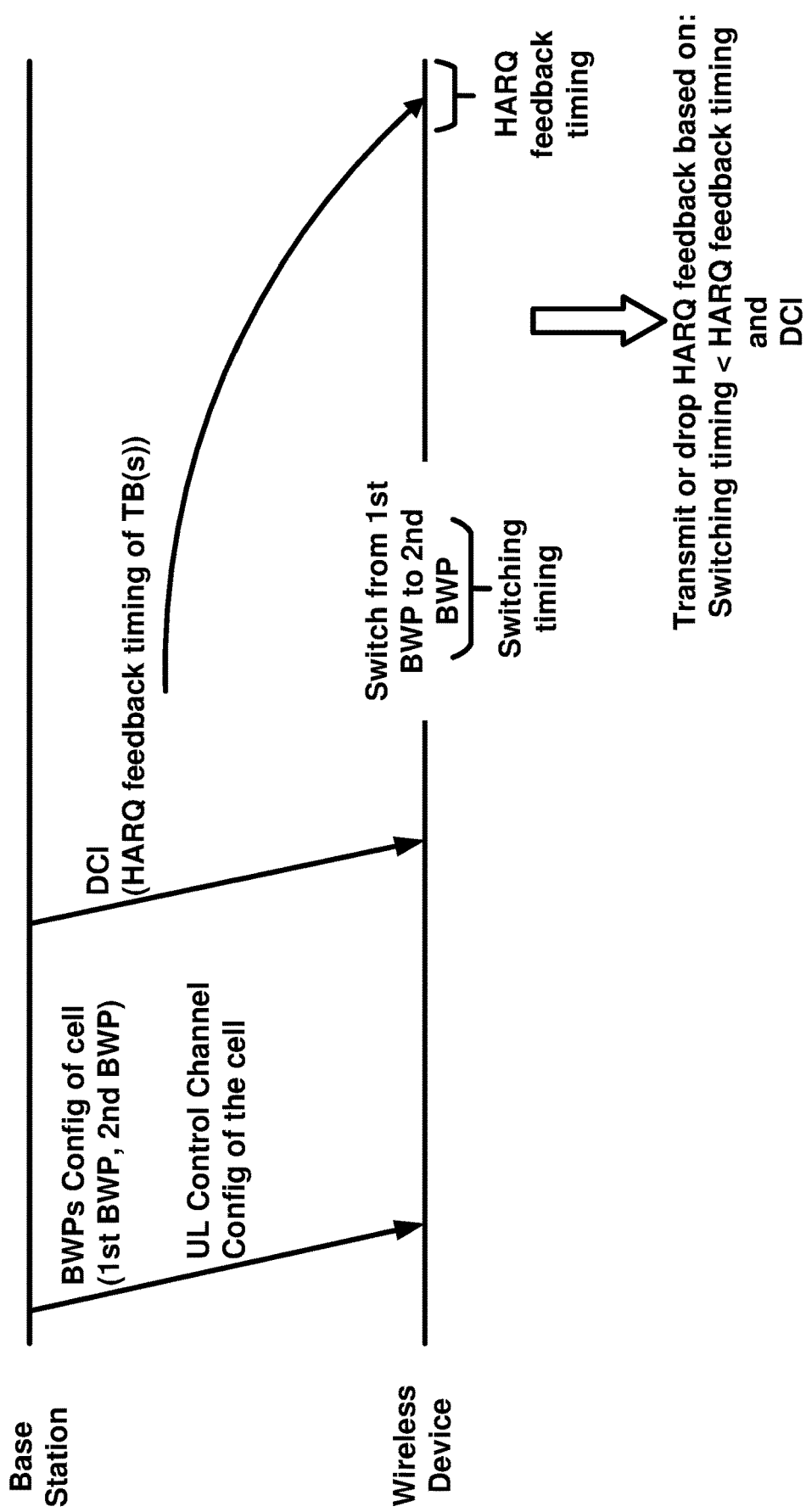
FIG. 19 illustrates an example process as per an aspect of an example embodiment of the present disclosure.

In an example embodiment as shown in FIG. 19, the wireless device may transmit or drop the HARQ feedback further based on downlink control information. FIG. 19 illustrates a similar example to FIG. 16 except for a condition/criteria used for determining whether to transmit or drop the HARQ feedback. In an example, the transmitting or dropping the HARQ feedback may be further based on a format of the downlink control information. The wireless device may detect the downlink control information. The wireless device may determine the format of the downlink control information based on the detection. In an example, further based on the format of the DCI being a first format (e.g., a DCI format 1_2, a new DCI format for URLLC service, a compact DCI, a DCI format associated with a search space with monitoring periodicity less than K OFDM symbols (e.g., K=14)), the wireless device may transmit the HARQ feedback. In an example, the first format may indicate a first service/traffic type. The first service/traffic type may be ultra-reliable low-latency communications (URLLC) service/traffic type. In an example, the first format may indicate a first priority (e.g., a first priority of the HARQ feedback associated with the transport block). In an example, further based on the format of the DCI being a second format, the wireless device may drop the HARQ feedback. In an example, the second format may indicate a second service/traffic type. The second service/traffic type may be enhanced mobile broadband (eMBB) service/traffic type. In an example, further based on a format of the DCI not being of the first format, the wireless device may drop the HARQ feedback.

In an example, the transmitting or dropping the HARQ feedback may be further based on a radio network temporary identifier associated with the DCI. The wireless device may detect the downlink control information. The wireless device may determine the radio network temporary identifier associated with the downlink control information based on the detection. In an example, further based on the RNTI associated with the DCI being a first RNTI, the wireless device may transmit the HARQ feedback. In an example, the first RNTI may indicate a first service/traffic type. The first service/traffic type may be ultra-reliable low-latency communications (URLLC) service/traffic type. In an example, the first RNTI may indicate a first priority (e.g., a first priority of the HARQ feedback associated with the transport block). In an example, further based on the RNTI associated with the DCI being a second RNTI, the wireless device may drop the HARQ feedback. In an example, the second RNTI may indicate a second service/traffic type. The second service/traffic type may be enhanced Mobile Broadband (eMBB) service/traffic type. In an example, further based on a RNTI associated with the DCI not being of the first RNTI, the wireless device may drop the HARQ feedback.

In an example, the downlink control information may be received in a control resource set (CORESET)/search space. The transmitting or dropping the HARQ feedback may be further based on the control resource set/search space. The wireless device may determine that the DCI is received in a first control resource set/search space. The wireless device may transmit the HARQ feedback based on the DCI being received in the first control resource set/search space. The first control resource set/search space may correspond to a first service/traffic type. The first service/traffic type may be ultra-reliable low-latency communications (URLLC) service/traffic type. In an example, the first control resource set/search space may indicate a first priority (e.g., a first priority of the HARQ feedback associated with the transport block). In an example, further based on the DCI being received in a second control resource set/search space, the wireless device may drop the HARQ feedback. In an example, the second control resource set/search space may indicate a second service/traffic type. The second service/traffic type may be enhanced Mobile Broadband (eMBB) service/traffic type. In an example, further based on a control resource set/search space that the DCI is received not being the first control resource set/search space, the wireless device may drop the HARQ feedback. In an example, the one or more messages may indicate the first control resource set/search space and the second control resource set/search space.

In an example, the transmitting or dropping the HARQ feedback of the transport block may be further based on a service/traffic type of the transport block. Based on the service/traffic type of the transport block being a first service/traffic type, the wireless device may transmit the HARQ feedback. The first service/traffic type may be ultra-reliable low-latency communications (URLLC). Based on the service/traffic type of the transport block being a second service/traffic type, the wireless device may drop the HARQ feedback. The second service/traffic type may be enhanced mobile broadband (eMBB). Based on the service/traffic type of the transport block not being the first service/traffic type, the wireless device may drop the HARQ feedback. The wireless device may determine the service/traffic type of the transport block. In an example, the wireless device may determine the service/traffic type based on the DCI scheduling the transport block and indicating the HARQ feedback timing. In an example, one or more parameters associated with the DCI may comprise a format of the DCI. In an example, one or more parameters associated with the DCI may comprise an RNTI associated with the DCI. In an example, one or more parameters associated with the DCI may comprise a control resource set/search space that the DCI is received.

In an example, the wireless device may determine a HARQ ACK codebook comprising HARQ feedback for transport blocks associated with a first type of traffic/service and/or DCI (e.g., format, RNTI, control resource set) and/or HARQ feedback priority. In an example, the first type of the traffic/service may be URLLC. In an example, the first type of traffic/service may be eMBB. In an example HARQ feedback corresponding to a first type of traffic/service and/or first DCI (e.g., first format, first RNTI, first control resource set) and/or first HARQ feedback priority may be transmitted in a first HARQ feedback codebook and HARQ feedback corresponding to a second type of traffic/service and/or second DCI (e.g., second format, second RNTI, second control resource set) and/or second HARQ feedback priority may be transmitted in a second HARQ feedback codebook. In an example, the first type of traffic/service may be URLLC and the second type of traffic/service may be eMBB.

Figure 20:
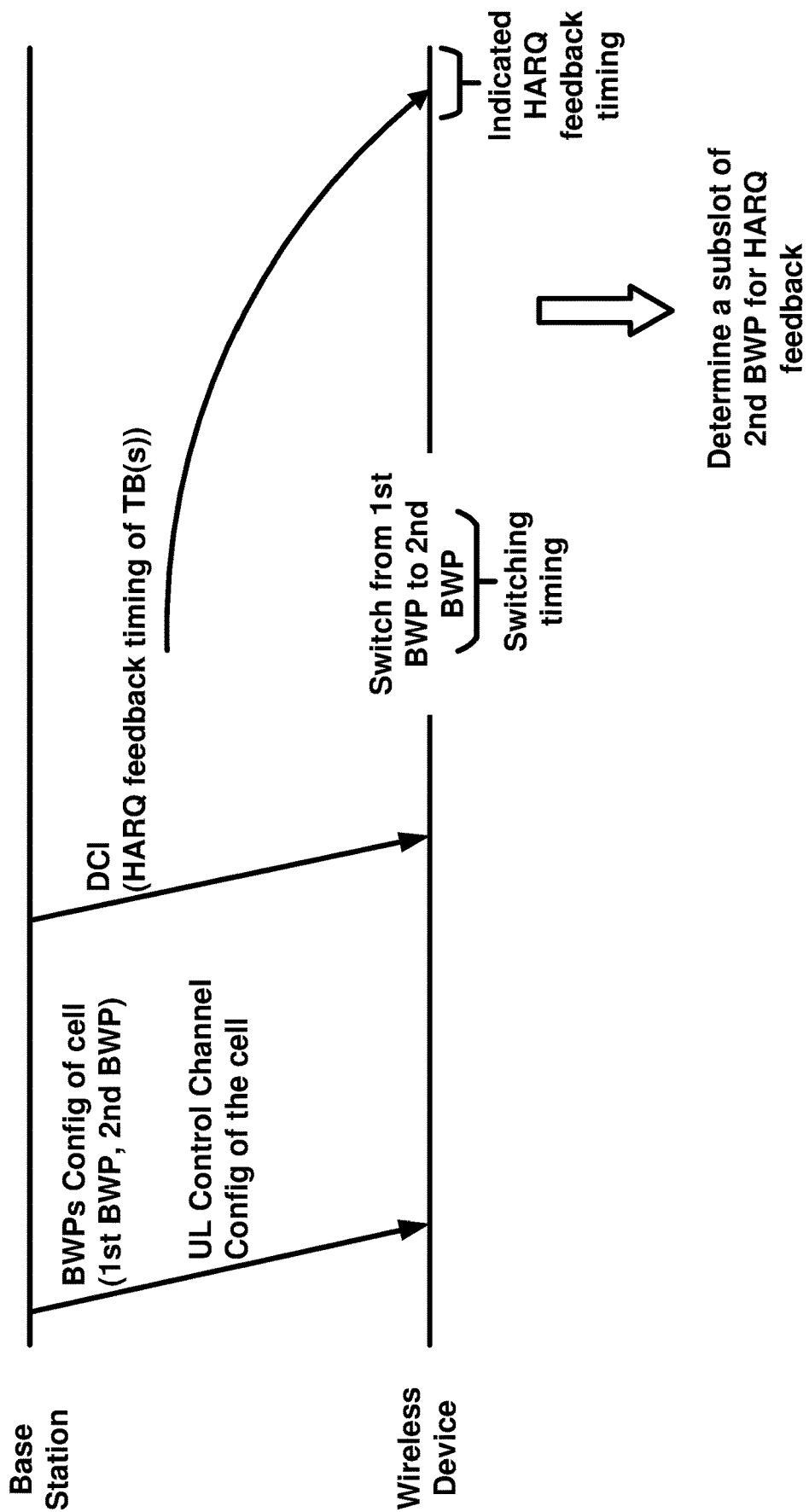
FIG. 20 illustrates an example process as per an aspect of an example embodiment of the present disclosure.

FIG. 20 illustrates an example embodiment of updating HARQ feedback timing in response to a BWP switching. In an example embodiment as shown in FIG. 20, after receiving the downlink control information, the wireless device may switch from the first bandwidth part of the cell to the second bandwidth part of the cell as an active bandwidth part of the cell. A switching timing of the switching from the first bandwidth part of the cell to the second bandwidth part of the cell may be earlier than the indicated HARQ feedback timing indicated by the downlink control information.

In an example, the switching from the first bandwidth part of the cell to the second bandwidth part of the cell may be based on receiving a second DCI indicating switching from the first bandwidth part of the cell to the second bandwidth part of the cell as an active bandwidth part of the cell.

In an example, the second DCI may comprise an uplink grant for the second bandwidth part. The wireless device may switch from the first bandwidth part to the second bandwidth part in response to receiving the second DCI and may transmit a transport block via the second bandwidth part of the cell based on the uplink grant.

In an example, the second DCI may indicate an order for starting a random access process indicating a switching from the first bandwidth part to the second bandwidth part. The switching from the first bandwidth part to the second bandwidth part may be based on the second DCI indicating a random access on the first bandwidth part and no random access occasion being configured for the first bandwidth part. The second bandwidth part may be a default bandwidth part.

The wireless device may determine a subslot or a slot of the second bandwidth part for transmission of HARQ feedback based on the switching timing being earlier than the HARQ feedback timing. The wireless device may determine one or more subslot grids or one or more slot grids based on one or more numerologies (e.g., the first numerology of the first bandwidth part and/or the second numerology of the second bandwidth part). The wireless device may determine the subslot or the slot of the second bandwidth part based on the one or more subslot grids or the one or more slot grids and a data to acknowledgement value. In an example, the DCI may indicate the data to acknowledgement value. In an example, the DCI may comprise a field, a value of the field indicating the data to acknowledgement value. In an example, the value of the field may indicate one of a plurality of downlink data to acknowledgement values. The one or more messages indicate the plurality of the downlink data to acknowledgement values or the plurality of the data to acknowledgement values may be pre-configured. For example, the value of the field may indicate four (4) that may correspond to an offset of four slots between a slot of a PDSCH carrying TB scheduled by the DCI and the HARQ feedback. The wireless device may determine four slots based on the second numerology of the second bandwidth part. For example, the value of field may indicate K subslots. The wireless device may determine/apply the K based on the second numerology of the second bandwidth part.

In an example, the configuration parameters may indicate the first numerology of the first bandwidth part. The first numerology of the first bandwidth part may indicate a plurality of values comprising a first subcarrier spacing, a first cyclic prefix, etc. The first numerology of the first bandwidth part may indicate a first subslot duration of a first subslot. The configuration parameters may indicate the second numerology of the second bandwidth part. The second numerology of the second bandwidth part may indicate a plurality of values comprising a second subcarrier spacing, a second cyclic prefix, etc. The second numerology of the second bandwidth part may indicate a second subslot duration of a second subslot. A subslot may comprise a plurality of symbols. A number of the plurality of the symbols may be configured by RRC or may be preconfigured or may be indicated by other signaling. A subslot duration may smaller than a slot duration. Various examples of determining the subslot duration for the HARQ feedback timing are shown in FIG. 21-FIG. 25. FIG. 21-FIG. 25 are similar examples to FIG. 16 focusing on determination of the subslot duration for determining the HARQ feedback timing.

Figure 21:
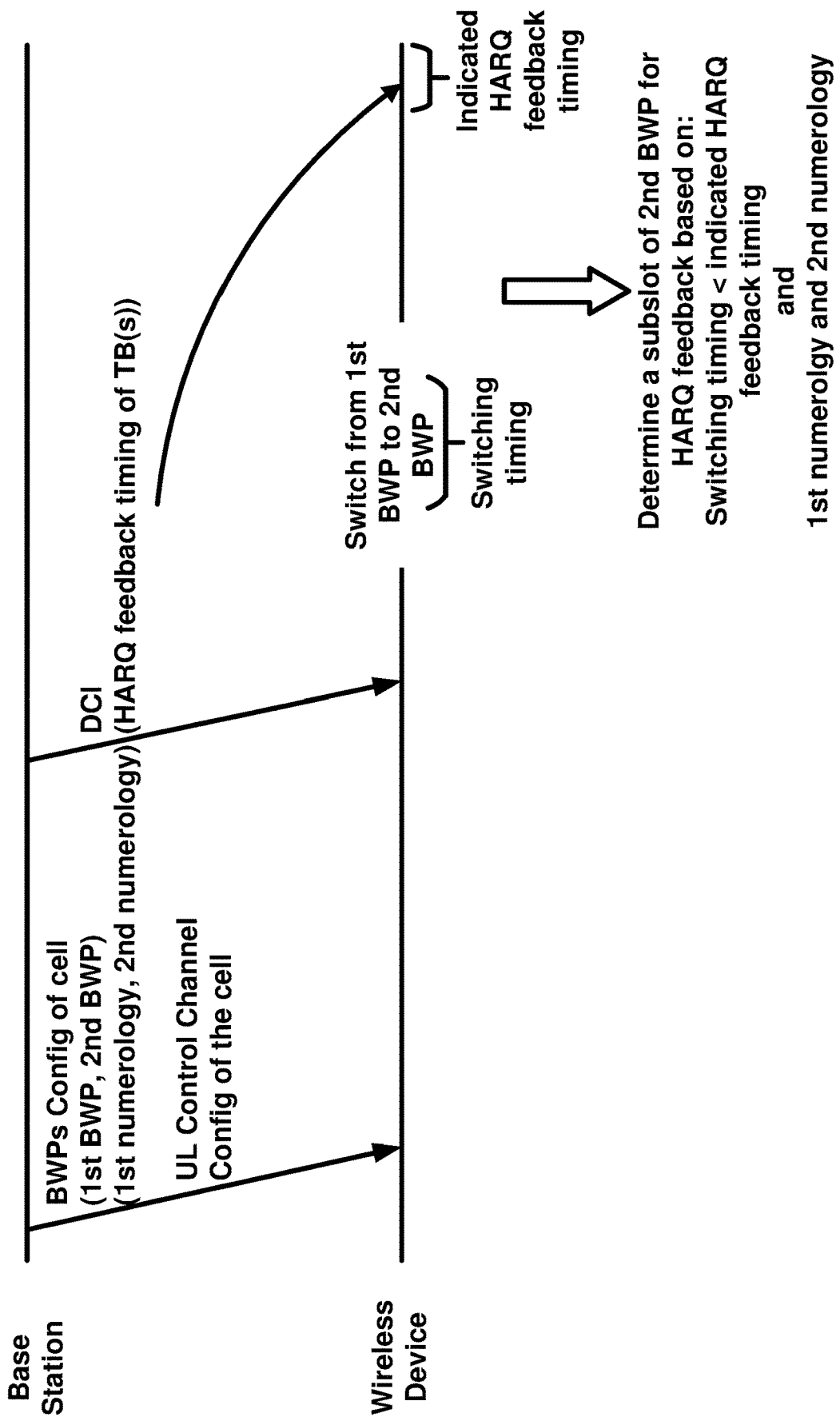
FIG. 21 illustrates an example process as per an aspect of an example embodiment of the present disclosure.
Figure 22:
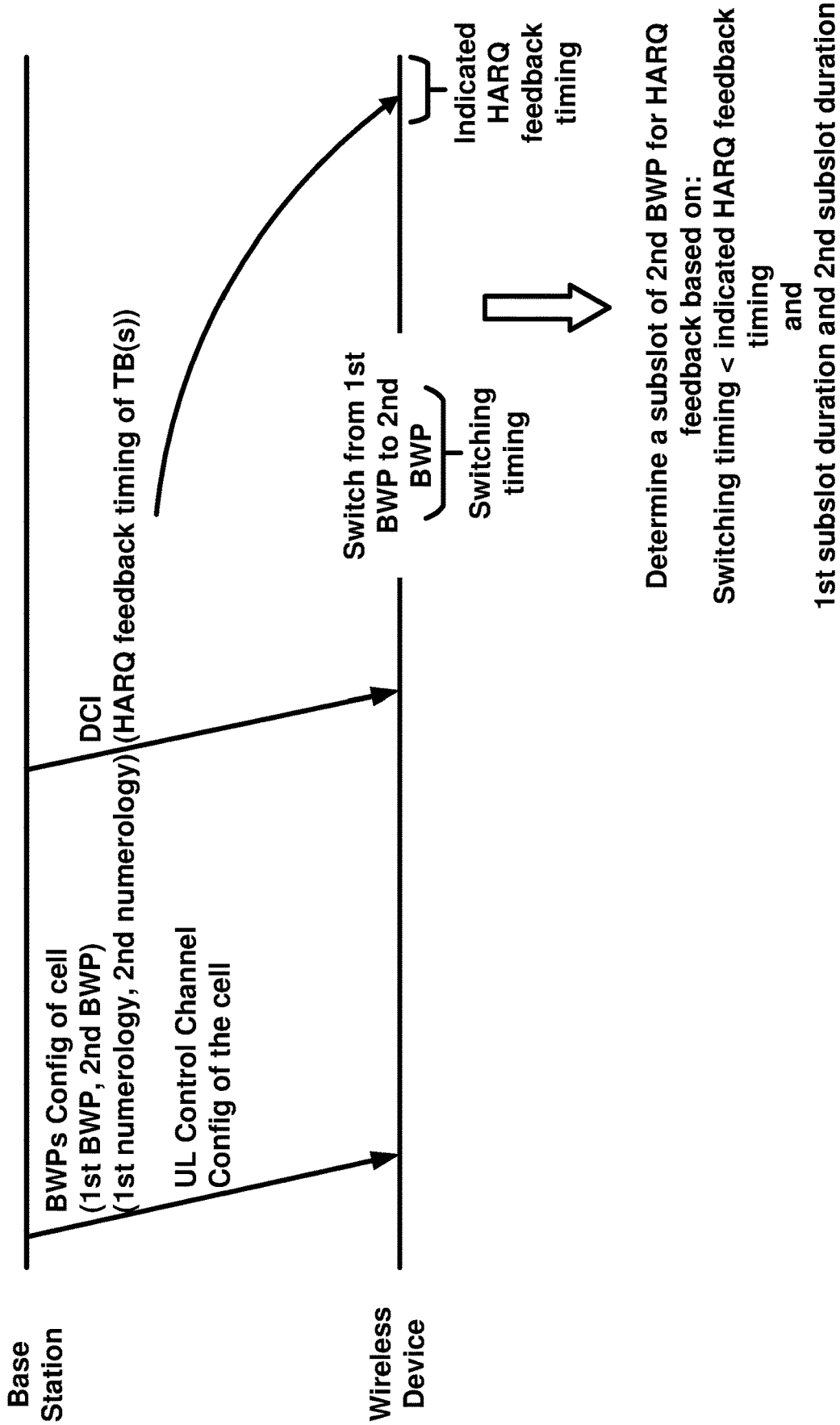
FIG. 22 illustrates an example process as per an aspect of an example embodiment of the present disclosure.

In an example embodiment as shown in FIG. 21, the determining the subslot for transmission of the HARQ feedback may be further based on the first numerology and the second numerology. In an example, as shown in FIG. 22, the determining of the subslot for transmission of the HARQ feedback may be further based on the first subslot duration and the second subslot duration.

Figure 23:
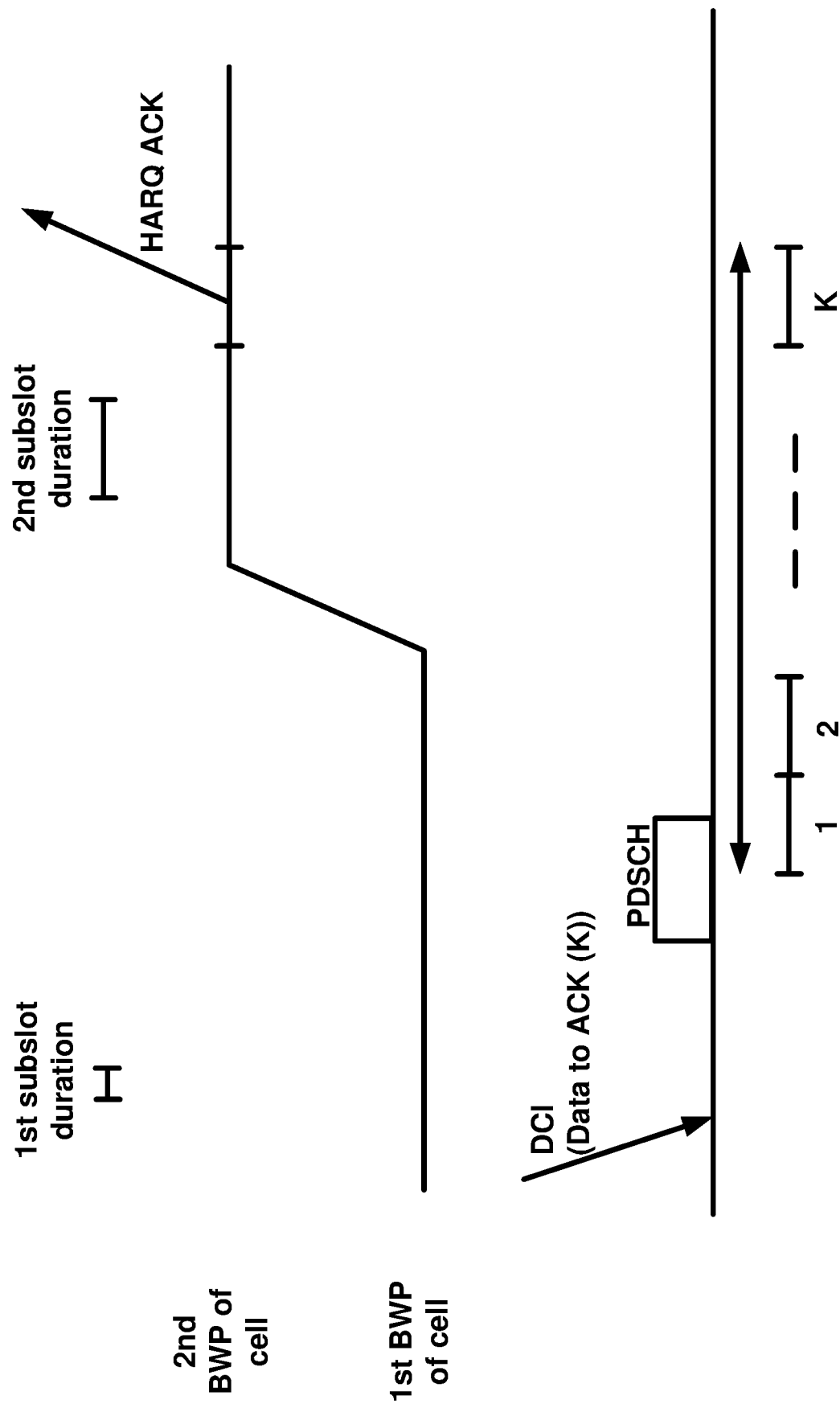
FIG. 23 illustrates an example process as per an aspect of an example embodiment of the present disclosure.

In an example, the determining the subslot duration may be based on the relative duration of the first subslot duration and the second subslot duration. The determining the subslot may be based on whether the first subslot duration is larger or smaller than the second subslot duration. In an example as shown in FIG. 23, the determining the subslot may be based on the second numerology/second subslot duration if the second subslot duration is larger than the first subslot duration. The wireless device may determine that switching the active bandwidth part of the cell from the first bandwidth part to the second bandwidth part increased the symbol duration and the subslot duration and may determine a subslot for transmission of the HARQ feedback based on the second subslot duration.

Figure 24:
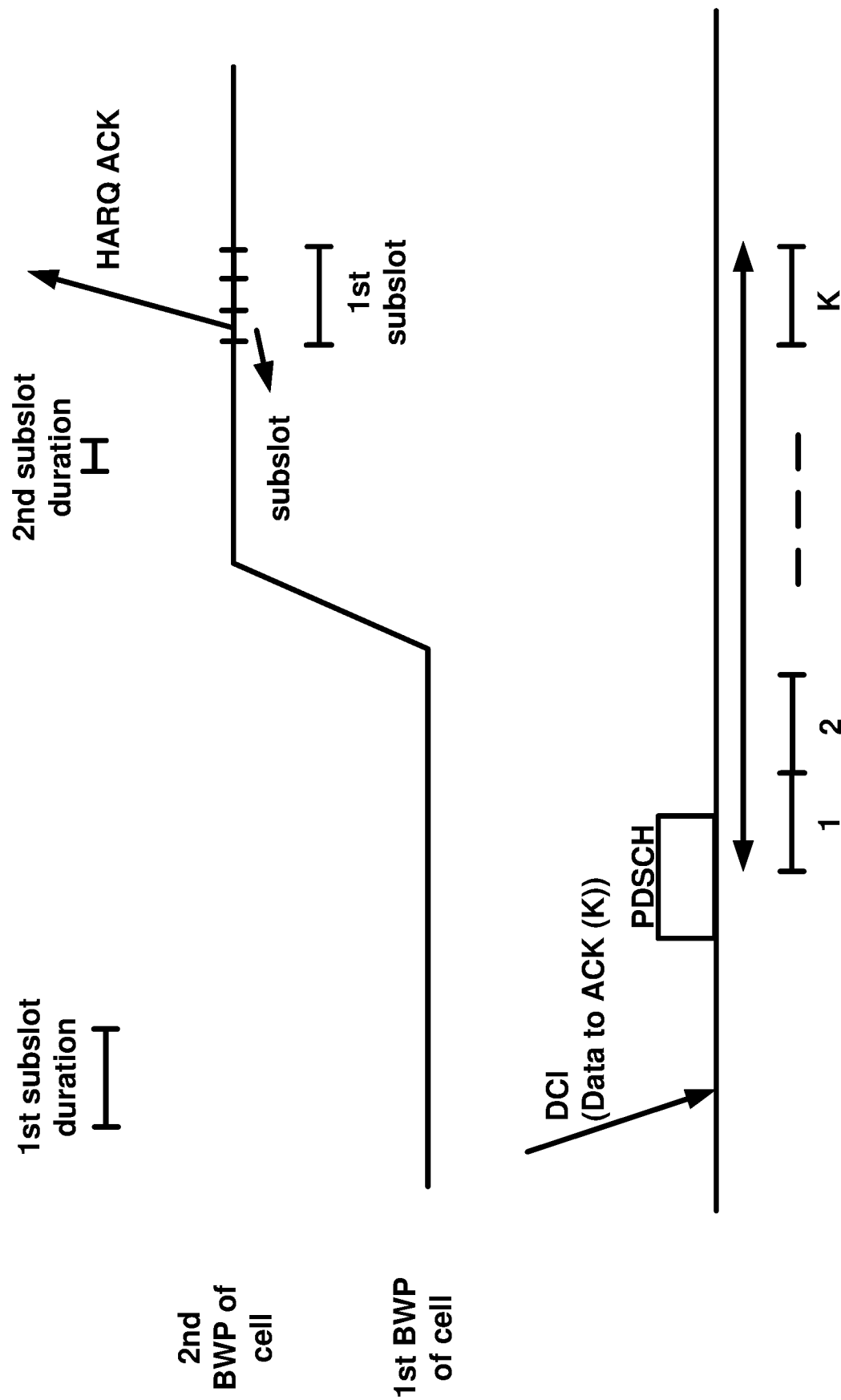
FIG. 24 illustrates an example process as per an aspect of an example embodiment of the present disclosure.
Figure 25:
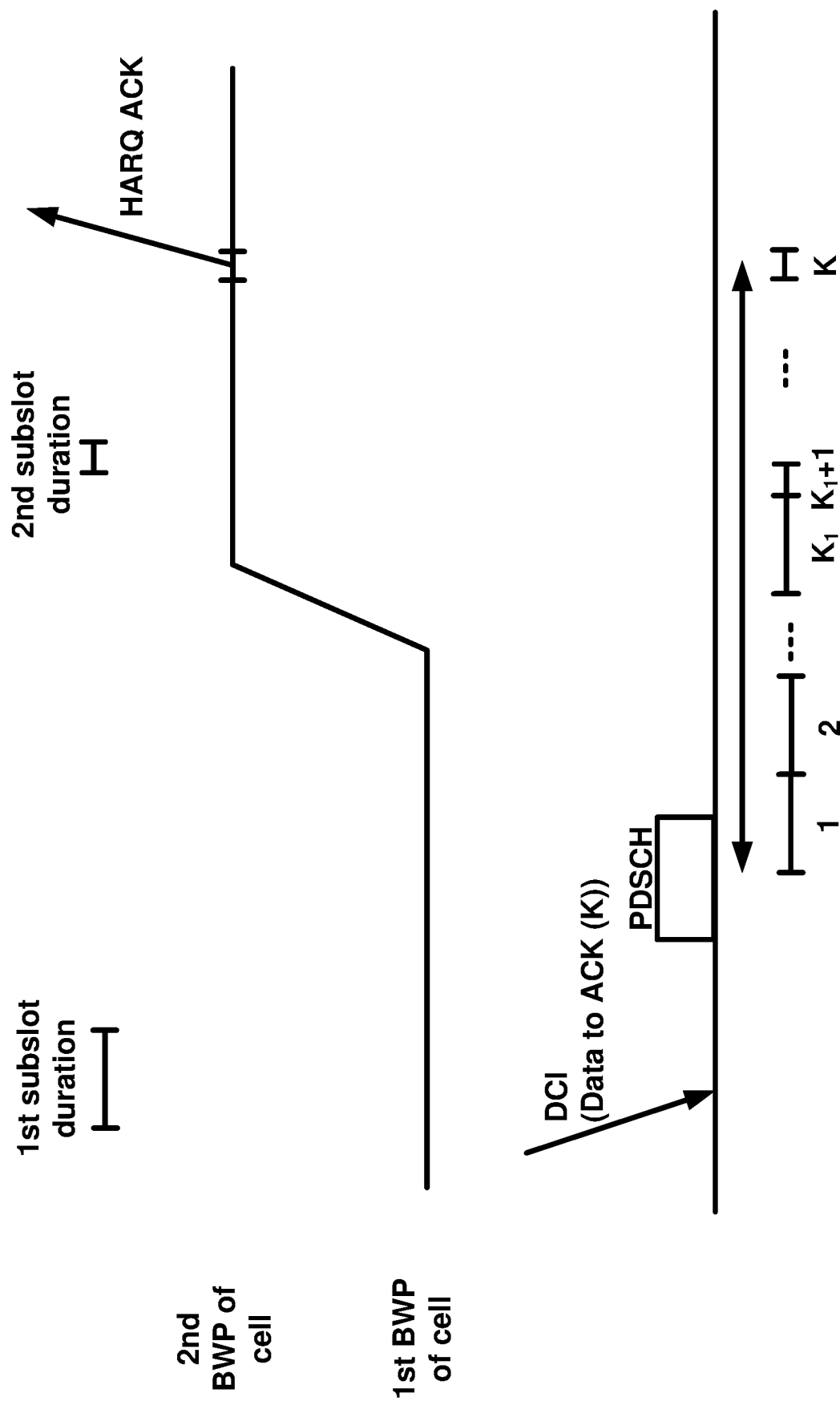
FIG. 25 illustrates an example process as per an aspect of an example embodiment of the present disclosure.

In an example embodiment as shown in FIG. 24, the determining the subslot for transmission of the HARQ feedback may comprise first determination of a first subslot based on the first numerology/subslot duration. The determining may further comprise a second determination of the subslot based on the second numerology/subslot duration, wherein the subslot overlaps with the first subslot. The determined subslot may overlap with the first slot in one or more symbols. In an example, a plurality of subslots with the second subslot duration may overlap with the first subslot. In an example, the subslot may be an earliest subslot in the plurality of subslots overlapping with the first subslot. In an example, the subslot may be mth (m=1, 2, . . . ) earliest subslot in the plurality of subslots overlapping with the first subslot. In an example, k may be pre-configured. In an example, m may be semi-statically configured or dynamically indicated to the wireless device. In an example embodiment as shown in FIG. 25, the determining the subslot may comprise first determination of a first subslot based on $K_1<K$ first subslot durations and second determination of the subslot based on $(K-K_1)$ second subslot durations. In an example, $K_1$ may be based on a timing of the switching from the first bandwidth part of the cell to the second bandwidth part of the cell. For example, K1 may be the number of subslots from the subslot containing the end of the PDSCH (via which the TB is received) until the subslot that bandwidth part switching takes place (e.g., the subslot that the switching transition from the first bandwidth part to the second bandwidth part starts or the subslot that the switching transition from the first bandwidth part to the second bandwidth part ends). In an example, the transition time for switching from the first bandwidth part to the second bandwidth part may be ignored (e.g., not considered/counted) for determining the K subslots from the PDSCH to HARQ feedback. For example, the transition time from the first bandwidth part to the second bandwidth part may not be considered for determining the remaining $K-K_1$ subslots.

In an example, the transition time for switching from the first bandwidth part to the second bandwidth part may be ignored (e.g., not considered/counted) for determining the K subslots from the PDSCH to HARQ feedback.

In an example embodiment, the determining may be based on the bandwidth part switching delay from the first bandwidth part to the second bandwidth part. The wireless device may determine the subslot based on the bandwidth part switching delay or a limit of the bandwidth part switching delay (e.g., an upper limit or a lower limit) or a value based on the bandwidth part switching delay (e.g., a pre-configured value or a semi-persistently configured value or a dynamically indicated value). In an example, the wireless device may transmit to the base station one or more capability messages indicating one or more wireless device capabilities comprising the wireless device bandwidth part switching capability. The bandwidth part switching capability may indicate a bandwidth part switching delay or a limit of bandwidth part switching delay (e.g., upper or lower limit). Based on receiving the one or more capability messages, the base station may indicate the value based on the bandwidth part switching delay (e.g., a pre-configured value or a semi-persistently configured value or a dynamically indicated value).

In an example embodiment, the wireless device may determine the subslot for transmitting the HARQ feedback further based on one or more logical channels in the transport block. The wireless device may determine the subslot based on the one or more logical channels corresponding to one or more first types of service/traffic. The one or more first types of service/traffic may comprise ultra-reliable low-latency communications (URLLC). In an example, the wireless device may determine the one or more logical channels in the transport block based on or more logical channel identifiers. A MAC header of the transport block may indicate the one or more logical channel identifiers. In an example, the wireless device may determine the one or more logical channels based on one or parameters associated with the DCI (e.g., a format of the DCI, an RNTI associated with the DCI, a control resource set/search space associated with the DCI, e.g., a control resource set/search space in which the DCI is received, etc.).

In an example embodiment, the wireless device may determine the subslot for transmitting the HARQ feedback further based on a priority of HARQ feedback. In an example, the priority of HARQ feedback may be explicitly indicated by a DCI (e.g., the DCI scheduling the transport block). In an example, the DCI may comprise a field, a value of the field indicating the priority of the HARQ feedback. The value of the field may be one of the plurality of values. In an example, the plurality of values may be configured by RRC (e.g., the one or more messages may indicate the one or more values). In an example, the plurality of values may be pre-configured.

In an example, the priority of the HARQ feedback may be determined implicitly by the wireless device. In an example, the wireless device may implicitly determine the priority of the HARQ feedback based on one or more parameters associated with DCI (e.g., a format of the DCI, an RNTI associated with the DCI, a control resource set/search space associated with the DCI, e.g., a control resource set/search space in which the DCI is received, etc.).

In an example embodiment, the wireless device may determine the subslot to transmit the HARQ feedback further based on downlink control information. In an example, the determining may be further based on a format of the downlink control information. The wireless device may detect the downlink control information. The wireless device may determine the format of the DCI based on the detection. In an example, further based on the format of the DCI being a first format, the wireless device may determine the subslot in the second bandwidth part based on a first process. In an example, the first format may indicate a first service/traffic type. The first service/traffic type may be ultra-reliable low-latency communications (URLLC) service/traffic type. In an example, further based on the format associated with the DCI being a second format, the wireless device may determine the subslot in the second bandwidth part based on a second process. In an example, the second format may indicate a second service/traffic type. The second service/traffic type may be enhanced Mobile Broadband (eMBB) service/traffic type. In an example, the first process may comprise employing a first subslot duration and the second process may comprise employing a second subslot duration. In an example, the first process may be based on a first numerology and the second process may be based on a second numerology. In an example, the second process may comprise dropping the HARQ feedback.

In an example, the determining the subslot for transmitting the HARQ feedback may be further based on a radio network temporary identifier associated with the DCI. The wireless device may detect the downlink control information. The wireless device may determine the radio network temporary identifier associated with the DCI based on the detection. In an example, further based on the RNTI associated with the DCI being a first RNTI, the wireless device may determine the subslot in the second bandwidth part base on a first process. In an example, the first RNTI may indicate a first service/traffic type. The first service/traffic type may be ultra-reliable low-latency communications (URLLC) service/traffic type. In an example, further based on the RNTI associated with the DCI being a second RNTI, the wireless device may determine the subslot in the second bandwidth part based on a second process. In an example, the second RNTI may indicate a second service/traffic type. The second service/traffic type may be enhanced Mobile Broadband (eMBB) service/traffic type. In an example, the first process may comprise employing a first subslot duration and the second process may comprise employing a second subslot duration. In an example, the first process may be based on a first numerology and the second process may be based on a second numerology. In an example, the second process may comprise dropping the HARQ feedback.

In an example, the DCI may be received in a control resource set (CORESET)/search space. The determining the subslot for transmitting the HARQ feedback may be further based on the control resource set/search space. The wireless device may determine that the DCI is received in a first control resource set/search space. The determining the subslot for transmitting the HARQ feedback may be based on a first process based on the DCI being received in the first control resource set/search space. The first control resource set/search space may correspond to a first service/traffic type. The first service/traffic type may be ultra-reliable low-latency communications (URLLC) service/traffic type. In an example, further based on the DCI being received in a second control resource set/search space, the wireless device may determine the second subslot based on a second process. In an example, the second control resource set/search space may indicate a second service/traffic type. The second service/traffic type may be enhanced Mobile Broadband (eMBB) service/traffic type. In an example, the first process may comprise employing a first subslot duration and the second process may comprise employing a second subslot duration. In an example, the first process may be based on a first numerology and the second process may be based on a second numerology. In an example, the second process may comprise dropping the HARQ feedback.

In an example, the determining the subslot for transmitting the HARQ feedback of the transport block may be further based on a service/traffic type of the transport block. Based on the service/traffic type of the transport block being a first service/traffic type, the wireless device may determine the subslot based on a first process. The first service/traffic type may be ultra-reliable low-latency communications (URLLC). Based on the service/traffic type of the transport block being a second service/traffic type, the wireless device may determine the subslot based on a second process. The second service/traffic type may be enhanced mobile broadband (eMBB). In an example, the first process may comprise employing a first subslot duration and the second process may comprise employing a second subslot duration. In an example, the first process may be based on a first numerology and the second process may be based on a second numerology. In an example, the second process may comprise dropping the HARQ feedback.

In an example, the wireless device may determine a HARQ ACK codebook comprising HARQ feedback for transport blocks associated with a first type of traffic/service and/or DCI (e.g., format, RNTI, control resource set) and/or HARQ feedback priority. In an example, the first type of the traffic/service may be URLLC. In an example, the first type of traffic/service may be eMBB. In an example HARQ feedback corresponding to a first type of traffic/service and/or first DCI (e.g., first format, first RNTI, first control resource set) and/or first HARQ feedback priority may be transmitted in a first HARQ feedback codebook and HARQ feedback corresponding to a second type of traffic/service and/or second DCI (e.g., second format, second RNTI, second control resource set) and/or second HARQ feedback priority may be transmitted in a second HARQ feedback codebook. In an example, the first type of traffic/service may be URLLC and the second type of traffic/service may be eMBB.

In an example, the DCI may indicate a first downlink data to acknowledgement value. The DCI may indicate the first downlink data to acknowledgement value in a plurality of downlink data to acknowledgement values. The DCI may comprise a field indicating the first downlink data to acknowledgement value. In an example, the one or more messages may comprise the plurality of the downlink data to acknowledgement values. In an example, the plurality of downlink data to acknowledgement values may be pre-configured. The determining the subslot for transmitting the HARQ feedback may be based on the first data to acknowledgement value. The determining the subslot may further be based on one or more numerologies. The determining the subslot may further be based on one or more subslot durations based on the one or more numerologies.

In an example, the subslot duration of the subslot may comprise one or more symbol durations. A symbol duration may be based on a numerology. The numerology may be for an uplink channel. In an example, the uplink channel may be an uplink control channel. The numerology may indicate a subcarrier spacing indicating the symbol duration. The subslot duration may be smaller than a slot duration.

Figure 26:
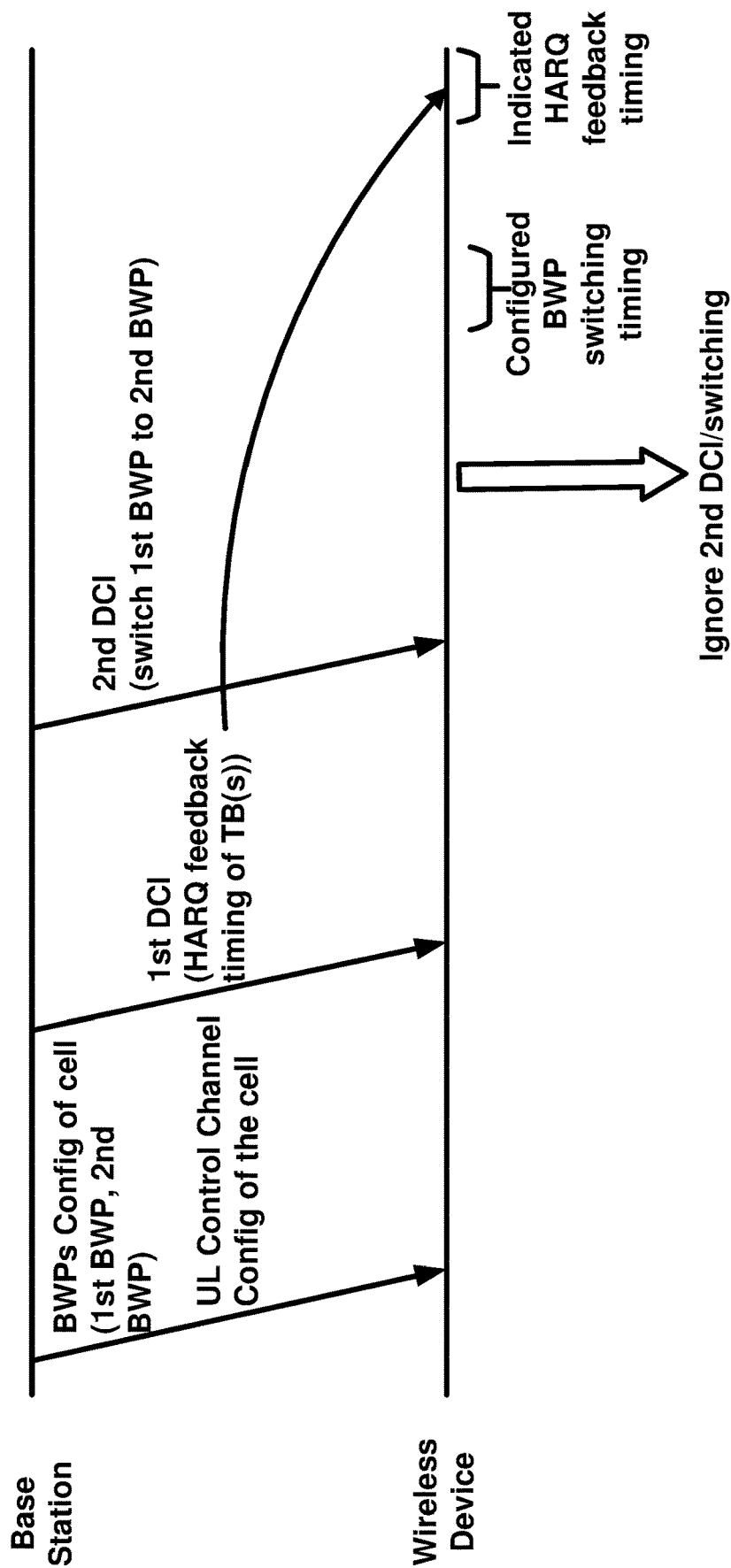
FIG. 26 illustrates an example process as per an aspect of an example embodiment of the present disclosure.

FIG. 26 illustrates an example of handling a BWP switching command received via a DCI in consideration of scheduled/indicated HARQ feedback(s). In an example embodiment as shown in FIG. 26, the wireless device may receive a first DCI indicating a HARQ feedback timing of a HARQ feedback of a transport block. The first DCI may comprise a downlink assignment indicating parameters for reception of the transport block. In an example, the parameters may comprise radio resource assignment, HARQ related parameters (e.g., HARQ process, NDI, RV, etc.), etc. The downlink assignment may be for reception of the transport block via the first bandwidth part. The first downlink assignment may be received in the first bandwidth part (e.g., a downlink bandwidth part corresponding to the bandwidth part) or may be received via a different bandwidth part (e.g., a different cell in case of cross-carrier scheduling). The first DCI may indicate a first data to acknowledgement value indicating the HARQ feedback timing. In an example, the DCI may comprise a field (e.g., a PDSCH to HARQ feedback timing field), a value of the field indicating the first data to acknowledgement value in a plurality of data to acknowledgement values. In an example the wireless device may receive the plurality of the data to acknowledgement values. In an example, the one or more messages may comprise the plurality of data to acknowledgement values.

The wireless device may receive a second DCI indicating switching from the first bandwidth part of the cell to the second bandwidth part of the cell as an active bandwidth part of the cell. In an example, the second DCI may comprise an uplink grant for an uplink transmission via the second bandwidth part. The uplink grant may indicate uplink resources for transmission of one or more transport blocks via the second bandwidth part. The second DCI may comprise a field indicating the second bandwidth part. The uplink grant may comprise transmission parameters for transmission of the one or more transport blocks via the second bandwidth part. The transmission parameters may comprise radio resources, HARQ related parameters (HARQ process number, NDI, RV, etc.), power control related parameters, etc.

In an example, the second DCI may indicate an order for starting a random access process. The wireless device may switch from the first bandwidth part to the second bandwidth part to start the random access process via the second bandwidth part. In an example, the second DCI may explicitly indicate starting the random access and transmitting random access preambles via the second bandwidth part. The second DCI may comprise a field, the value of the field indicating the second bandwidth. In an example, the second downlink control information may indicate starting the random access process and transmitting the random access preambles via the first bandwidth part and the wireless device may switch from the first bandwidth part to the second bandwidth part based on no random access occasion being configured on the first bandwidth part.

Figure 27:
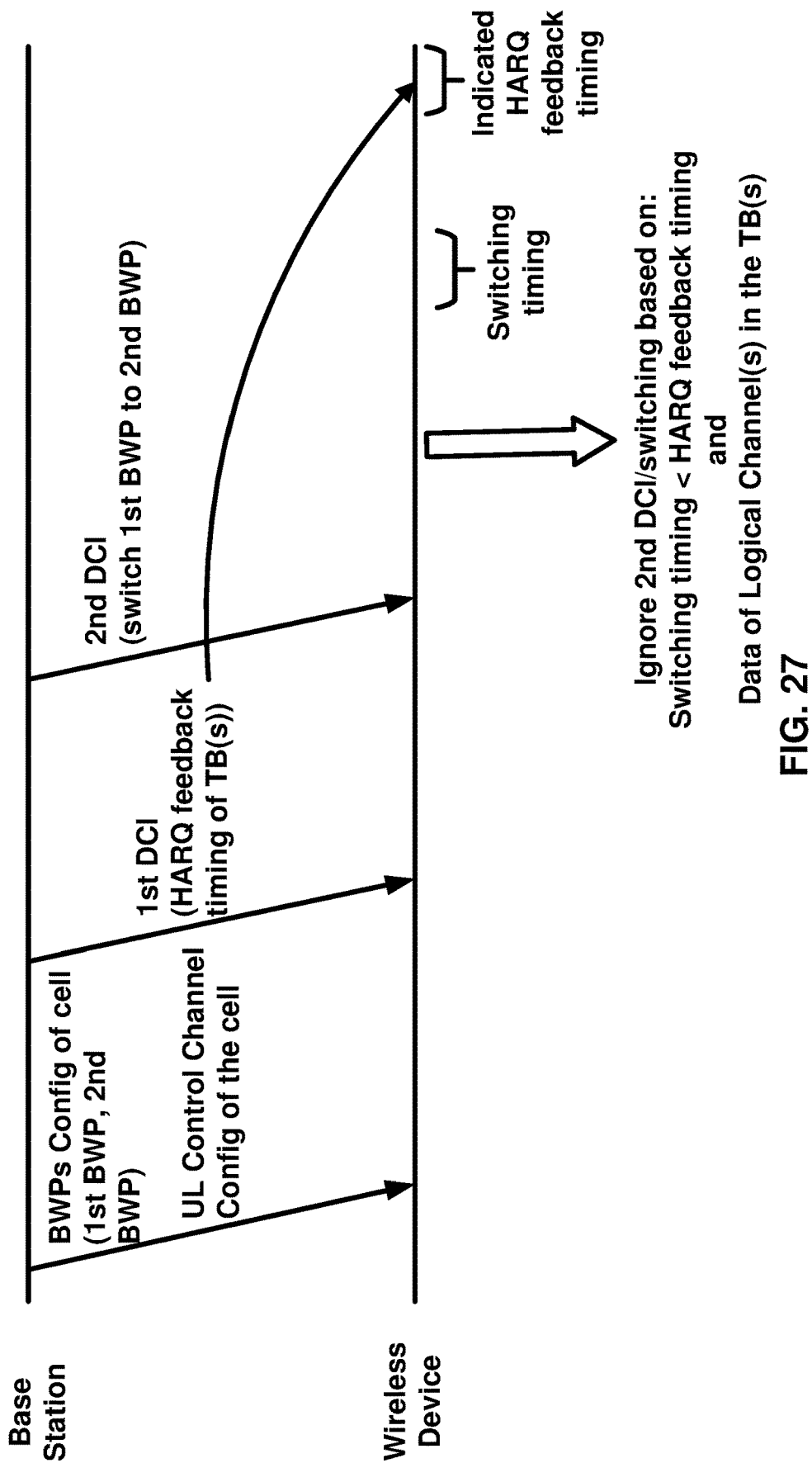
FIG. 27 illustrates an example process as per an aspect of an example embodiment of the present disclosure.
Figure 28:
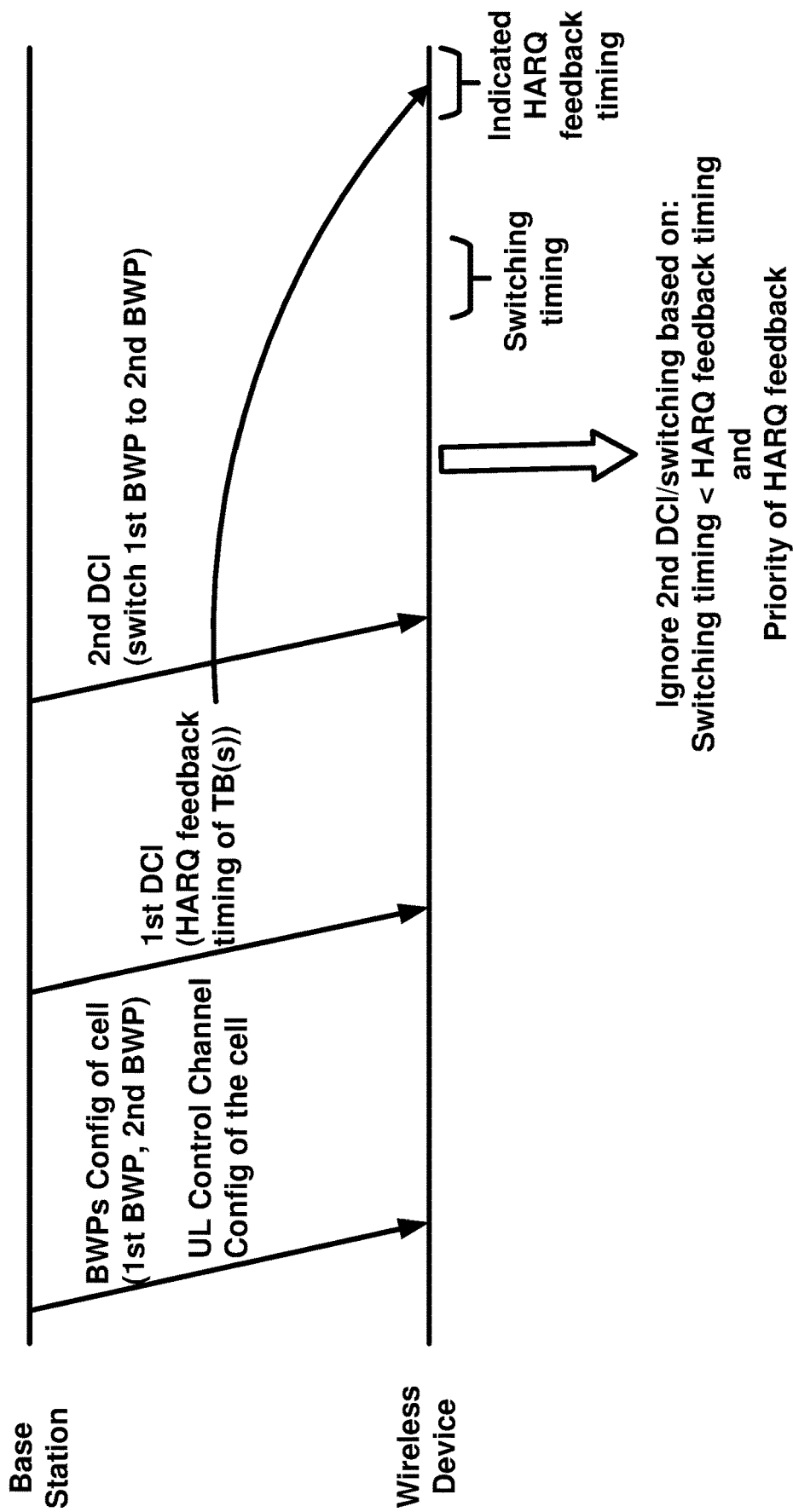
FIG. 28 illustrates an example process as per an aspect of an example embodiment of the present disclosure.
Figure 29:
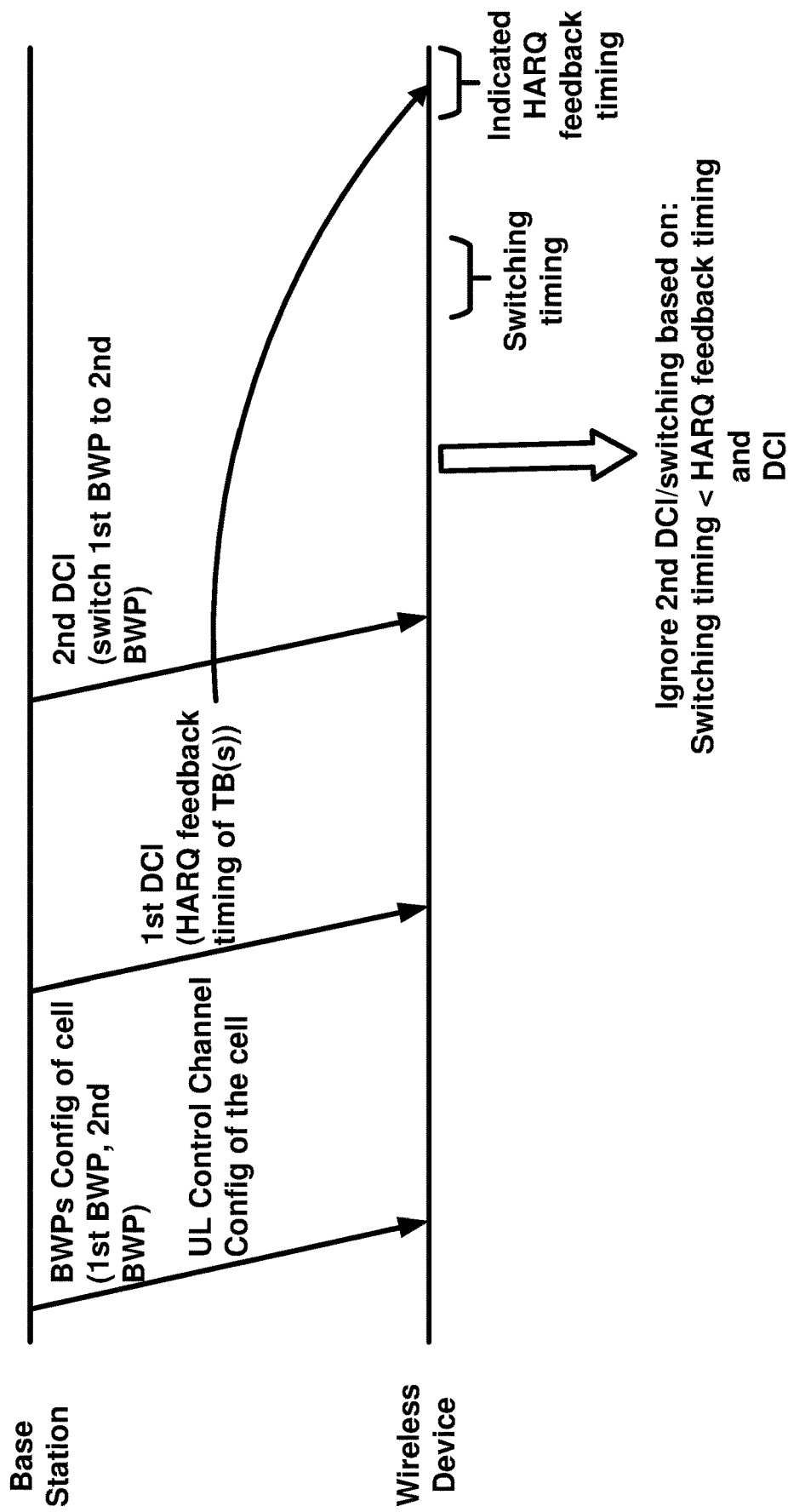
FIG. 29 illustrates an example process as per an aspect of an example embodiment of the present disclosure.

Based on the first timing of the switching, indicated by the second DCI, being earlier than the HARQ feedback timing, the wireless device may ignore the second DCI. In an example, based on the first timing of the switching being earlier than the HARQ feedback timing, the wireless device may ignore the switching indicated by the second downlink control information. The wireless device may transmit one or more signals to the base station indicating that the wireless device ignored the second DCI or the switching indicated by the second downlink control information. In an example, the one or more signals may comprise a random access preamble transmission (e.g., via the first bandwidth part). In an example, the one or more signals may comprise of one or more uplink control information indicating that the wireless device ignored the second DCI or the switching indicated by the second downlink control information. The wireless device may determine to ignore the second DCI based on a first priority of the HARQ feedback and a second priority of a TB scheduled by the second DCI. For example, the wireless device may ignore the second DCI based on the second priority is lower than the first priority. For example, the wireless device ignore the second DCI in response to the first priority is associated with URLLR or the first priority is a high priority. FIG. 27-29 shows various examples of determining prioritization between the HARQ feedback and the BWP switching indicated by the second DCI.

The wireless device may transmit the HARQ feedback of the transport block in a subslot and via a resource of the uplink control channel in the first bandwidth part. The wireless device may determine the subslot based on a downlink data to acknowledgement value indicated by the first DCI (indicating the downlink assignment for the transport) and the numerology of the first bandwidth part (e.g., numerology of the uplink control channel in the first bandwidth part).

In an example embodiment as shown in FIG. 27, the ignoring the second DCI or the switching indicated by the second downlink control, may further be based on one or more logical channels in the transport block. The wireless device may ignore the second DCI or the switching, indicated by the second downlink control, based on the one or more logical channels corresponding to one or more first types of service/traffic. The one or more first types of service/traffic may comprise ultra-reliable low-latency communications (URLLC). The wireless device may not ignore the second DCI or the switching, indicated by the second downlink control information, based on the one or more logical channels corresponding to one or more second service/traffic types. The one or more second service/traffic types may comprise an enhanced mobile broadband (eMBB) service/traffic type. In an example, the wireless device may determine the one or more logical channels in the transport block based on or more logical channel identifiers. A MAC header of the transport block may indicate the one or more logical channel identifiers. In an example, the wireless device may determine the one or more logical channels based on one or parameters associated with the DCI (e.g., a format of the DCI, an RNTI associated with the DCI, a control resource set/search space associated with the DCI, e.g., a control resource set/search space in which the DCI is received, etc.).

In an example embodiment as shown in FIG. 28, the ignoring the second DCI or the switching indicated by the second downlink control, may further be based on a priority of HARQ feedback. In an example, the priority of HARQ feedback may be explicitly indicated by a first DCI (e.g., the DCI scheduling the transport block). In an example, the first DCI may comprise a field, a value of the field indicating the priority of the HARQ feedback. The value may of the field may be one of the plurality of values. In an example, the plurality of values may be configured by RRC (e.g., the one or more messages may indicate the one or more values). In an example, the plurality of values may be pre-configured.

In an example, the priority of the HARQ feedback may be determined implicitly by the wireless device. In an example, the wireless device may implicitly determine the priority of the HARQ feedback based on one or more parameters associated with the first DCI (e.g., a format of the first DCI, an RNTI associated with the first DCI, a control resource set/search space associated with the first DCI, e.g., a control resource set/search space in which the first DCI is received, etc.).

In an example embodiment as shown in FIG. 29, the ignoring the second DCI or the switching indicated by the second downlink control, may further be based on the first downlink control information. In an example, the ignoring the second DCI or the switching indicated by the second downlink control, may be a format of the first downlink control information. The wireless device may detect the first downlink control information. The wireless device may determine the format of the first DCI based on the detection. In an example, further based on the format of the first DCI being a first format, the wireless device may ignore the second DCI or ignore the switching indicated by the second downlink control. In an example, the first format may indicate a first service/traffic type. The first service/traffic type may be ultra-reliable low-latency communications (URLLC) service/traffic type. In an example, the first format may indicate a first priority (e.g., a first priority of the HARQ feedback associated with the transport block). In an example, further based on the format of the first DCI being a second format, the wireless device may ignore the second DCI or ignore the switching indicated by the second downlink control. In an example, the second format may indicate a second service/traffic type. The second service/traffic type may be enhanced mobile broadband (eMBB) service/traffic type. In an example, further based on a format of the first DCI not being of the first format, the wireless device may not ignore the second DCI or may not ignore the switching indicated by the second downlink control.

In an example, the ignoring the second DCI or the switching indicated by the second downlink control may be further based on a radio network temporary identifier associated with the first DCI. The wireless device may detect the first downlink control information. The wireless device may determine the radio network temporary identifier associated with the first DCI based on the detection. In an example, further based on the RNTI associated with the first DCI being a first RNTI, the wireless device may ignore the second DCI or the switching indicated by the second downlink control. In an example, the first RNTI may indicate a first service/traffic type. The first service/traffic type may be ultra-reliable low-latency communications (URLLC) service/traffic type. In an example, the first RNTI may indicate a first priority (e.g., a first priority of the HARQ feedback associated with the transport block). In an example, further based on the RNTI associated with the first DCI being a second RNTI, the wireless device may not ignore the second DCI or the switching indicated by the second downlink control. In an example, the second RNTI may indicate a second service/traffic type. The second service/traffic type may be enhanced Mobile Broadband (eMBB) service/traffic type. In an example, further based on a RNTI associated with the first DCI not being of the first RNTI, the wireless device may not ignore the second DCI or the switching indicated by the second downlink control.

In an example, the first DCI may be received in a control resource set (CORESET)/search space. The ignoring the second DCI or the switching indicated by the second downlink control may be further based on the control resource set/search space. The wireless device may determine that the first DCI is received in a first control resource set/search space. The wireless device may ignore the second DCI or the switching indicated by the second downlink control based on the DCI being received in the first control resource set/search space. The first control resource set/search space may correspond to a first service/traffic type. The first service/traffic type may be ultra-reliable low-latency communications (URLLC) service/traffic type. In an example, the first control resource set/search space may indicate a first priority (e.g., a first priority of the HARQ feedback associated with the transport block). In an example, further based on the first DCI being received in a second control resource set/search space, the wireless device may not ignore the second DCI or the switching indicated by the second downlink control. In an example, the second control resource set/search space may indicate a second service/traffic type. The second service/traffic type may be enhanced Mobile Broadband (eMBB) service/traffic type. In an example, further based on a control resource set/search space that the first DCI is received not being the first control resource set/search space, the wireless device may not ignore the second DCI or the switching indicated by the second downlink control. In an example, the one or more messages may indicate the first control resource set/search space and the second control resource set/search space.

In an example, the ignoring the second DCI or the switching indicated by the second downlink control may be further based on a service/traffic type of the transport block. Based on the service/traffic type of the transport block being a first service/traffic type, the wireless device may ignore the second DCI or the switching indicated by the second downlink control. The first service/traffic type may be ultra-reliable low-latency communications (URLLC). Based on the service/traffic type of the transport block being a second service/traffic type, the wireless device may not ignore the second DCI or the switching indicated by the second downlink control. The second service/traffic type may be enhanced mobile broadband (eMBB). Based on the service/traffic type of the transport block not being the first service/traffic type, the wireless device may not ignore the second DCI or the switching indicated by the second downlink control. The wireless device may determine the service/traffic type of the transport block. In an example, the wireless device may determine the service/traffic type based on the first DCI scheduling the transport block and indicating the HARQ feedback timing. In an example, one or more parameters associated with the first DCI may comprise a format of the first DCI. In an example, one or more parameters associated with the first DCI may comprise an RNTI associated with the DCI. In an example, one or more parameters associated with the first DCI may comprise a control resource set/search space that the first DCI is received.

Figure 30:
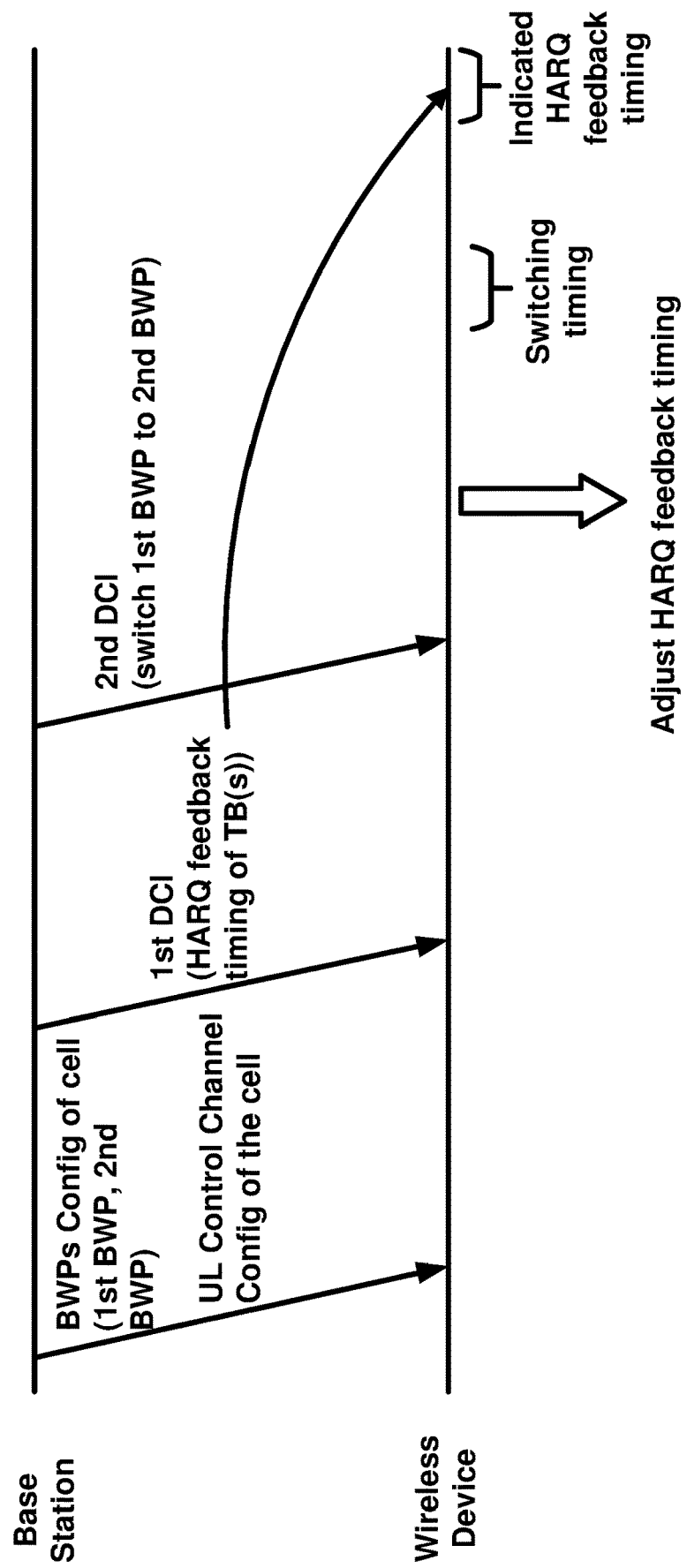
FIG. 30 illustrates an example process as per an aspect of an example embodiment of the present disclosure.

In an example embodiment as shown in FIG. 30, based on a switching timing of the switching being earlier than the indicated HARQ feedback timing, the wireless device may adjust the HARQ feedback timing to a first timing. In an example, the first timing may be before the switching timing. In an example, the first timing may be a subslot (e.g., earliest subslot) in a slot immediately before the switching. In an example, the first timing may be a subslot (e.g., earliest subslot) in a slot that k slots after receiving the first downlink control information. In an example, the first timing may be a subslot (e.g., earliest subslot) in a slot that is k slots after receiving the first DCI and is before the switching timing. The value of k may be preconfigured or may be indicated dynamically (e.g., by physical layer signaling (e.g., DCI) or by MAC layer signaling (e.g., MAC CE)) or may be indicated semi-statically (e.g., RRC). In an example, the first timing may be a subslot (e.g., earliest subslot) in a slot that is m slots after receiving the second downlink control information. In an example, the first timing may be a subslot (e.g., earliest subslot) in a slot that is m slots after receiving the second DCI and is before the switching timing. The value of m may be preconfigured or may be indicated dynamically (e.g., physical layer (e.g., DCI) or MAC layer signaling (e.g., MAC CE)) or semi-statically (e.g., RRC).

The wireless device may transmit the HARQ feedback based on the first timing. In an example, the wireless device may transmit the HARQ feedback in a subslot based on the first timing wherein the subslot is of the first bandwidth part and the subslot is based on a numerology of the first bandwidth part (e.g., numerology of uplink control channel in the first bandwidth part). The wireless device may transmit the HARQ feedback via the uplink control channel. The wireless device may create a HARQ feedback codebook comprising a plurality of HARQ feedbacks comprising the HARQ feedback. The plurality of HARQ feedbacks may be for a plurality of transport blocks where in the DCIs scheduling the plurality of transport blocks indicate the subslot for transmission of the plurality of HARQ feedbacks. The HARQ feedback codebook may be based on a dynamic codebook or semi-static codebook mechanism.

Figure 31:
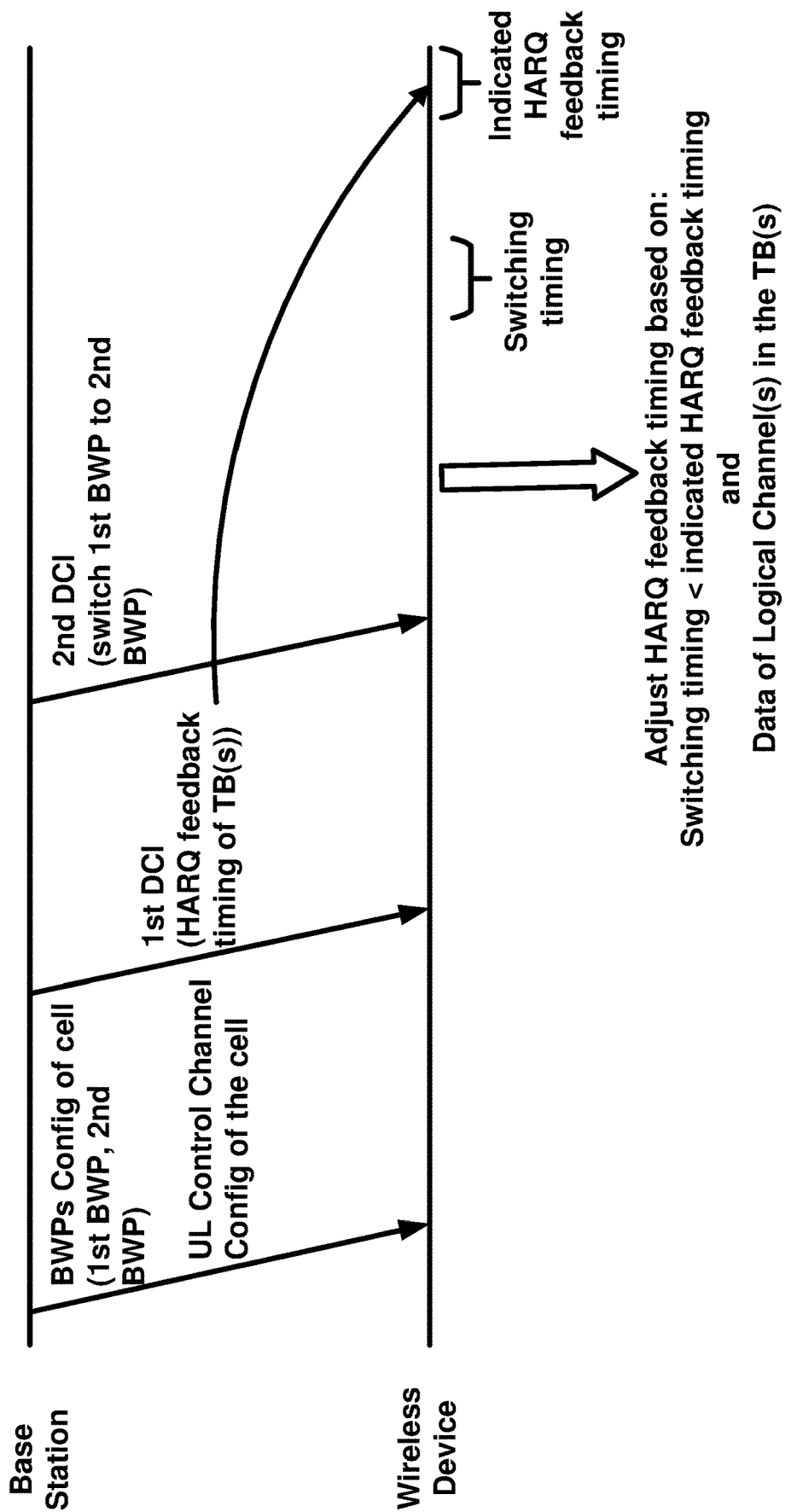
FIG. 31 illustrates an example process as per an aspect of an example embodiment of the present disclosure.

In an example embodiment as shown in FIG. 31, the adjusting the HARQ feedback timing may further be based on one or more logical channels in the transport block. The wireless device may adjust the HARQ feedback timing based on the one or more logical channels corresponding to one or more first types of service/traffic. The one or more first types of service/traffic may comprise ultra-reliable low-latency communications (URLLC). The wireless device may not adjust the HARQ feedback timing based on the one or more logical channels corresponding to one or more second service/traffic types. The one or more second service/traffic types may comprise an enhanced mobile broadband (eMBB) service/traffic type. In an example, the wireless device may determine the one or more logical channels in the transport block based on or more logical channel identifiers. A MAC header of the transport block may indicate the one or more logical channel identifiers. In an example, the wireless device may determine the one or more logical channels based on one or parameters associated with the DCI (e.g., a format of the DCI, an RNTI associated with the DCI, a control resource set/search space associated with the DCI, e.g., a control resource set/search space in which the DCI is received, etc.).

Figure 32:
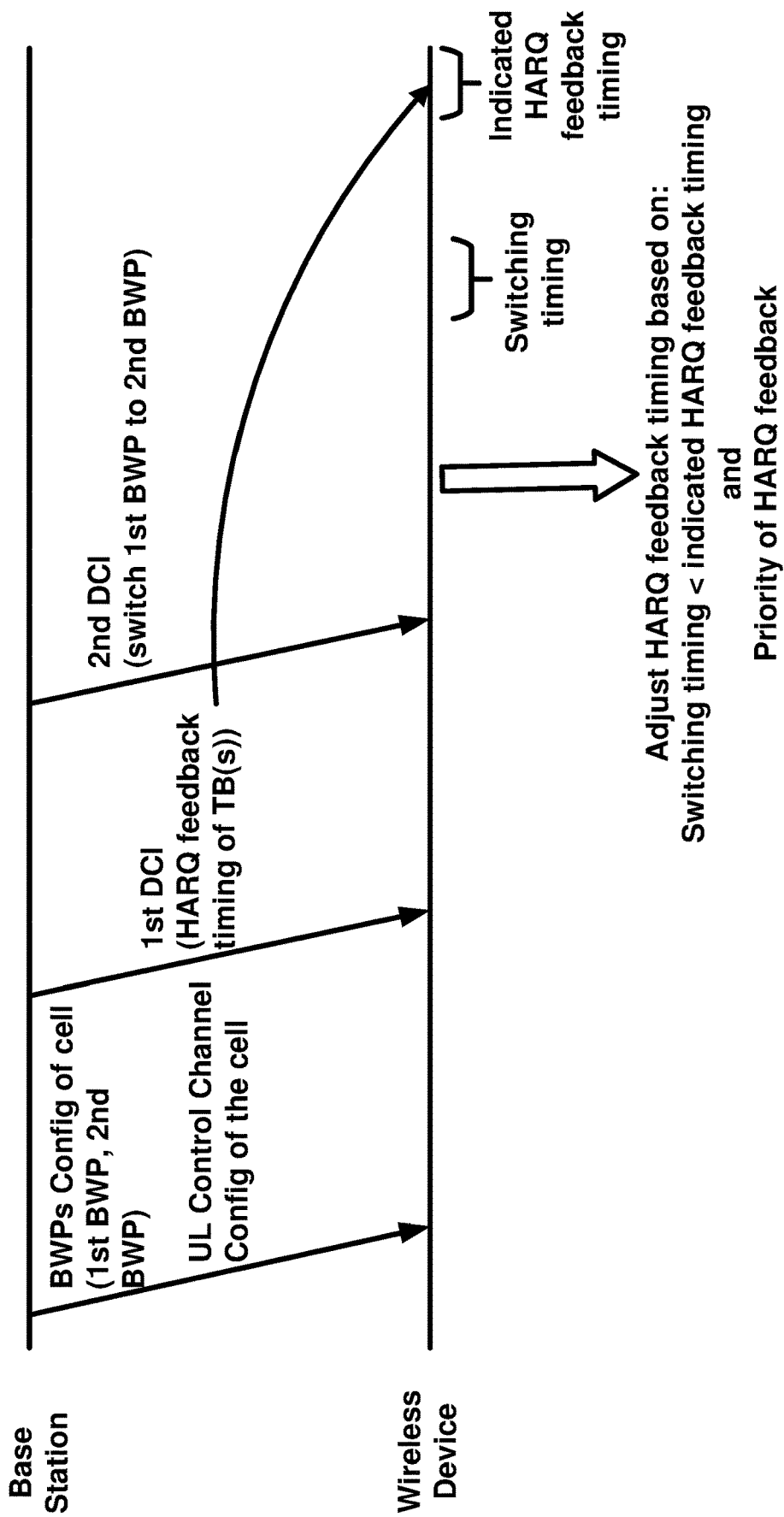
FIG. 32 illustrates an example process as per an aspect of an example embodiment of the present disclosure.

In an example embodiment as shown in FIG. 32, the adjusting the HARQ feedback timing may further be based on may further be based on a priority of HARQ feedback. In an example, the priority of HARQ feedback may be explicitly indicated by a first DCI (e.g., the DCI scheduling the transport block). In an example, the first DCI may comprise a field, a value of the field indicating the priority of the HARQ feedback. The value may of the field may be one of the plurality of values. In an example, the plurality of values may be configured by RRC (e.g., the one or more messages may indicate the one or more values). In an example, the plurality of values may be pre-configured.

In an example, the priority of the HARQ feedback may be determined implicitly by the wireless device. In an example, the wireless device may implicitly determine the priority of the HARQ feedback based on one or more parameters associated with the first DCI (e.g., a format of the first DCI, an RNTI associated with the first DCI, a control resource set/search space associated with the first DCI, e.g., a control resource set/search space in which the first DCI is received, etc.).

Figure 33:
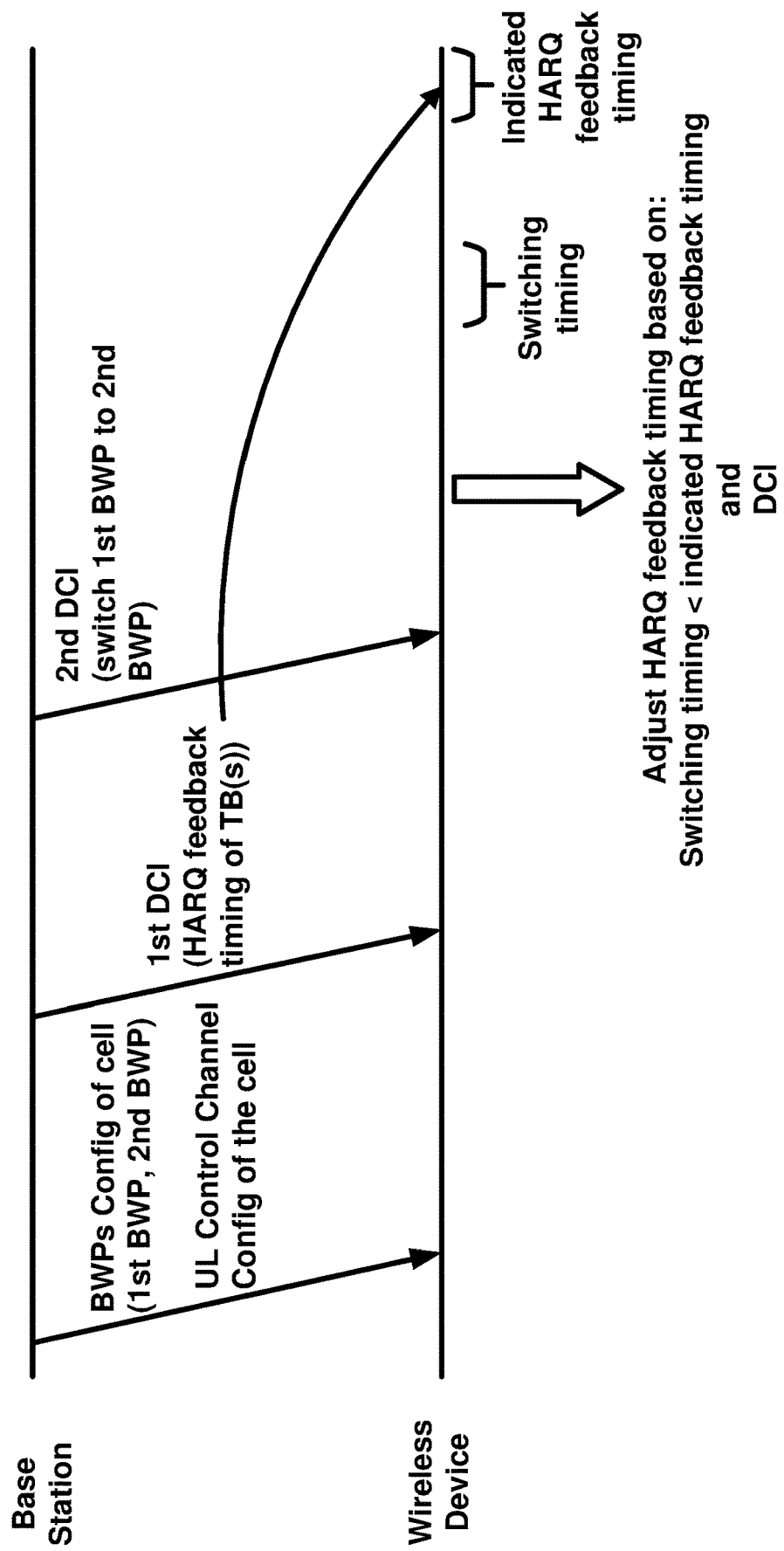
FIG. 33 illustrates an example process as per an aspect of an example embodiment of the present disclosure.

In an example embodiment as shown in FIG. 33, the adjusting the HARQ feedback timing may further be based on the first downlink control information. In an example, the adjusting the HARQ feedback timing may be based on a format of the first downlink control information. The wireless device may detect the first downlink control information. The wireless device may determine the format of the first DCI based on the detection. In an example, further based on the format of the first DCI being a first format, the wireless device may adjust the HARQ feedback timing. In an example, the first format may indicate a first service/traffic type. The first service/traffic type may be ultra-reliable low-latency communications (URLLC) service/traffic type. In an example, the first format may indicate a first priority (e.g., a first priority of the HARQ feedback associated with the transport block). In an example, further based on the format of the first DCI being a second format, the wireless device may not adjust the HARQ feedback timing. In an example, the second format may indicate a second service/traffic type. The second service/traffic type may be enhanced mobile broadband (eMBB) service/traffic type. In an example, further based on a format of the first DCI not being of the first format, the wireless device may not adjust the HARQ feedback timing.

In an example, the adjusting the HARQ feedback timing may be further based on a radio network temporary identifier associated with the first DCI. The wireless device may detect the first downlink control information. The wireless device may determine the radio network temporary identifier associated with the first DCI based on the detection. In an example, further based on the RNTI associated with the first DCI being a first RNTI, the wireless device may adjust the HARQ feedback timing. In an example, the first RNTI may indicate a first service/traffic type. The first service/traffic type may be ultra-reliable low-latency communications (URLLC) service/traffic type. In an example, the first RNTI may indicate a first priority (e.g., a first priority of the HARQ feedback associated with the transport block). In an example, further based on the RNTI associated with the first DCI being a second RNTI, the wireless device may not adjust the HARQ feedback timing. In an example, the second RNTI may indicate a second service/traffic type. The second service/traffic type may be enhanced Mobile Broadband (eMBB) service/traffic type. In an example, further based on a RNTI associated with the first DCI not being of the first RNTI, the wireless device may not adjust the HARQ feedback timing.

In an example, the first DCI may be received in a control resource set (CORESET)/search space. The adjusting the HARQ feedback timing may be further based on the control resource set/search space. The wireless device may determine that the first DCI is received in a first control resource set/search space. The wireless device may adjust the HARQ feedback timing based on the DCI being received in the first control resource set/search space. The first control resource set/search space may correspond to a first service/traffic type. The first service/traffic type may be ultra-reliable low-latency communications (URLLC) service/traffic type. In an example, the first control resource set/search space may indicate a first priority (e.g., a first priority of the HARQ feedback associated with the transport block). In an example, further based on the first DCI being received in a second control resource set/search space, the wireless device may not adjust the HARQ feedback timing. In an example, the second control resource set/search space may indicate a second service/traffic type. The second service/traffic type may be enhanced Mobile Broadband (eMBB) service/traffic type. In an example, further based on a control resource set/search space that the first DCI is received not being the first control resource set/search space, the wireless device may not adjust the HARQ feedback timing. In an example, the one or more messages may indicate the first control resource set/search space and the second control resource set/search space.

In an example, the adjusting the HARQ feedback timing may be further based on a service/traffic type of the transport block. Based on the service/traffic type of the transport block being a first service/traffic type, the wireless device may adjust the HARQ feedback timing. The first service/traffic type may be ultra-reliable low-latency communications (URLLC). Based on the service/traffic type of the transport block being a second service/traffic type, the wireless device may not adjust the HARQ feedback timing. The second service/traffic type may be enhanced mobile broadband (eMBB). Based on the service/traffic type of the transport block not being the first service/traffic type, the wireless device may not adjust the HARQ feedback timing. The wireless device may determine the service/traffic type of the transport block. In an example, the wireless device may determine the service/traffic type based on the first DCI scheduling the transport block and indicating the HARQ feedback timing. In an example, one or more parameters associated with the first DCI may comprise a format of the first DCI. In an example, one or more parameters associated with the first DCI may comprise an RNTI associated with the DCI. In an example, one or more parameters associated with the first DCI may comprise a control resource set/search space that the first DCI is received.

Figure 34:
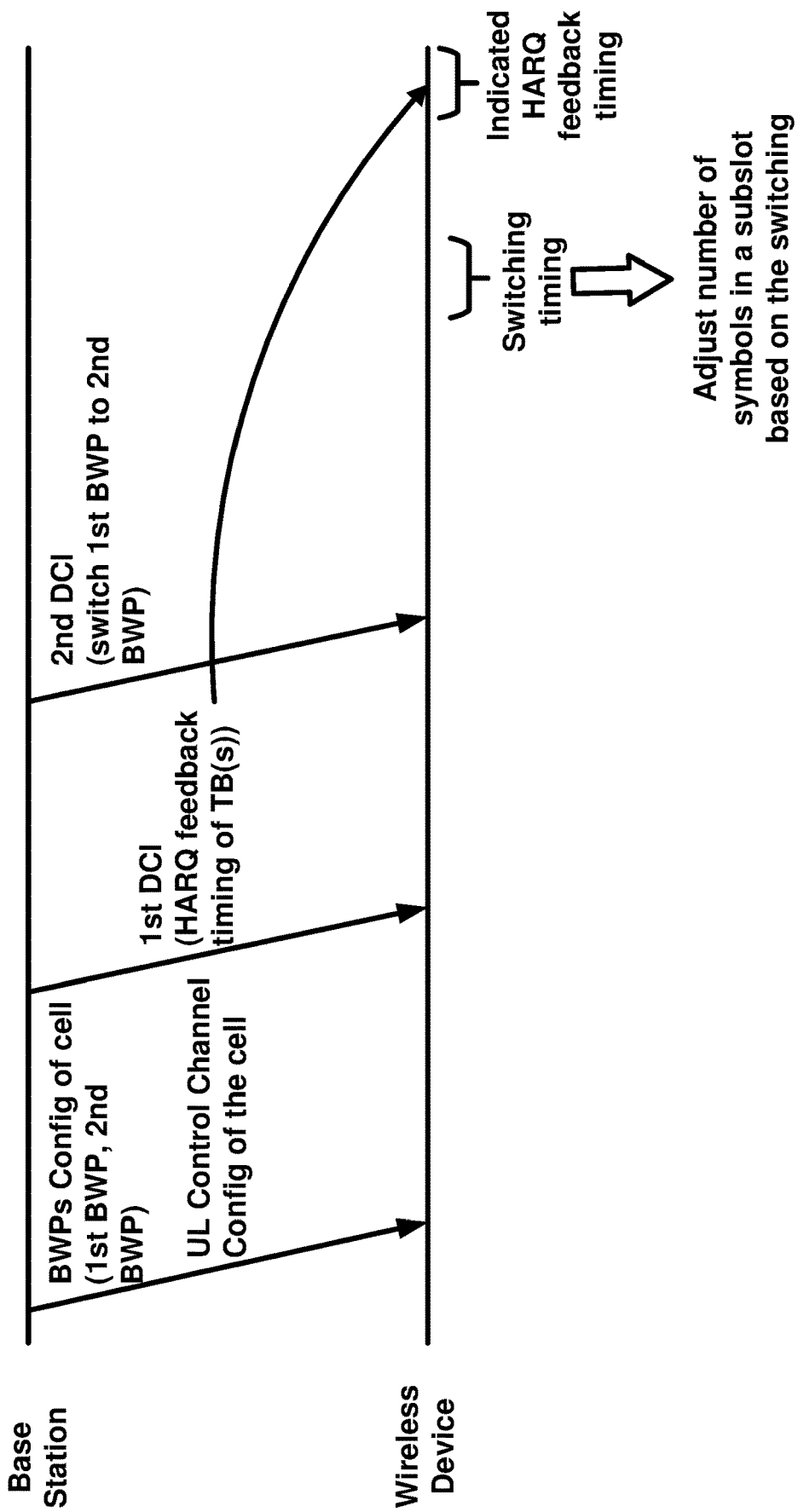
FIG. 34 illustrates an example process as per an aspect of an example embodiment of the present disclosure.
Figure 35:
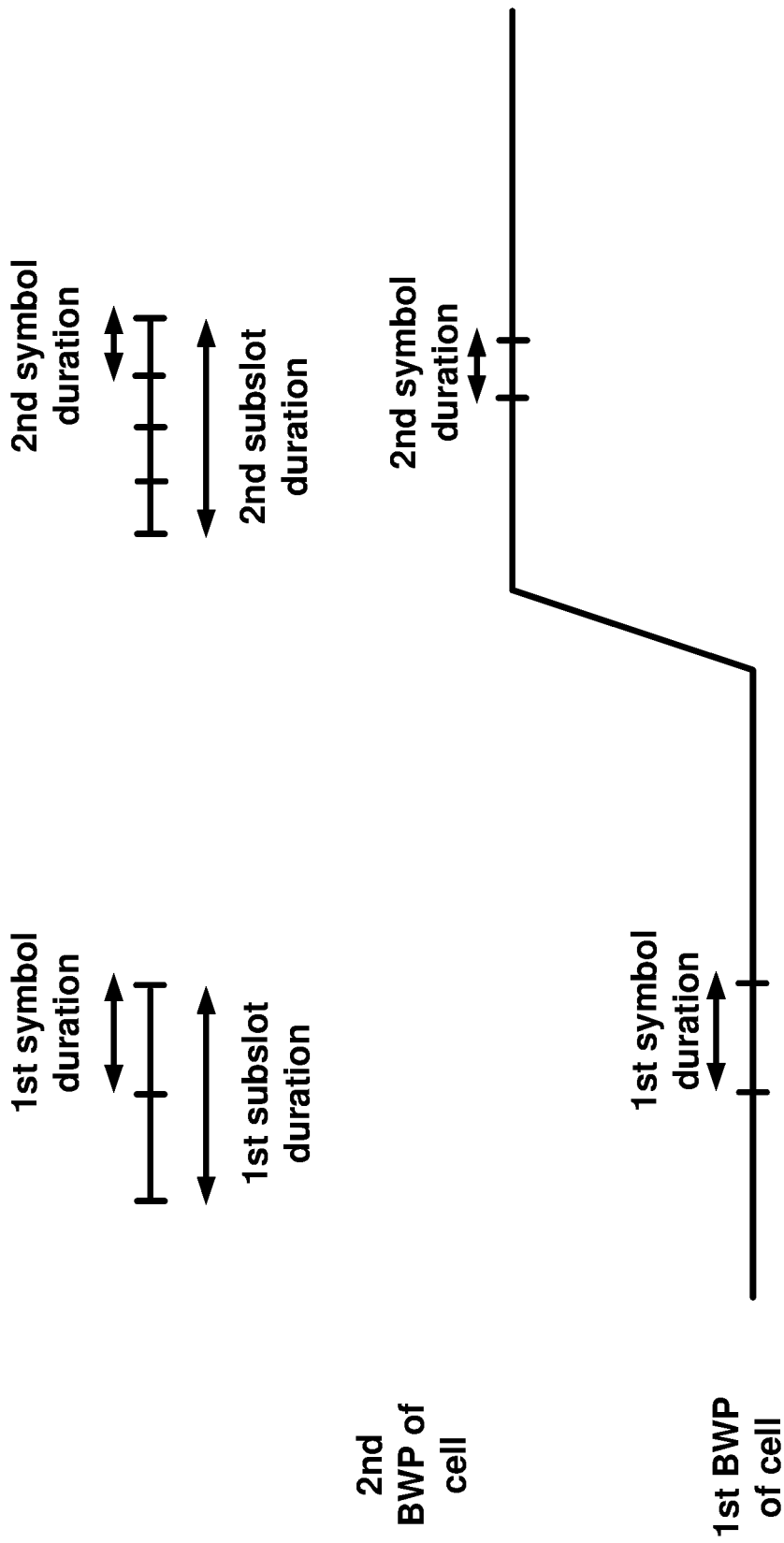
FIG. 35 illustrates an example process as per an aspect of an example embodiment of the present disclosure.

In an example embodiment as shown in FIG. 34, based on a switching time of the switching being earlier than the HARQ feedback timing, and the numerology of the second bandwidth part being different from the numerology of the first bandwidth part, the wireless device may adjust number of symbols in a subslot. In an example, the adjusting the number of symbols in a subslot may make the subslot duration in the first bandwidth part and the second bandwidth part equal or substantially equal. In an example, the number of symbols in a subslot duration may depend on a numerology or a symbol duration corresponding to a symbol duration. The number of symbols in a subslot of the first bandwidth part may be a first number and the number of symbols of the second bandwidth part may be a second number. In an example as show in FIG. 35, the wireless may determine the subslot for transmission of the HARQ feedback based on the first number of symbols for subslots of the first bandwidth part and the second number of symbols for subslots of the second bandwidth part.

Figure 36:
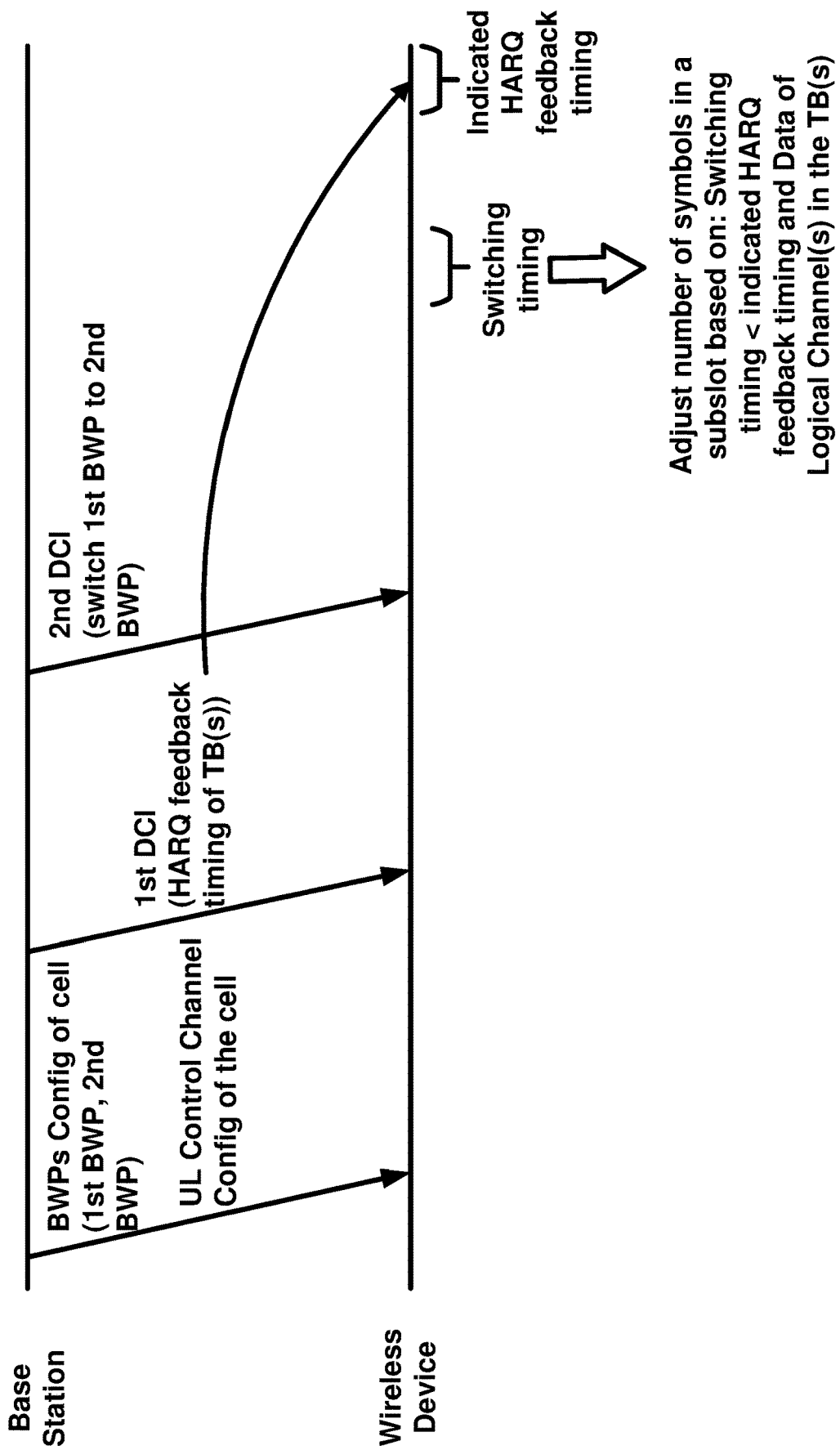
FIG. 36 illustrates an example process as per an aspect of an example embodiment of the present disclosure.

In an example embodiment as shown in FIG. 36, the adjusting the number of symbols in a subslot may further be based on one or more logical channels in the transport block. The wireless device may adjust the number of symbols based on the one or more logical channels corresponding to one or more first types of service/traffic. The one or more first types of service/traffic may comprise ultra-reliable low-latency communications (URLLC). The wireless device may not adjust the number of symbols based on the one or more logical channels corresponding to one or more second service/traffic types. The one or more second service/traffic types may comprise an enhanced mobile broadband (eMBB) service/traffic type. In an example, the wireless device may determine the one or more logical channels in the transport block based on or more logical channel identifiers. A MAC header of the transport block may indicate the one or more logical channel identifiers. In an example, the wireless device may determine the one or more logical channels based on one or parameters associated with the DCI (e.g., a format of the DCI, an RNTI associated with the DCI, a control resource set/search space associated with the DCI, e.g., a control resource set/search space in which the DCI is received, etc.).

Figure 37:
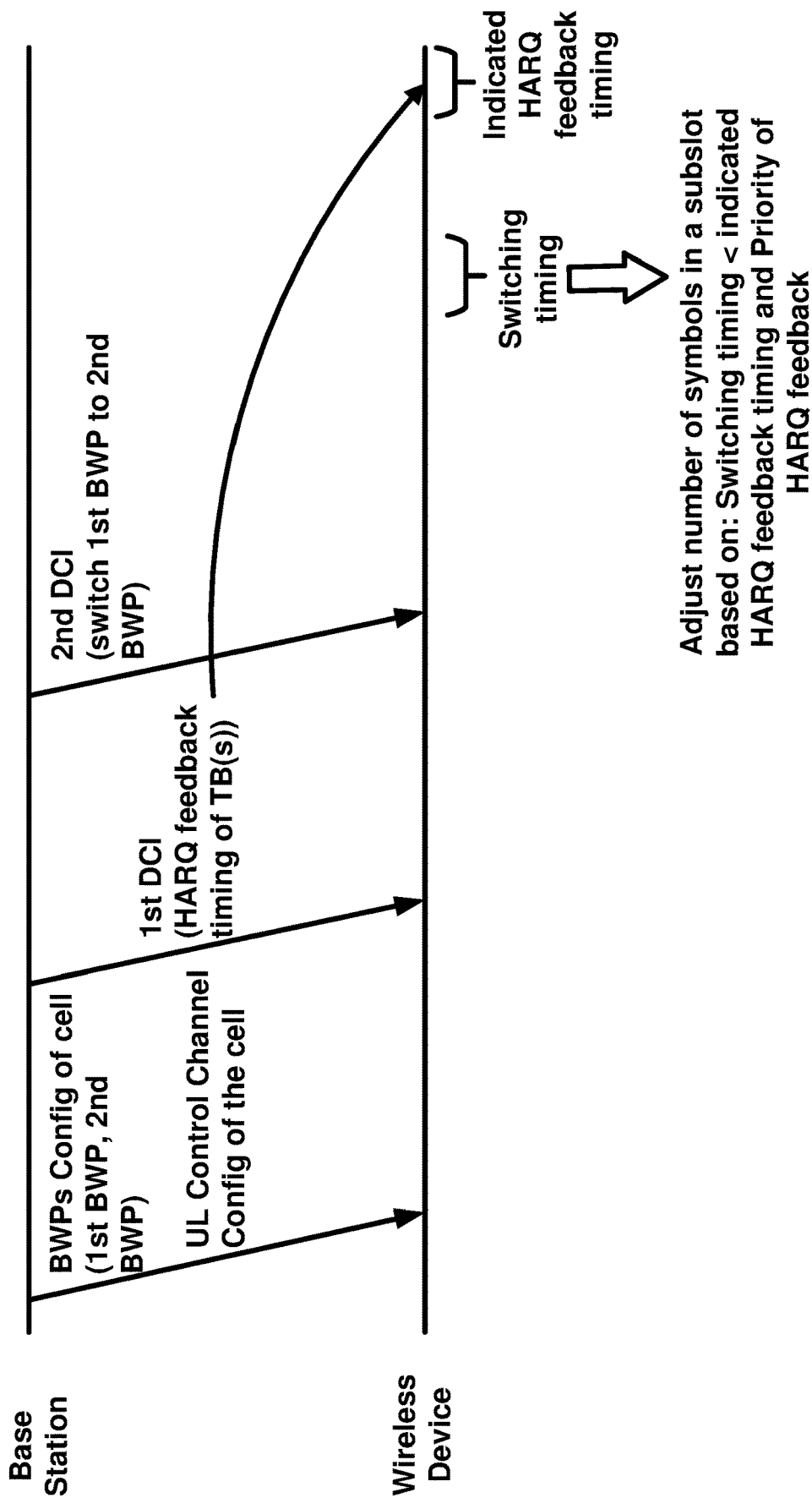
FIG. 37 illustrates an example process as per an aspect of an example embodiment of the present disclosure.

In an example embodiment as shown in FIG. 37, the adjusting the number of symbols in a subslot may further be based on a priority of HARQ feedback. In an example, the priority of HARQ feedback may be explicitly indicated by a first DCI (e.g., the DCI scheduling the transport block). In an example, the first DCI may comprise a field, a value of the field indicating the priority of the HARQ feedback. The value may of the field may be one of the plurality of values. In an example, the plurality of values may be configured by RRC (e.g., the one or more messages may indicate the one or more values). In an example, the plurality of values may be pre-configured.

In an example, the priority of the HARQ feedback may be determined implicitly by the wireless device. In an example, the wireless device may implicitly determine the priority of the HARQ feedback based on one or more parameters associated with the first DCI (e.g., a format of the first DCI, an RNTI associated with the first DCI, a control resource set/search space associated with the first DCI, e.g., a control resource set/search space in which the first DCI is received, etc.).

Figure 38:
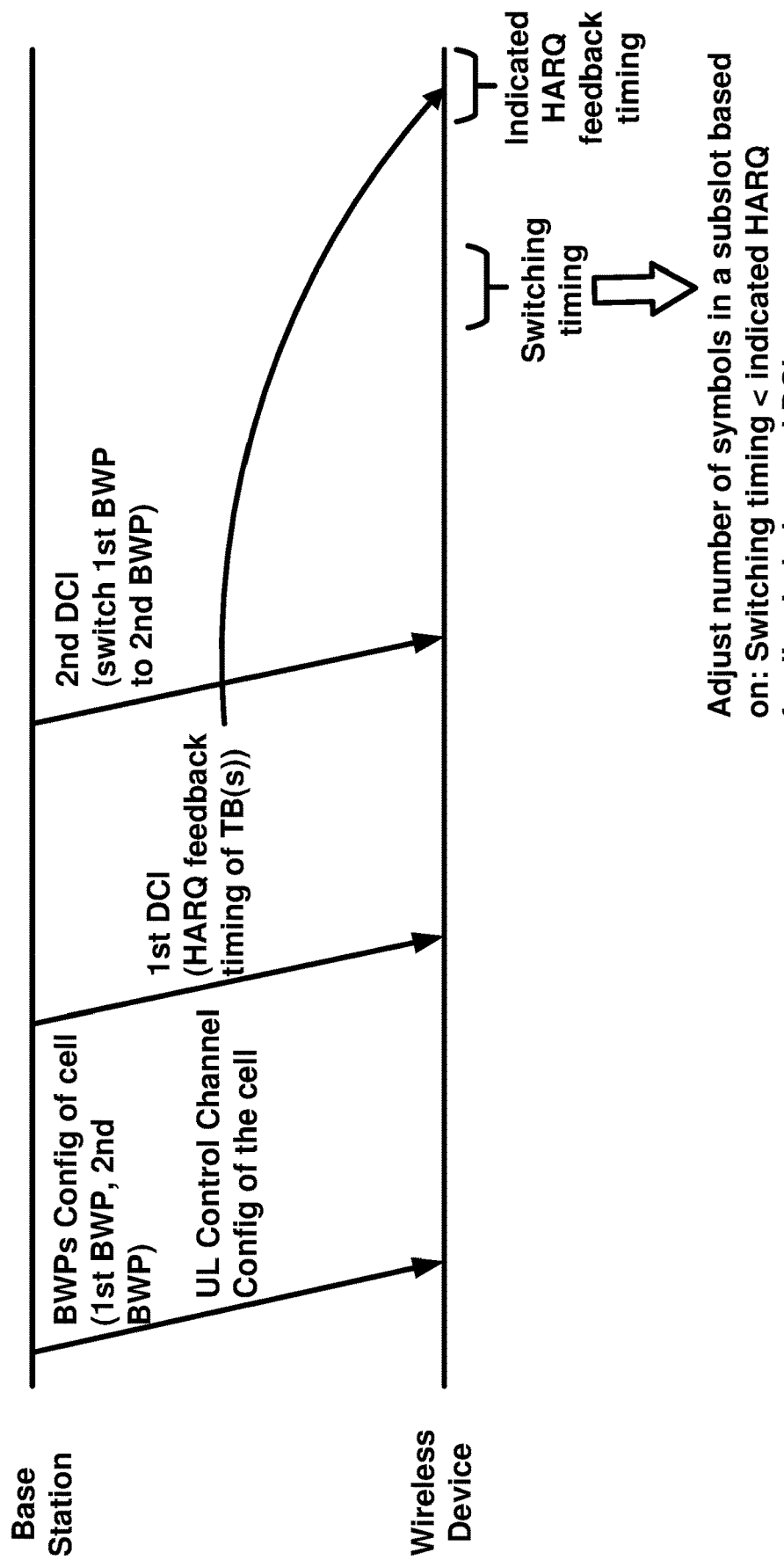
FIG. 38 illustrates an example process as per an aspect of an example embodiment of the present disclosure.

In an example embodiment as shown in FIG. 38, the adjusting the number of symbols in a subslot may further be based on the first downlink control information. In an example, the adjusting the number of symbols may be based on a format of the first downlink control information. The wireless device may detect the first downlink control information. The wireless device may determine the format of the first DCI based on the detection. In an example, further based on the format of the first DCI being a first format, the wireless device may adjust the number of symbols. In an example, the first format may indicate a first service/traffic type. The first service/traffic type may be ultra-reliable low-latency communications (URLLC) service/traffic type. In an example, the first format may indicate a first priority (e.g., a first priority of the HARQ feedback associated with the transport block). In an example, further based on the format of the first DCI being a second format, the wireless device may not adjust the number of symbols. In an example, the second format may indicate a second service/traffic type. The second service/traffic type may be enhanced mobile broadband (eMBB) service/traffic type. In an example, further based on a format of the first DCI not being of the first format, the wireless device may not adjust the number of symbols.

In an example, the adjusting the number of symbols of a subslot may be further based on a radio network temporary identifier associated with the first DCI. The wireless device may detect the first downlink control information. The wireless device may determine the radio network temporary identifier associated with the first DCI based on the detection. In an example, further based on the RNTI associated with the first DCI being a first RNTI, the wireless device may adjust the number of symbols in a subslot. In an example, the first RNTI may indicate a first service/traffic type. The first service/traffic type may be ultra-reliable low-latency communications (URLLC) service/traffic type. In an example, the first RNTI may indicate a first priority (e.g., a first priority of the HARQ feedback associated with the transport block). In an example, further based on the RNTI associated with the first DCI being a second RNTI, the wireless device may not adjust the number of symbols in a subslot. In an example, the second RNTI may indicate a second service/traffic type. The second service/traffic type may be enhanced Mobile Broadband (eMBB) service/traffic type. In an example, further based on a RNTI associated with the first DCI not being of the first RNTI, the wireless device may not adjust the number of symbols in a subslot.

In an example, the first DCI may be received in a control resource set (CORESET)/search space. The adjusting number of symbols in a subslot may be further based on the control resource set/search space. The wireless device may determine that the first DCI is received in a first control resource set/search space. The wireless device may adjust the number of symbols in a subslot based on the DCI being received in the first control resource set/search space. The first control resource set/search space may correspond to a first service/traffic type. The first service/traffic type may be ultra-reliable low-latency communications (URLLC) service/traffic type. In an example, the first control resource set/search space may indicate a first priority (e.g., a first priority of the HARQ feedback associated with the transport block). In an example, further based on the first DCI being received in a second control resource set/search space, the wireless device may not adjust the number of symbols in a subslot. In an example, the second control resource set/search space may indicate a second service/traffic type. The second service/traffic type may be enhanced Mobile Broadband (eMBB) service/traffic type. In an example, further based on a control resource set/search space that the first DCI is received not being the first control resource set/search space, the wireless device may not adjust the number of symbols in a subslot. In an example, the one or more messages may indicate the first control resource set/search space and the second control resource set/search space.

In an example, the adjusting the number of symbols in a subslot may be further based on a service/traffic type of the transport block. Based on the service/traffic type of the transport block being a first service/traffic type, the wireless device may adjust the number of symbols in a subslot. The first service/traffic type may be ultra-reliable low-latency communications (URLLC). Based on the service/traffic type of the transport block being a second service/traffic type, the wireless device may not adjust the number of symbols in a subslot. The second service/traffic type may be enhanced mobile broadband (eMBB). Based on the service/traffic type of the transport block not being the first service/traffic type, the wireless device may not adjust the number of symbols in a subslot. The wireless device may determine the service/traffic type of the transport block. In an example, the wireless device may determine the service/traffic type based on the first DCI scheduling the transport block and indicating the HARQ feedback timing. In an example, one or more parameters associated with the first DCI may comprise a format of the first DCI. In an example, one or more parameters associated with the first DCI may comprise an RNTI associated with the DCI. In an example, one or more parameters associated with the first DCI may comprise a control resource set/search space that the first DCI is received.

In an example embodiment, a wireless device may receive one or more messages comprising configuration parameters of: a first bandwidth part and a second bandwidth part of the cell; and an uplink control channel of the cell. The wireless device may receive a DCI indicating a HARW feedback timing of a HARQ feedback of a TB. The wireless device may switch, after receiving the downlink control information, from the first bandwidth part to the second bandwidth part of the cell, wherein a switching timing of the switching is earlier than the HARG feedback timing. The wireless device may drop the HARQ feedback or transmit the HARQ feedback via the second bandwidth part based on the switching timing being earlier than the HARQ feedback timing. In an example, the transmitting or the dropping the HARQ feedback may further be based on data of one or more logical channels in the TB. In an example, the transmitting or dropping may further be based on the priority of the HARQ feedback. In an example, the transmitting or dropping may be further based on the downlink control information. In an example, the transmitting or dropping may be based on a format of the downlink control information. In an example, the format of the DCI may indicate URLLC service/traffic type. In an example, the transmitting or dropping may be based on an RNTI associated with downlink control information. In an example, the RNTI associated with the DCI may indicate a URLLC service/traffic type. In an example, the DCI may be received in a control resource set; and the transmitting or dropping may be based on the control resource set. In an example, the transmitting or dropping may be based on a service/traffic type of the TB. In an example, the service/traffic type may be URLLC. In an example, the cell may be a primary cell. In an example, the cell may be a secondary cell configured with uplink control channel. In an example, the DCI may indicate a first downlink data to acknowledgement value in a plurality of data to acknowledgement values; and the HARQ feedback timing may be based on the first data to acknowledgement value and a subslot duration. In an example, the subslot duration may be based on a numerology of an uplink bandwidth part. In an example, the one or more messages may comprise the plurality of downlink data to acknowledgement values. In an example, the subslot duration may comprise a plurality of symbol durations. In an example, the subslot duration may be smaller than a slot duration. In an example, the transmitting the HARQ feedback may be via a resource of the uplink control channel of the cell in the second bandwidth part. In an example, the transport block may be a downlink transport block and the DCI may indicate transmission parameters of the downlink transport block. In an example, the wireless device may determine a HARQ feedback codebook comprising the HARQ feedback. The HARQ feedback codebook may comprise a plurality of HARQ feedbacks that are scheduled to be transmitted in the same subslot.

In an example embodiment, a wireless device may receive one or more messages comprising configuration parameters of: a first bandwidth part and a second bandwidth part of a cell; and an uplink control channel of the cell. The wireless device may receive a DCI indicating a hybrid automatic repeat request (HARQ) feedback timing of a HARQ feedback of a transport block. The wireless device may switch, after receiving the downlink control information, from the first bandwidth to the second bandwidth part as an active bandwidth part of the cell, wherein a switching timing of the switching is earlier than the indicated HARQ feedback timing. The wireless device may determine a subslot of the second bandwidth part for transmission of the HARQ feedback based on the switching timing being earlier than the HARQ feedback timing. The wireless device may transmit the HARQ feedback in the subslot and via a resource of the uplink control channel in the second bandwidth part. In an example, the configuration parameters may indicate: a first numerology, of the first bandwidth part, indicating a first subslot duration; and a second numerology, of the second bandwidth part, indicating a second subslot duration. In an example, the determining the subslot may be based on the first numerology and the second numerology. In an example, the determining the subslot may be based on the first subslot duration and the second subslot duration. In example, the determining the subslot may be based on whether first subslot duration is smaller or larger than the second subslot duration. In an example, the determining the subslot may be based on the second numerology in response to the second subslot duration being larger than the first subslot duration. In an example, the determining may comprise first determination of a first subslot based on the first numerology/subslot duration; and second determination of the subslot based on the second numerology/subslot duration, wherein the subslot overlaps with the first subslot. In an example, the subslot may overlap with the first subslot in one or more symbols. In an example, the subslot may be an earliest subslots in a plurality of subslots overlapping with the first subslots. In an example, the determining may be based on a bandwidth part switching delay of the wireless device. In an example, the bandwidth part switching delay may be based on a capability of the wireless device. I an example, the wireless device may transmit one or more capability messages indicating the capability indicating the switching delay. In an example, the cell may be a primary cell. In an example, the cell may be a secondary cell with uplink control channel. In an example, the determining may be based on data of one or more logical channels in the TB. In an example, the determining may be based on a downlink control information. In an example, the determining may be based on a format of a downlink control information. In an example, the format may indicate t scheduling ultra-reliable low-latency communications service/traffic type. In an example, the determining may be based on a radio network temporary identifier associated with the downlink control information. In an example, the radio network temporary identifier may indicate scheduling ultra-reliable low-latency communications service/traffic type. In an example, the DCI is received in a control resource set. The determining may be based on the control resource set. In an example, the determining may be based on a service/traffic type of the TB. In an example, the service/traffic type may be URLLC. In an example, the DCI indicates a first downlink data to acknowledgement value in a plurality of downlink data to acknowledgement values; and the determining may be based on the first downlink data to acknowledgement value. In an example, the one or more messages may comprise the plurality of downlink data to acknowledgement values. In an example, the subslot duration may comprise a plurality of symbol durations. In an example, a subslot duration may be smaller than a slot duration. In an example, the RB may be a downlink TB. The DCI may indicate transmission parameters of the downlink TB. In an example, the wireless device may determine a HARQ feedback codebook comprising the HARQ feedback. In an example, the switching from the first bandwidth part to the second bandwidth part may be based on a second DCI indicating the switching. In an example the second DCI may indicate a grant in the second bandwidth part. In an example the second DCI may indicate an order for a random access process. In an example the switching from the first bandwidth part to the second bandwidth part may be based on an expiry of a bandwidth part inactivity timer.

In an example embodiment, a wireless device may receive one or more messages comprising configuration parameters of: a first bandwidth part and a second bandwidth part of a cell; and an uplink control channel of the cell. The wireless device may receive a first downlink control information indicating a hybrid automatic repeat request (HARQ) feedback timing of a HARQ feedback of a transport block. The wireless device may receive a second downlink control information indicating switching from the first bandwidth part to the second bandwidth part as an active bandwidth part of the cell. The wireless device may ignore the second downlink control information and/or the switching based on a first timing of the switching being earlier than the HARQ feedback timing. The wireless device may transmit the HARQ feedback in a subslot and via a resource of the uplink control channel in the first bandwidth part. In an example, the cell may be a primary cell. In an example the cell may be a secondary cell with uplink control channel. In an example, the ignoring may be further based on the data of the one or more logical channels. In an example, the ignoring may be further based on a priority of HARQ feedback. In an example, the ignoring may be further based on the first downlink control information. In an example, the ignoring may be based on a format of the first downlink control information. In an example, the format may indicate scheduling ultra-reliable low-latency communications service/traffic type. In an example, the ignoring may be based on a service/traffic type of the transport block. In an example, the service/traffic type may be URLLC. In an example, the first downlink control information may indicate a first data to acknowledgement value in a plurality of data to acknowledgement values; and the ignoring may be based on the first downlink data to acknowledgement value. In an example, the one or more messages may further comprise the plurality of data to acknowledgement values. In an example, the subslot duration may comprise a plurality of symbol durations. In an example, the subslot duration may be smaller than a slot duration. In an example, the transport block may be a downlink transport block; and the downlink control information may indicate transmission parameters of the downlink transport bock. In an example, the wireless device may determine a HARQ feedback codebook comprising the HARQ feedback. In an example, the second downlink control information may indicate a grant in the second downlink bandwidth part. In an example, the second downlink control information may indicate an order for a random access process.

In an example embodiment, a wireless device may receive one or more messages comprising configuration parameters of: a first bandwidth part and a second bandwidth part of a cell; and an uplink control channel of the cell. The wireless device may receive a first downlink control information indicating a hybrid automatic repeat request (HARQ) feedback timing of a HARQ feedback of a transport block. The wireless device may receive a second downlink control information indicating switching from the first bandwidth part to the second bandwidth part as an active bandwidth part of the cell. Based on a switching timing of the switching being earlier than the indicated HARQ feedback timing, the wireless device may adjust the HARQ feedback timing to a first timing. The wireless device may transmit the HARQ feedback based on the first timing. In an example, the first timing may be before the switching timing. In an example, the cell may be a primary cell. In an example, the cell may be a secondary cell with uplink control channel. In an example, the adjusting may be further based on data of one or more logical channels in the transport block. In an example, the adjusting may be further based on a priority of HARQ feedback. In an example, the adjusting may be further based on the first downlink control information. In an example, the adjusting may be further based on the first downlink control information. In an example, the format of the downlink control information may indicate scheduling ultra-reliable low-latency communications (URLLC) service/traffic type. In an example, the adjusting may be further based on an RNTI associated with the first downlink control information. In an example, the RNTI may indicate scheduling ultra-reliable low-latency communications service/traffic type. In an example, the downlink control information may be received in a control resource set; and the determining may be based on the control resource set. In an example, the control resource set may indicate scheduling URLLC. In an example, the wireless device my further determine a HARQ feedback codebook comprising the HARQ feedback. In an example, the switching from the first bandwidth part to the second bandwidth part may be based on a second downlink control information indicating the switching. In an example, the second downlink control information may indicate a grant in the second bandwidth part. In an example, the second downlink control information may indicate an order for a random access process. In an example, the switching from the first bandwidth part to the second bandwidth part may be based on an expiry of a bandwidth part inactivity timer.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 41:
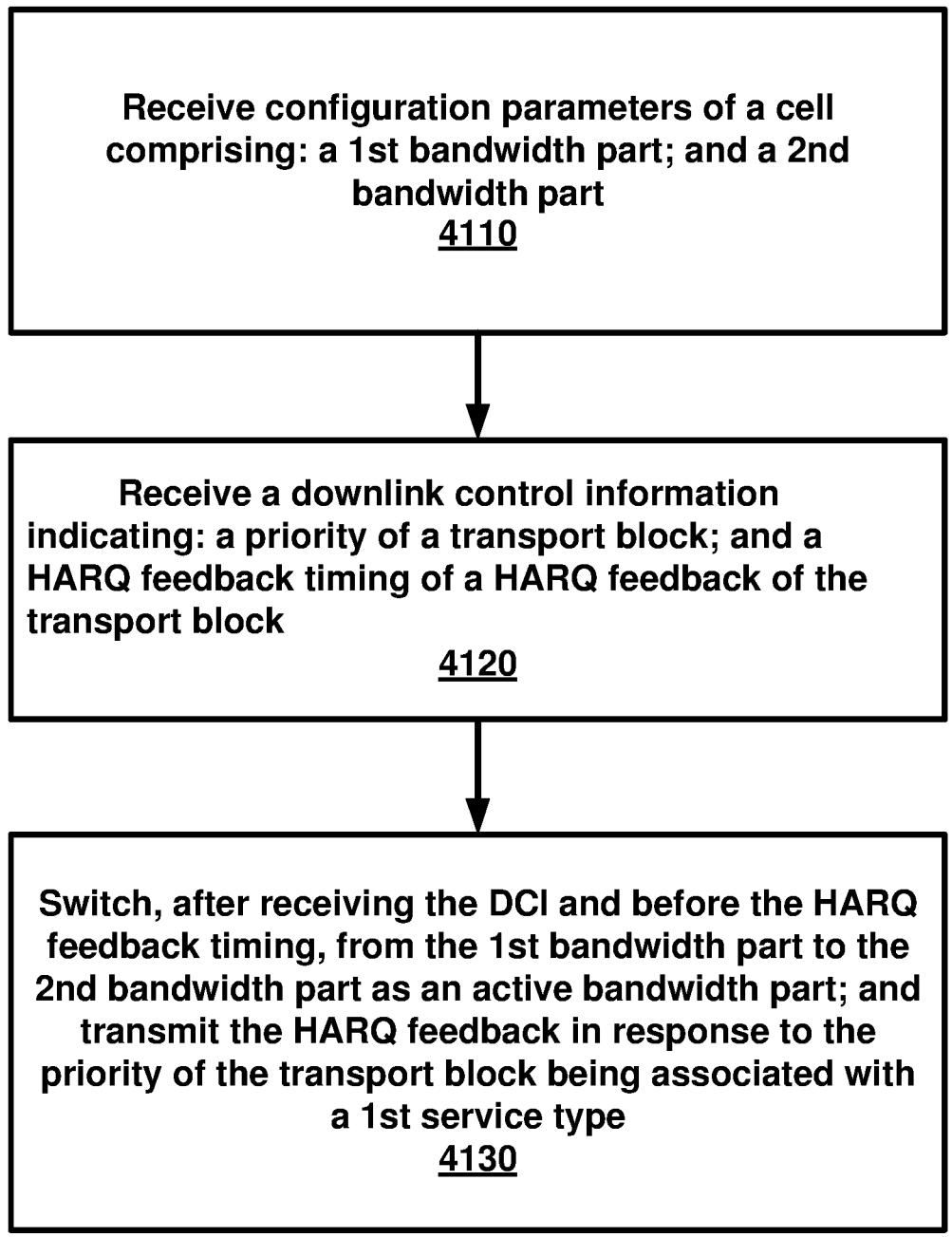
FIG. 41 is a flow diagram of an aspect of an example embodiment of the present disclosure.

FIG. 41 is a flow diagram as per an aspect of an example embodiment of the present disclosure. At 4110, a wireless device may receive one or more radio resource control messages comprising configuration parameters of a cell. The configuration parameters may comprise a first bandwidth part; and a second bandwidth part. At 4120, the wireless device may receive a downlink control information (DCI). The DCI may indicate a priority of a transport block; and a hybrid automatic repeat request (HARQ) feedback timing of a HARQ feedback of the transport block. At 4130, the wireless device may switch, after receiving the DCI and before the HARQ feedback timing, from the first bandwidth part to the second bandwidth part as an active bandwidth part. The wireless device may transmit the HARQ feedback in response to the priority of the transport block being associated with a first service type.

According to an example embodiment, the first service type may be an ultra-reliable and low latency communication service. According to an example embodiment, the wireless device may receive a second DCI. The second DCI may indicate a second resource assignment for a second transport block; a second priority of the second transport block; and a second HARQ feedback timing for the second transport block. The wireless device may drop the HARQ feedback in response to a switching timing of the switching being equal to or earlier than the HARQ feedback timing; and the second priority of the second transport block being associated with a second service type. According to an example embodiment, the second service type may be an enhanced mobile broadband service. According to an example embodiment, the wireless device may determine the first service type based on a priority of the HARQ feedback.

According to an example embodiment, the configuration parameters indicate a first numerology, of the first bandwidth part, indicating a first subslot duration. According to an example embodiment, the configuration parameters indicate a second numerology, of the second bandwidth part, indicating a second subslot duration. According to an example embodiment, the wireless device may determine a second subslot of the second bandwidth part for the HARQ feedback based on a first subslot of the first bandwidth part; a first numerology of the first bandwidth part; and a second numerology of the second bandwidth part. For example, the determining the second subslot may be based on whether first subslot duration may be smaller or larger than the second subslot duration.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device, configuration parameters of a cell comprising:
      a first bandwidth part; and
      a second bandwidth part;
   receiving a downlink control information (DCI) indicating:
      a priority of a transport block; and
      a hybrid automatic repeat request (HARQ) feedback timing of a HARQ feedback of the transport block;
   switching, after receiving the DCI and before the HARQ feedback timing, from the first bandwidth part to the second bandwidth part as an active bandwidth part; and
   determining, based on switching from the first bandwidth part to the second bandwidth part and before the HARQ feedback timing, whether to transmit or drop the HARQ feedback in response to the priority of the transport block being respectively associated with a first service type or a second service type.

2. The method of claim 1, wherein the first service type is a ultra reliable and low latency communication service.

3. The method of claim 1, further comprising receiving a second DCI indicating:
   a second resource assignment for a second transport block;
   a second priority of the second transport block; and
   a second HARQ feedback timing for the second transport block.

4. The method of claim 3, further comprising determining dropping the HARQ feedback in response to:
   a switching timing of the switching being equal to or earlier than the HARQ feedback timing; and
   the second priority of the second transport block being associated with a second service type.

5. The method of claim 4, wherein the second service type is an enhanced mobile broadband service.

6. The method of claim 1, further comprising determining the first service type based on a priority of the HARQ feedback.

7. The method of claim 1, wherein the configuration parameters indicate:
   a first numerology, of the first bandwidth part, indicating a first subslot duration; and
   a second numerology, of the second bandwidth part, indicating a second subslot duration.

8. The method of claim 7, further comprising determining a second subslot of the second bandwidth part for the HARQ feedback based on:
   a first subslot of the first bandwidth part;
   a first numerology of the first bandwidth part; and
   a second numerology of the second bandwidth part.

9. The method of claim 8, wherein the determining the second subslot is based on whether first subslot duration is smaller or larger than the second subslot duration.

10. The method of claim 8, wherein the determining, in response to the second subslot duration being larger than the first subslot duration, the second subslot is based on the second numerology.

11. A wireless device comprising:
    one or more processors; and
    memory storing instructions that, when executed by the one or more processors, cause the wireless device to:
       receive configuration parameters of a cell comprising:
          a first bandwidth part; and
          a second bandwidth part;
       receive a downlink control information indicating:
          a priority of a transport block; and
          a hybrid automatic repeat request (HARQ) feedback timing of a HARQ feedback of the transport block;
       switch, after receiving the downlink control information (DCI) and before the HARQ feedback timing, from the first bandwidth part to the second bandwidth part as an active bandwidth part; and
       determine, based on switching from the first bandwidth part to the second bandwidth part and before the HARQ feedback timing, whether to transmit or drop the HARQ feedback in response to the priority of the transport block being respectively associated with a first service type or a second service type.

12. The wireless device of claim 11, wherein the first service type is a ultra reliable and low latency communication service.

13. The wireless device of claim 11, wherein the instructions, when executed by the one or more processors, further cause the wireless device to receive a second DCI indicating:
    a second resource assignment for a second transport block;
    a second priority of the second transport block; and
    a second HARQ feedback timing for the second transport block.

14. The wireless device of claim 13, wherein the instructions, when executed by the one or more processors, further cause the wireless device to determine dropping the HARQ feedback in response to:
    a switching timing of the switching being equal to or earlier than the HARQ feedback timing; and
    the second priority of the second transport block being associated with a second service type.

15. The wireless device of claim 14, wherein the second service type is an enhanced mobile broadband service.

16. The wireless device of claim 11, wherein the instructions, when executed by the one or more processors, further cause the wireless device to determine the first service type based on a priority of the HARQ feedback.

17. The wireless device of claim 11, wherein the configuration parameters indicate:
    a first numerology, of the first bandwidth part, indicating a first subslot duration; and
    a second numerology, of the second bandwidth part, indicating a second subslot duration.

18. The wireless device of claim 17, wherein the instructions, when executed by the one or more processors, further cause the wireless device to determine a second subslot of the second bandwidth part for the HARQ feedback based on:
a first subslot of the first bandwidth part;
a first numerology of the first bandwidth part; and
a second numerology of the second bandwidth part.

19. The wireless device of claim 18, wherein the determination the second subslot is based on whether first subslot duration is smaller or larger than the second subslot duration.

20. A system comprising:
a base station comprising:
one or more first processors; and
first memory storing first instructions that, when executed by the one or more first processors, cause the base station to:
transmit configuration parameters of a cell comprising:
a first bandwidth part; and
a second bandwidth part; and
transmit a downlink control information indicating:
a priority of a transport block; and
a hybrid automatic repeat request (HARQ) feedback timing of a HARQ feedback of the transport block; and
a wireless device comprising:
one or more second processors; and
second memory storing second instructions that, when executed by the one or more second processors, cause the wireless device to:
receive the configuration parameters;
receive the downlink control information;
switch, after receiving the downlink control information (DCI) and before the HARQ feedback timing, from the first bandwidth part to the second bandwidth part as an active bandwidth part; and
determine, based on switching from the first bandwidth part to the second bandwidth part and before the HARQ feedback timing, whether to transmit or drop the HARQ feedback in response to the priority of the transport block being respectively associated with a first service type or a second service type.

* * * * *